United States Patent
Hashimoto et al.

[11] Patent Number: 6,081,619
[45] Date of Patent: *Jun. 27, 2000

[54] MOVEMENT PATTERN RECOGNIZING APPARATUS FOR DETECTING MOVEMENTS OF HUMAN BODIES AND NUMBER OF PASSED PERSONS

[75] Inventors: Kazuhiko Hashimoto, Moriguchi; Nobuyuki Yoshiike, Ikoma; Satoshi Matsueda, Miyazaki-gun; Chihiro Kawaguchi, Miyazaki, all of Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/683,452

[22] Filed: Jul. 18, 1996

[30] Foreign Application Priority Data

Jul. 19, 1995 [JP] Japan ................................ 7-182611
Aug. 28, 1995 [JP] Japan ................................ 7-218828

[51] Int. Cl.⁷ ................................ G06K 9/00; G01J 5/02; G06M 7/00
[52] U.S. Cl. ........................ 382/181; 382/107; 250/342; 377/6
[58] Field of Search ................................ 382/181, 107, 382/194; 250/DIG. 1, 340, 342, 221, 338.1, 338.3, 395; 340/567, 522; 364/550; 377/6

[56] References Cited

U.S. PATENT DOCUMENTS

| | | | |
|---|---|---|---|
| 4,127,766 | 11/1978 | Thayer | 377/6 |
| 4,528,679 | 7/1985 | Shahbaz et al. | 377/6 |
| 4,799,243 | 1/1989 | Zepke | 277/6 |
| 5,065,446 | 11/1991 | Suzuki et al. | 382/253 |
| 5,101,194 | 3/1992 | Sheffer | 340/567 |
| 5,291,020 | 3/1994 | Lee | 250/338.3 |
| 5,313,060 | 5/1994 | Gast et al. | 250/DIG. 1 |
| 5,555,512 | 9/1996 | Imai et al. | 250/342 |

FOREIGN PATENT DOCUMENTS

| | | | |
|---|---|---|---|
| 0345878 | 12/1989 | European Pat. Off. | G01J 5/34 |
| 05888643 | 3/1994 | European Pat. Off. | G08B 13/191 |
| 3832428 | 4/1989 | Germany | G08B 13/18 |
| 4220508 | 12/1993 | Germany | G07C 9/00 |
| 03186998 | 8/1991 | Japan | G08G 1/01 |
| 04095794 | 3/1992 | Japan | G01V 9/04 |
| 05081503 | 4/1993 | Japan | G07C 9/00 |
| 05324955 | 12/1993 | Japan | G06M 7/00 |
| 03196286 | 8/1994 | Japan | G06M 7/00 |
| WO92/10812 | 6/1992 | WIPO | G07C 9/00 |

OTHER PUBLICATIONS

"The IRCCD Fence Sensor System," R.W. Taylor, Proceedinds Carnahan Conf. on Security Technology, pp. 109–113, May 12–14, 1982.

(List continued on next page.)

*Primary Examiner*—Thomas D. Lee
*Assistant Examiner*—Wenpeng Chen
*Attorney, Agent, or Firm*—Smith, Gambrell & Russell, LLP; Beveridge, DeGrandi, Weilacher & Young Intellectual Property Group

[57] ABSTRACT

A movement pattern recognizing apparatus has a movement signal detection device including a sensor for detecting a mobile body in a detection region and for providing a movement signal indicating the position of the mobile body. The signal changes as time elapses. The apparatus further has a movement pattern storage device for storing data about previous movement patterns which were realized when a mobile body moved in the detection region, and a movement pattern selection device for selecting data about the movement pattern from the movement pattern storage device based upon the movement signal detected by the movement signal detection device.

18 Claims, 45 Drawing Sheets

OTHER PUBLICATIONS

Proceedings of the Instrumentation and Measurement Technology Conference, Advanced Technologies in I & M Hamamatsu, May 10–12, 1994, vol. 1, May 10, 1994, *Institute of Electrical and Electronics Engineers*, pp. 220–223, XP000507293 Nakamura J., et al.: "Algorithm for Counting the Number of Persons Using IR Image Processing."

*Patent Abstracts of Japan*, vol. 18, No. 156 (p. 1710), Mar. 15, 1994 & JP–A–05 324955 (Zuo Nakazawa, et al.).

*Patent Abstracts of Japan*, vol. 16, No. 323 (p. 1386), Jul. 15, 1992 & JP–A–04 095794 (Nippon Avionics), Mar. 27, 1992.

*Patent Abstracts of Japan*, vol. 13, No. 391 (p. 926) [3739], Aug. 30, 1989 & JP–A–01 140279 (Matsushita Electric Works), Jun. 1, 1989.

Fig. 6 (b)
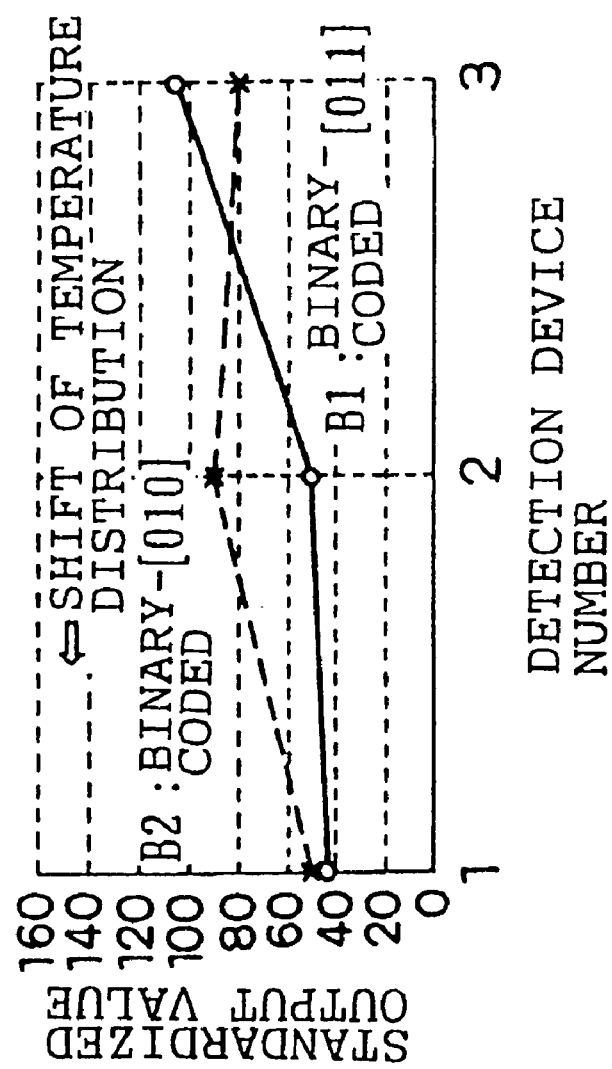
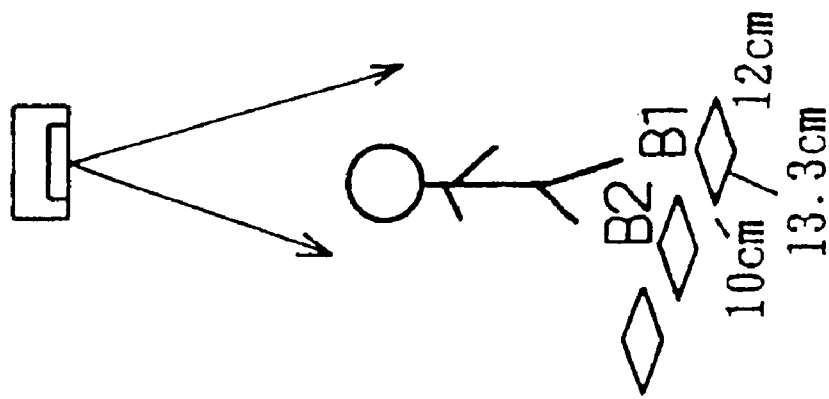

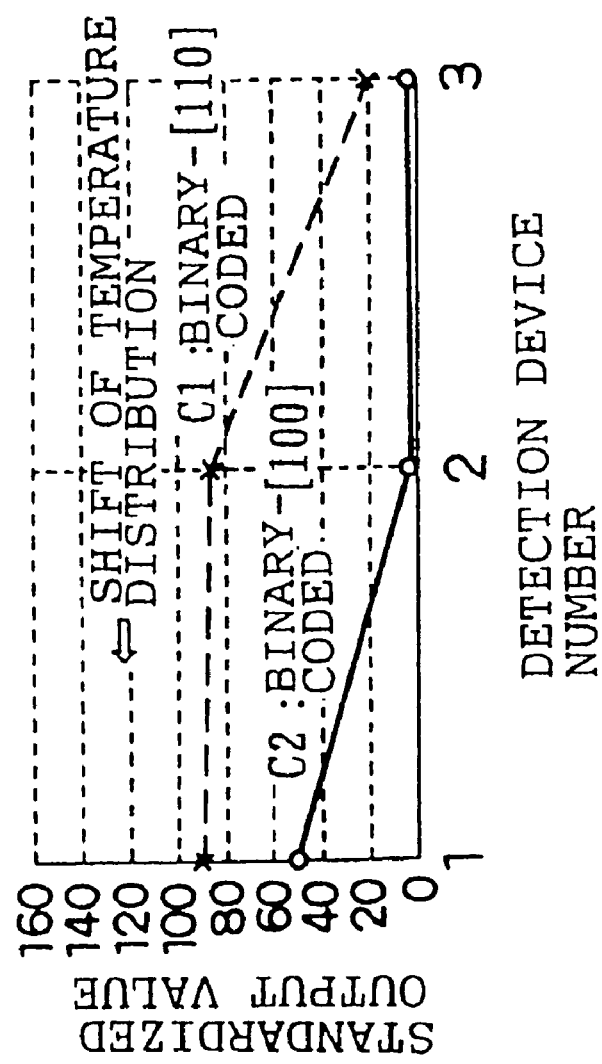
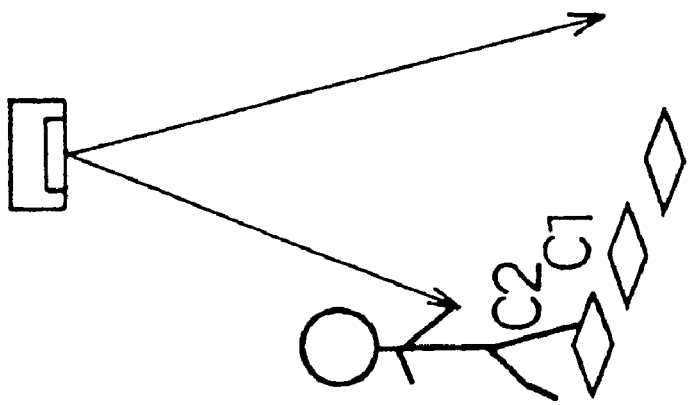
Fig.6(c)

Fig. 21

※ COUNT NUMBER OF ENTRANCE AND EXEUNT

| POINT OF CHANGE | ENTRANCE AND EXEUNT | DEVICE | | | | | | | |
|---|---|---|---|---|---|---|---|---|---|
| | | 1 | 2 | 3 | 4 | 5 | 6 | 7 | 8 |
| H→L | ENTRANCE | 1 | 1 | 2 | 2 | 1 | 0 | 0 | 8 |
| L→H | ENTRANCE | 1 | 1 | 2 | 4 | 1 | 1 | 1 | 0 |
| H→L | EXEUNT | 1 | 0 | 0 | 0 | 0 | 0 | 0 | 1 |
| L→H | EXEUNT | 1 | 0 | 0 | 1 | 0 | 0 | 0 | 0 |
| PROCESS a. | ENTRANCE | 1 | 1 | 2 | 2 | 1 | 0 | 0 | 0 |
| | EXEUNT | 1 | 0 | 0 | 0 | 0 | 0 | 0 | 0 |
| PROCESS b. | ENTRANCE | | | | 2 | | | | |
| | EXEUNT | | | | 0 | | | | |

■ = POSITIONS AT WHICH BINARY-CODED DATA IS ON

■ = POSITIONS AT WHICH
   BINARY-CODED DATA IS ON
□ = POSITIONS AT WHICH
   BINARY-CODED DATA IS INTERPOLATED

Fig. 29

※ COUNT NUMBER OF ENTRANCE AND EXEUNT

| POINT OF CHANGE | ENTRANCE AND EXEUNT | DEVICE | | | | | | | |
|---|---|---|---|---|---|---|---|---|---|
| | | 1 | 2 | 3 | 4 | 5 | 6 | 7 | 8 |
| H→L | ENTRANCE | 1 | 1 | 2 | 2 | 1 | 1 | 1 | 1 |
| L→H | ENTRANCE | 2 | 2 | 2 | 3 | 2 | 2 | 2 | 2 |
| H→L | EXEUNT | 1 | 0 | 0 | 0 | 0 | 0 | 0 | 0 |
| L→H | EXEUNT | 1 | 0 | 0 | 1 | 0 | 0 | 0 | 0 |
| PROCESS a. | ENTRANCE | 1 | 1 | 2 | 2 | 1 | 1 | 1 | 1 |
| | EXEUNT | 1 | 0 | 0 | 0 | 0 | 0 | 0 | 0 |
| PROCESS b. | ENTRANCE | | | | 2 | | | | |
| | EXEUNT | | | | 0 | | | | |

Fig. 33

*COUNT NUMBER OF ENTRANCE AND EXEUNT

| POINT OF CHANGE | ENTRANCE AND EXEUNT | SENSOR 1 DEVICE | | | | | | | | SENSOR 2 DEVICE | | | | | | | |
|---|---|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 | 7 | 8 |
| H→L | ENTRANCE | 1 | 1 | 2 | 2 | 1 | 0 | 0 | 0 | 0 | 0 | 0 | 0 | 0 | 0 | 0 | 8 |
| L→H | ENTRANCE | 1 | 1 | 2 | 4 | 1 | 1 | 1 | 1 | 0 | 0 | 0 | 0 | 0 | 0 | 0 | 1 |
| H→L | EXEUNT | 1 | 0 | 0 | 0 | 0 | 0 | 0 | 0 | 1 | 1 | 1 | 3 | 2 | 2 | 2 | 2 |
| L→H | EXEUNT | 1 | 0 | 0 | 1 | 0 | 0 | 0 | 0 | 1 | 2 | 2 | 3 | 3 | 2 | 2 | 1 |
| PROCESS a. | ENTRANCE | 1 | 1 | 2 | 2 | 1 | 0 | 0 | 0 | 0 | 0 | 0 | 0 | 0 | 0 | 0 | 1 |
| | EXEUNT | 1 | 0 | 0 | 0 | 0 | 0 | 0 | 0 | 1 | 1 | 1 | 3 | 2 | 2 | 2 | 1 |
| PROCESS b. | ENTRANCE | | | | 2 | | | | | | | | 0 | | | | |
| | EXEUNT | | | | 0 | | | | | | | | 2 | | | | |

Fig. 34

*COUNT NUMBER OF ENTRANCE AND EXEUNT

| POINT OF CHANGE | ENTRANCE AND EXEUNT | SENSOR 1 DEVICE | | | | | | | | SENSOR 2 DEVICE | | | | | | | |
|---|---|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 | 7 | 8 |
| H→L | ENTRANCE | 1 | 1 | 2 | 2 | 1 | 1 | 1 | 1 | 0 | 0 | 0 | 0 | 0 | 0 | 0 | 1 |
| L→H | ENTRANCE | 2 | 2 | 2 | 3 | 2 | 2 | 2 | 2 | 0 | 0 | 0 | 0 | 0 | 1 | 1 | 1 |
| H→L | EXEUNT | 1 | 0 | 0 | 0 | 0 | 0 | 0 | 0 | 1 | 2 | 2 | 2 | 2 | 2 | 1 | 1 |
| L→H | EXEUNT | 1 | 0 | 0 | 1 | 0 | 0 | 0 | 0 | 2 | 2 | 3 | 3 | 2 | 2 | 2 | 2 |
| PROCESS a. | ENTRANCE | 1 | 1 | 2 | 2 | 1 | 1 | 1 | 1 | 0 | 0 | 0 | 0 | 0 | 0 | 0 | 1 |
| | EXEUNT | 1 | 0 | 0 | 0 | 0 | 0 | 0 | 0 | 1 | 2 | 2 | 2 | 2 | 2 | 1 | 1 |
| PROCESS b. | ENTRANCE | | | | 2 | | | | | | | | 0 | | | | |
| | EXEUNT | | | | 0 | | | | | | | | 2 | | | | |

SENSOR 1    SENSOR 2

MOVEMENT PATTERN RECOGNIZING APPARATUS FOR DETECTING MOVEMENTS OF HUMAN BODIES AND NUMBER OF PASSED PERSONS

BACKGROUND OF THE INVENTION

1. Field of the Invention

The present invention relates to a movement pattern recognizing apparatus using, for example, an infrared array sensor for detecting movement directions of human bodies and the number of persons who have passed through a doorway or the like and further relates to an apparatus for detecting movements of human bodies and an apparatus for detecting the number of passed persons.

2. Related Art of the Invention

In recent years, security, control of air conditioning and illumination control have been required to measure a state where human beings existing in a room and temperature distribution in the same in order to detect whether a human being exists in the room and the amount of activities in the room. Moreover, companies and the like are required to perform control of persons who exist in a room so as to recognize and control the number of persons who have entered the room or a building and those who have left the same.

As a conventional method of controlling the persons who exist in a room, there has been a method in which the name is written at a reception of a building or a room, a method in which counting is performed by a manual counter at a doorway of the room, and a method in which the persons are, one by one, mechanically allowed to enter or leave the room to perform counting.

Moreover, methods, disclosed in Japanese Patent Laid-Open No. 3-196286 and 5-324955, can be available in each of which pressure sensors are disposed in mats at the doorway, stairs or the like to detect the number of persons and the directions of movements. As disclosed in Japanese Patent Laid-Open No. 3-186998, 4-95794 and 5-81503, apparatuses have been employed in which a plurality of infrared sensors are used to count the movement directions and the number of persons. That is, the weight of the human body is detected to detect the human body so that the movement direction and the number of persons who have passed are detected, or infrared rays or the like radiated from the human body are detected so that the human body is detected. Then, a detection signal is used to control an environment control unit, such as an air conditioner or an illumination apparatus, or a security system. To count the number of persons who have entered and left the room, an apparatus using an infrared sensor to detect an infrared ray generating source has been used.

To solve the foregoing problems, a sensor for detecting the number of persons who have passed the sensor and a system having the sensor has been disclosed by an applicant of the present invention which comprises one infrared sensor having a plurality of detection portions to detect the movement directions of human bodies who have passed the sensor and the number of persons who have passed the sensor so as to control the number of persons in a room.

However, in the case where the number of persons is counted manually, a large cost and a complicated operation are required. Thus, there arises a problem in that labor and time cannot be saved.

The mechanical detection method requires a large scale facility, the cost of which cannot be reduced. What is worse, the method suffers from an excessively large space being required for installation.

Since the method using the plural infrared sensors to detect the human bodies comprises the plural sensors, the cost cannot be reduced. What is worse, since whether or not all of the doorways are detected cannot be recognized, errors frequently occur in detection. Thus, there arises a problem in that the number of persons cannot accurately be counted. In particular, if persons continuously move while being somewhat apart from one another, or if persons overlap during movement, detection using sensors encounters errors in the detection and in determination. Thus, the method suffers from a problem in that the human bodies cannot be accurately detected. Although the foregoing methods are required to be provided with corresponding adaptable signal processing methods and algorithms, no method and algorithm have been disclosed.

In view of the foregoing, an object of the present invention is to provide a movement pattern recognizing apparatus capable of detecting directions of mobile bodies, calculating the number of movements in each direction and recognizing the movement patterns.

Meanwhile, detection of the accurate number of persons who have passed a wide doorway of a department store, an exhibition, a pavilion of an exhibition, an art museum, a museum having a width of 1 m or larger cannot easily be performed.

Then in order to solve the above problem experienced with the conventional art for detecting the human bodies, another object of the present invention is to provide an apparatus for detecting movements of human bodies and an apparatus for detecting the number of passed persons, which is capable of easily, accurately and reliably detecting human bodies or the number of passed persons with a low cost and accurately detecting the number of passed persons through a wide doorway.

According to the present invention, there is provided a movement pattern recognizing apparatus comprising: movement signal detection means using a sensor for detecting existence of a mobile body to detect, in a detection region in which the mobile body which can be detected by the sensor moves, a movement signal indicating the position of the mobile body which changes as the time elapses; movement pattern storage means for storing data about previously formed various movement patterns which are realized when the mobile body moves in the detection region; and movement pattern selection means for selecting data about the movement pattern, corresponding to the movement signal detected by the movement signal detection means, from the movement pattern storage means.

The mobile body according to the present invention is a mobile heat generating body, the sensor is a converging lens for converging infrared rays into a predetermined angle and an infrared array sensor having a plurality of detection portions for detecting the infrared rays converged by the converging lens, and the detection region is a region into which the infrared rays are converged.

According to the present invention, there is provided a movement pattern recognizing apparatus comprising: movement signal detection means using a converging lens for converging infrared rays into a predetermined angle and an infrared array sensor having a plurality of detection portions for detecting the infrared rays converged by the converging lens to detect a movement signal indicating the position of a heat generating body which changes as the time elapses when the heat generating body moves in a detection region into which the infrared rays are converged; movement signal normalizing means for generating normalized data of the movement signal detected by the movement signal detection means; movement pattern storage means for storing data about various movement patterns previously generated in consideration of the normalized data generated by the movement signal normalizing means and realized when the heat generating body moves in the detection region; movement pattern selection means for selecting, from the movement pattern storage means, the data about the movement pattern that corresponds to the normalized data generated by the movement signal normalizing means; and movement pattern recognizing means for recognizing the movement pattern of the heat generating body in accordance with the data selected by the movement pattern selection means.

The movement signal detection means according to the present invention may have a plurality of sets each consisting of the converging lens and the infrared array sensor, and a predetermined region, in which the heat generating body moves, may be covered by each of the plural sets.

The present invention may comprise refuse data storage means for storing a plurality of refuse data items which are data items that cannot be generated by the movement signal normalizing means, wherein the movement signal normalizing means may generate normalized data of the movement signal detected by the movement signal detection means, and may delete refuse data from the normalized data if refuse data stored in the refuse data storage means is contained in the normalized data.

The present invention may have a structure comprising reference temperature storage means for storing reference data about a predetermined reference temperature, wherein the movement signal normalizing means uses the reference data stored in the reference temperature storage means to obtain the ratio of or the difference between signals obtainable from the plural detection portions of the infrared array sensor, and compares the ratio or the magnitude of the difference between the detection portions and detection portions adjacent to the detection portions to perform a binary-coding process so as to generate normalized data of the movement signal. The predetermined reference temperature may be a temperature which is detected by the movement signal detection means in a case where the heat generating body does not exist in the detection region, and the reference data may be a mean value and a standard deviation of the reference temperature calculated by using the reference temperature obtained by sampling performed for a predetermined time.

The present invention may have a structure such that the data about the movement patterns stored in the movement pattern storage means has sub-information about movement directions of the movement patterns and/or the number of passage times in the movement directions, and the movement pattern recognizing means recognizes the movement direction and/or the number of passage times in the movement direction about the movement pattern of the heat generating body in accordance with the data about the movement pattern selected by the movement pattern selection means.

In the present invention, the movement signal detection means uses the sensor for detecting existence of a mobile body to detect, in the detection region in which the mobile body which can be detected by the sensor moves, the movement signal indicating the position of the mobile body which changes as the time elapses. The movement pattern storage means stores data about various movement patterns realized when the mobile body moves in the detection region. The data about the various movement patterns has been previously generated. The movement pattern selection means selects the data about the movement pattern, corresponding to the movement signal detected by the movement signal detection means, from the movement pattern storage means.

In the present invention, the movement signal detection means uses the converging lens for converging infrared rays into a predetermined angle and the infrared array sensor having the plural detection portions for detecting the infrared rays converged by the converging lens to detect the movement signal indicating the position of the heat generating body which changes as the time elapses when the heat generating body moves in the detection region into which the infrared rays are converged. The movement signal normalizing means generates normalized data of the movement signal detected by the movement signal detection means. The movement pattern storage means stores the data about the various movement patterns previously generated in consideration of the normalized data generated by the movement signal normalizing means and realized when the heat generating body moves in the detection region. The movement pattern selection means selects, from the movement pattern storage means, the data about the movement pattern that corresponds to the normalized data generated by the movement signal normalizing means. The movement pattern recognizing means recognizes the movement pattern of the heat generating body in accordance with the data selected by the movement pattern selection means.

The movement signal detection means according to the present invention may have a plurality of sets each consisting of the converging lens and the infrared array sensor, and a predetermined region, in which the heat generating body moves, may be covered by each of the plural sets.

The present invention may have the structure such that the refuse data storage means stores a plurality of refuse data items which are data items that cannot be generated by the movement signal normalizing means, and the movement signal normalizing means generates normalized data of the movement signal detected by the movement signal detection means, and deletes refuse data from the normalized data if refuse data stored in the refuse data storage means is contained in the normalized data.

The present invention may have a structure such that the reference temperature storage means stores reference data about the predetermined reference temperature, and the movement signal normalizing means uses the reference data stored in the reference temperature storage means to obtain the ratio of or the difference between signals obtainable from the plural detection portions of the infrared array sensor, and compares the ratio or the magnitude of the difference between the detection portions and detection portions adjacent to the detection portions to perform a binary-coding process so as to generate normalized data of the movement signal. The predetermined reference temperature is the temperature which is detected by the movement signal detection means in the case where the heat generating body does not exist in the detection region, and the reference data is the mean value and the standard deviation of the reference temperature calculated by using the reference temperature obtained by sampling performed for a predetermined time.

The present invention may have a structure such that the data about the movement patterns stored in the movement pattern storage means has sub-information about movement directions of the movement patterns and/or the number of passage times in the movement directions, and the movement pattern recognizing means recognizes the movement direction and/or the number of passage times in the movement direction about the movement pattern of the heat generating body in accordance with the data about the movement pattern selected by the movement pattern selection means.

Further according to another present invention, there is provided an apparatus for detecting movements of human bodies comprising: an infrared array sensor having a plurality of devices arranged in a direction in which human beings move; signal change detection means for detecting change in the leading edge and/or trailing edge of each of output signals from each of the devices of the infrared array sensor occurring in a predetermined period of time; and determining means using a predetermined rule to, in accordance with a detected value obtained from each of the devices of the infrared array sensor, determine movements of human bodies in an area which is the subject of the infrared array sensor.

Therefore, the apparatus for detecting movements of human bodies is operated to detect and determine the persons who have entered the room or the building or those who have left the same so as to count the number of the persons who have passed the detection area so that the number of the attendance or the number of persons who exist in the room is accurately detected. In particular, when a threshold is set by using the temperature of the floor surface always observed by the infrared array sensor, change in the temperature of the floor surface can always be fed back. Thus, the threshold can be caused to follow the change in the temperature of the floor surface. Since upper and lower limit thresholds are set with respect to a reference value, a low-temperature object, the temperature of which is low, can be detected. By monitoring the inclination of the outputs from the sensor, that is, the amount of change and by inputting a value (a maximum value−1) to each of devices except a device at which the largest number of persons has been detected, the number of persons who have successively passed the detection area and the number of persons who intersect at the passage can further accurately be detected. By multiplying the output values from the adjacent devices by the ratio of crosstalk to correct the output from the sensors or by forcibly determining the human bodies in two or less steps between steps in which human bodies have been determined, the human bodies can accurately be detected even if low temperature or high temperature objects exist mixedly. Thus, the moving directions and the number of the passed persons can accurately be detected.

By combining a software which is the processing method and a pyroelectric device with each other, an accurate and reliable sensor system for detecting the number of passed persons and exhibiting a reduced size and cost of the system can be obtained. Thus, the number of persons existing in the room can easily and immediately be detected. In particular, by using the foregoing detection apparatus and the sensor system, an error in detection, as has been experienced with a structure having a plurality of sensors, can be prevented. As a result, the human bodies and the number of passed persons can accurately and reliably be detected.

According to the present invention, there is provided an apparatus for detecting movements of human bodies comprising: a plurality of infrared array sensors having a plurality of devices arranged in a direction in which human beings move; signal change detection means for detecting change in the leading edge and/or trailing edge of each of output signals from each of the devices of each of the infrared arrays occurring in a predetermined period of time; and determining means using a predetermined rule to, in accordance with a state of appearance of the detected value of each of the devices of each of the infrared arrays between the infrared arrays, determine movements of human bodies in an area which is the subject of the plural infrared arrays.

Therefore, by determining the state of appearance of the detected values detected by the plural infrared array sensors in terms of the time and spatially, the human beings and the number of passed persons through a wide doorway can accurately be detected.

BRIEF DESCRIPTION OF THE DRAWINGS

FIG. 21 is a diagram showing a specific example of detection and totaling of the number of passed persons according to the nineth embodiment;

FIG. 29 is a diagram showing a specific example of detection and totaling of the number of passed persons to be performed in the apparatus for detecting the number of passed persons according to a fourteenth embodiment of the present invention;

FIG. 33 is a diagram showing a specific example of detection and totaling of the number of passed persons adapted to the method of detecting the number of passed persons according to a nineteenth embodiment of the present invention;

FIG. 34 is a diagram showing a specific example of detection and totaling of the number of passed persons adapted to the method of detecting the number of passed persons according to a twenty-second embodiment of the present invention;

Figure 1:
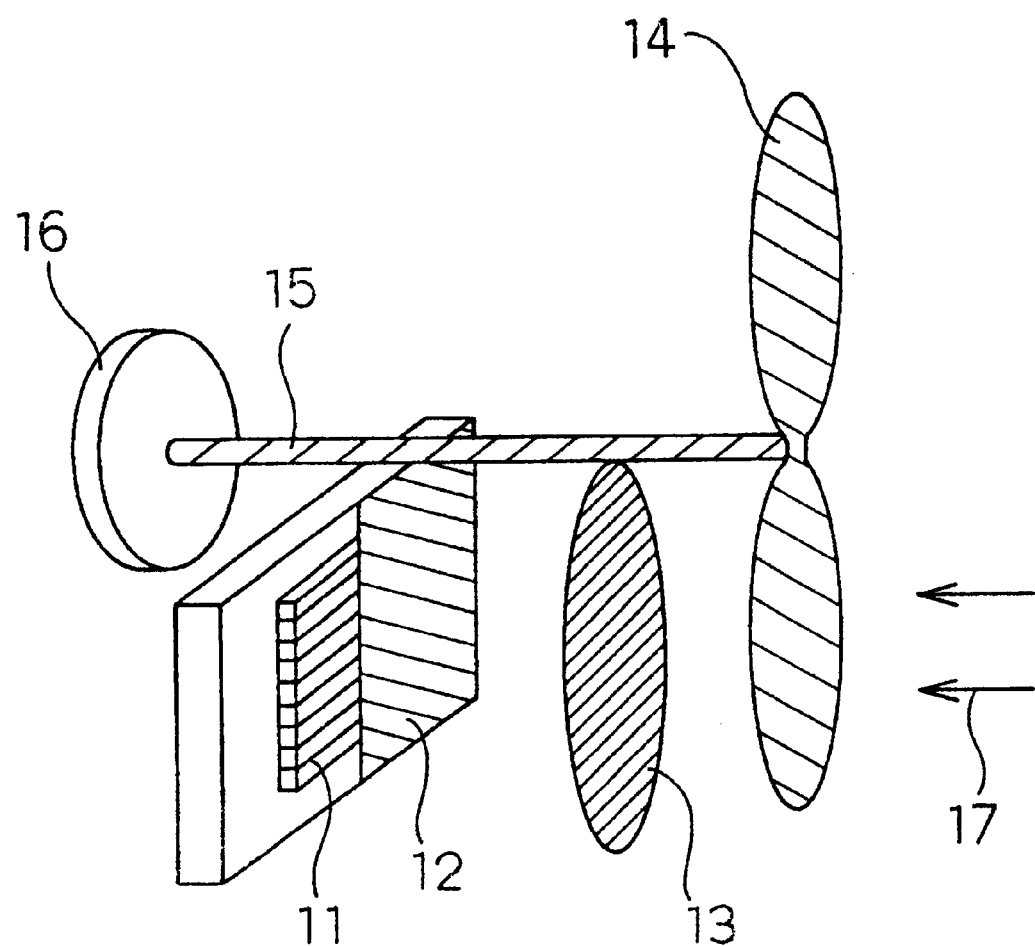
FIG. 1 is a perspective view showing an embodiment of a movement signal detection means for use in a movement pattern recognizing apparatus according to the present invention.

DESCRIPTION OF REFERENCE NUMERALS 11 pyroelectric device
12 infrared-ray shielding plate
13 infrared-ray transmissive lens
14 chopper
15 chopper shaft
16 brushless motor
17 infrared rays
21 sensor head
22, 22*a* signal processing circuit
22*b* relay box
23 computer or display unit
44 doorway
45 human body
46 detection region

PREFERRED EMBODIMENT OF THE INVENTION

Embodiments of the present invention will now be described with reference to the drawings.

FIG. 1 is a perspective view showing a first embodiment of a movement signal detection means for use in a movement pattern recognizing apparatus according to the present invention.

In general, as a sensor for use in an apparatus for detecting an infrared ray generating source, an infrared sensor or the like is employed. As the infrared sensor, two types have been known, one of which being a quantum type sensor for detecting the infrared rays as photons; and a residual one being a thermal sensor which uses change in the physical properties of a device occurring due to a thermal function in which the device absorbs infrared rays as electromagnetic waves and the temperature of the device is raised. Since the former sensor is generally required to be cooled with liquid nitrogen or the like, the latter thermal sensor is generally employed. Among the thermal sensors, pyroelectric infrared sensors exhibit superior excellent sensitivity and therefore the sensor of this type is suitable to detect the infrared ray generating source.

However, since the pyroelectric infrared sensor basically detects change in infrared rays, there arises a requirement that it be provided with a contrivance to cause infrared rays to be intermittently made incident upon a light receiving portion of the sensor in a case where a stationary infrared ray generating source is detected. In usual, a chopper in the form of a disc or flat plate having slits is rotated or vibrated to cause infrared rays to intermittently made incident upon (cause chopping to take place) the light receiving portion of the sensor.

Accordingly, an infrared array sensor of the movement signal detection means according to this embodiment consists of a plurality of line-shape pyroelectric devices 11. An infrared-ray shielding plate 12 is attached to cover the front surfaces of the pyroelectric devices 11. An infrared-ray transmissive lens 13, which is a silicon infrared ray transmissive lens, is attached to converge infrared rays 17 onto the pyroelectric devices 11. By employing a wide angle lens to serve as the infrared-ray transmissive lens 13, the necessity of rotating the infrared array sensor can be eliminated but moving heat generating bodies can collectively be detected. A chopper 14 is provided for intermittently shielding the infrared rays 17 which are made incident upon the infrared-ray transmissive lens 13. The chopper 14 is rotatively and mechanically connected to a brushless motor 16 through a chopper shaft 15. By setting the chopping frequency to be 10 Hz or higher, the human body can be detected quickly, more accurately and a precisely.

Since the infrared array sensor has the plural and line-shape pyroelectric devices 11, consideration of an output value of each of the pyroelectric devices 11 at each time in such a manner that the plural pyroelectric devices 11 are made to be references enables the movement direction of the moving heat generating body on the plural pyroelectric devices 11 to be detected.

Figure 2:
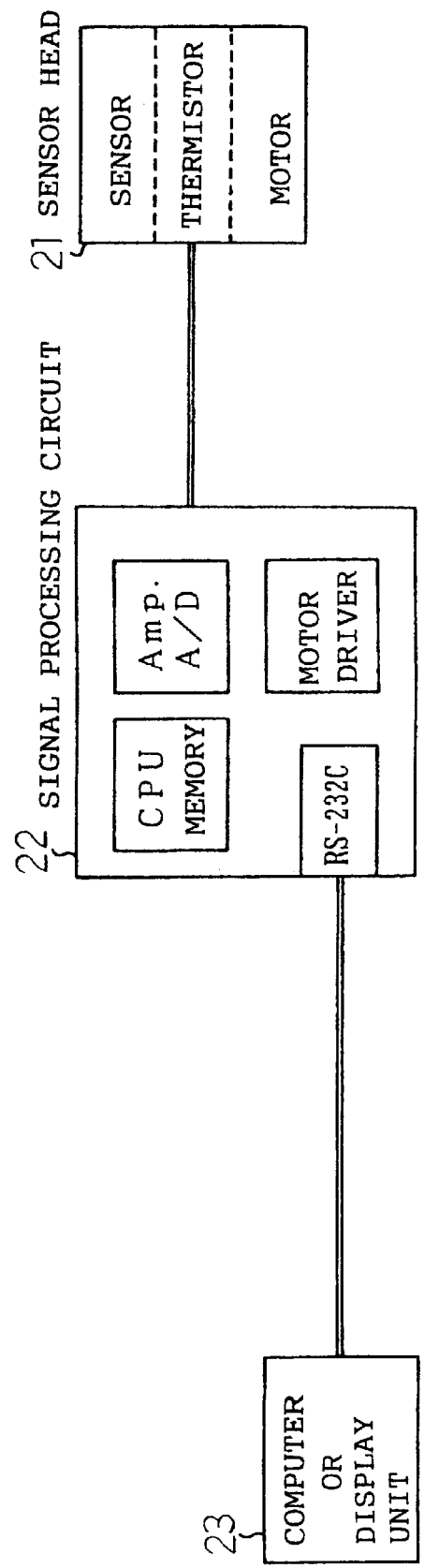
FIG. 2 is a structural view showing another embodiment of the movement pattern recognizing apparatus according to the present invention.

FIG. 2 is a structural view showing a second embodiment of the movement pattern recognizing apparatus according to the present invention. A sensor head 21, which is the movement signal detection means, has the sensor shown in FIG. 1. Since the sensor head 21 has the plural and line-shape pyroelectric devices 11 shown in FIG. 1, consideration of an output value of each of the pyroelectric devices 11 at each time in such a manner that the plural pyroelectric devices 11 are made to be references enables the movement direction of the moving heat generating body on the plural pyroelectric devices 11 to be detected. The output from the sensor head 21 is supplied to a signal processing circuit 22 through a cable having a length of several meters. The signal processing circuit 22 includes an amplifying circuit (indicated as "Amp." shown in FIG. 2) and an A/D converter (indicated as "A/D" shown in FIG. 2). The output from the sensor head 21 supplied to the signal processing circuit 22 is amplified by the amplifying circuit, and then supplied to the A/D converter so as to be converted into a digital signal (an AD value). The digital signal is subjected to a calculation process by a CPU, a memory and the like of the signal processing circuit 22. Thus, the movement pattern of the moving heat generating body using the infrared line sensor of the sensor head 21 as the reference is recognized. The result of recognition is transmitted from RS-232C to a computer or a display unit 23.

A program for performing the calculation process (its flow chart will be described later), has been stored in a semiconductor memory, such as a ROM or a memory card, or a disk memory, such as a hard disk, a magneto-optic disk or a floppy disk. Also data and the like to which a reference is made in the calculation process and which has been previously generated, has been stored in a semiconductor memory, such as a ROM or a memory card, or a disk memory, such as a hard disk, a magneto-optic disk or a floppy disk. The memory of the signal processing circuit 22 is a main storage memory for loading the program, and is the foregoing memory.

The CPU of the signal processing circuit 22 which activates the program corresponds to a movement signal normalizing means, a movement pattern selection means and a movement pattern recognizing means of the movement pattern recognizing apparatus according to the present invention. The memory of the signal processing circuit 22 corresponds to a movement pattern storage means, a refuse data storage means and a reference temperature storage means for use in the present invention.

Figure 4:
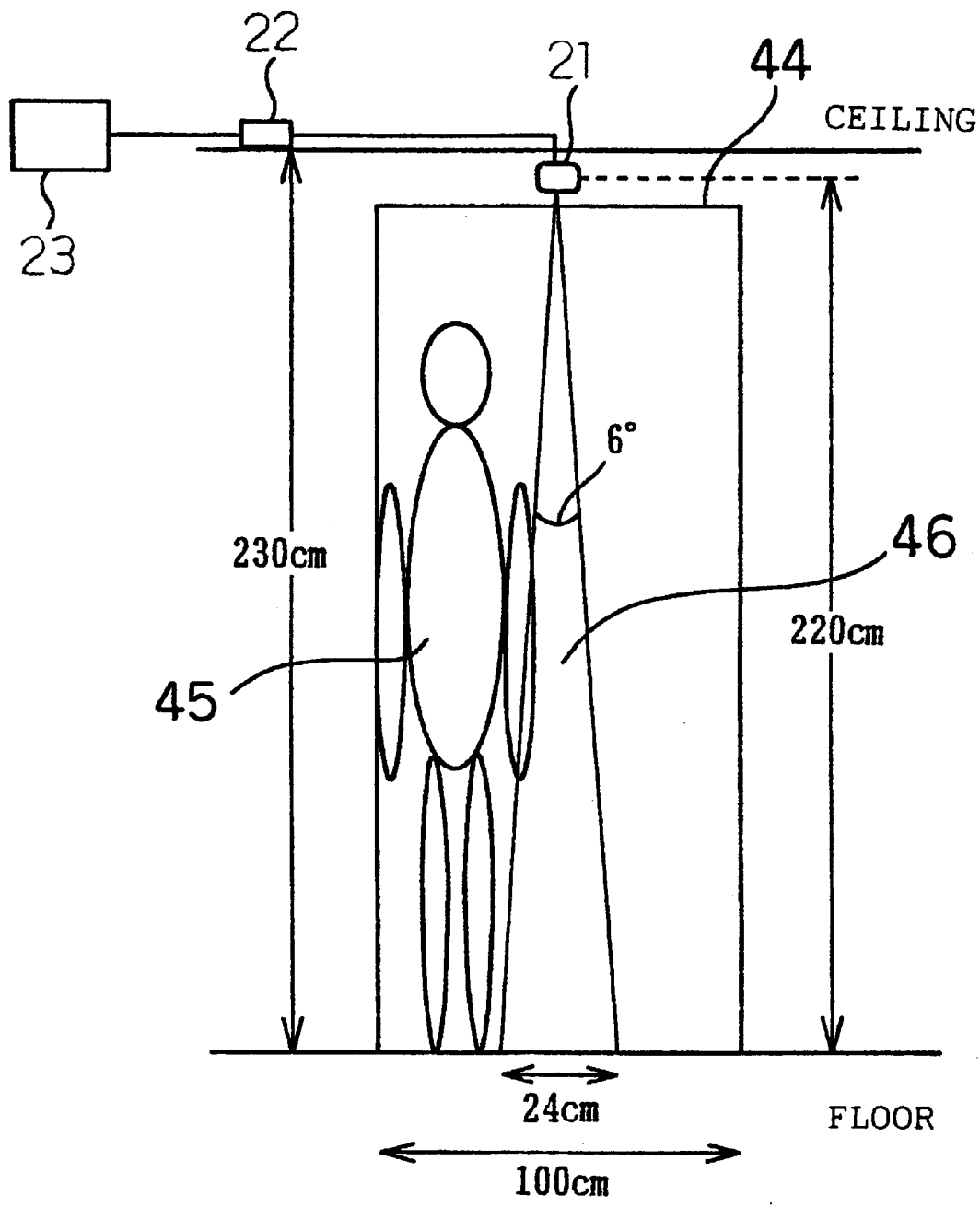
FIG. 4 is a diagram showing a state where a sensor head 21 according to this embodiment is disposed in an upper portion of the doorway of a room.

FIG. 4 is a diagram showing a state where the sensor head 21 according to this embodiment is disposed in the upper portion of a doorway of a room. The sensor head 21 is disposed in an upper portion of the central portion of a usual doorway 44 having a width of about 100 cm and a height of about 220 cm in such a manner that infrared rays emitted from a lower portion of the central portion of the doorway 44 can be converged into a predetermined angle. Infrared rays converged by the sensor head 21 are supplied to the signal processing circuit 22. Thus, information about entry and exeunt obtained due to the performed process is displayed on the computer or the display unit 23. If the angle of incidence on the sensor is 6°, a detection region 46 is formed as illustrated. Thus, even if a human body 45 passes the outer end of the region, detection can satisfactorily be performed.

The operation of the apparatus disposed as described above will now be described.

Figure 5:
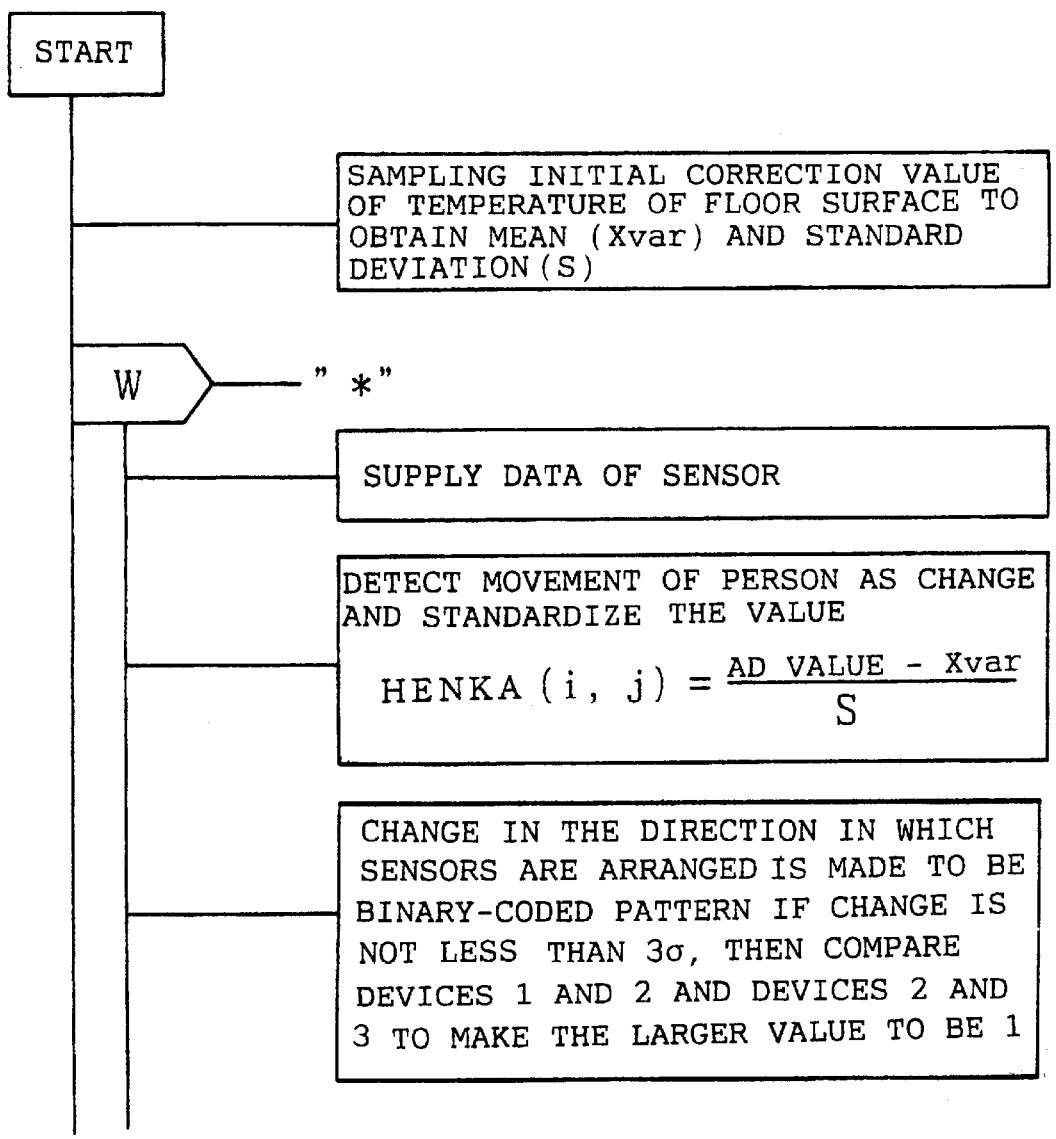
FIG. 5 is a flow chart of a process to be performed by a CPU shown in FIG. 2 in which a program has been activated.

FIG. 5 is a flow chart of the process to be performed by the CPU shown in FIG. 2 in which the program has been turned on. That is, the temperature of the floor surface which is the background which is being always detected is sampled for a predetermined time so that the mean value (Xvar) and the standard deviation (S) of the temperature of the floor surface are calculated. The mean value and the standard deviation are stored in the memory of the signal processing circuit 22. The storage operation is performed such that if the human body 45 does not exist in the detection region 46 during a predetermined time for sampling, updating to a newly calculated mean value and standard deviation is performed.

The mean value and standard deviation are used with (Numerical Formula 1) so that the change rate (HENKA) of each of the signals obtained from the plural pyroelectric devices is calculated for each chopping from the AD value obtained due to supply from each of the plural pyroelectric devices of the infrared array sensor.

[Numerical Formula 1]

$$\text{HENKA}(i,j) = (\text{AD value} - \text{Xvar})/S$$

In the case where the rate of change is three times or larger than the standard deviation, the rates of change of adjacent pyroelectric devices in the infrared array sensor are compared. The larger rate of change is made to be 1 so that a binary process is performed.

Figure 6A:
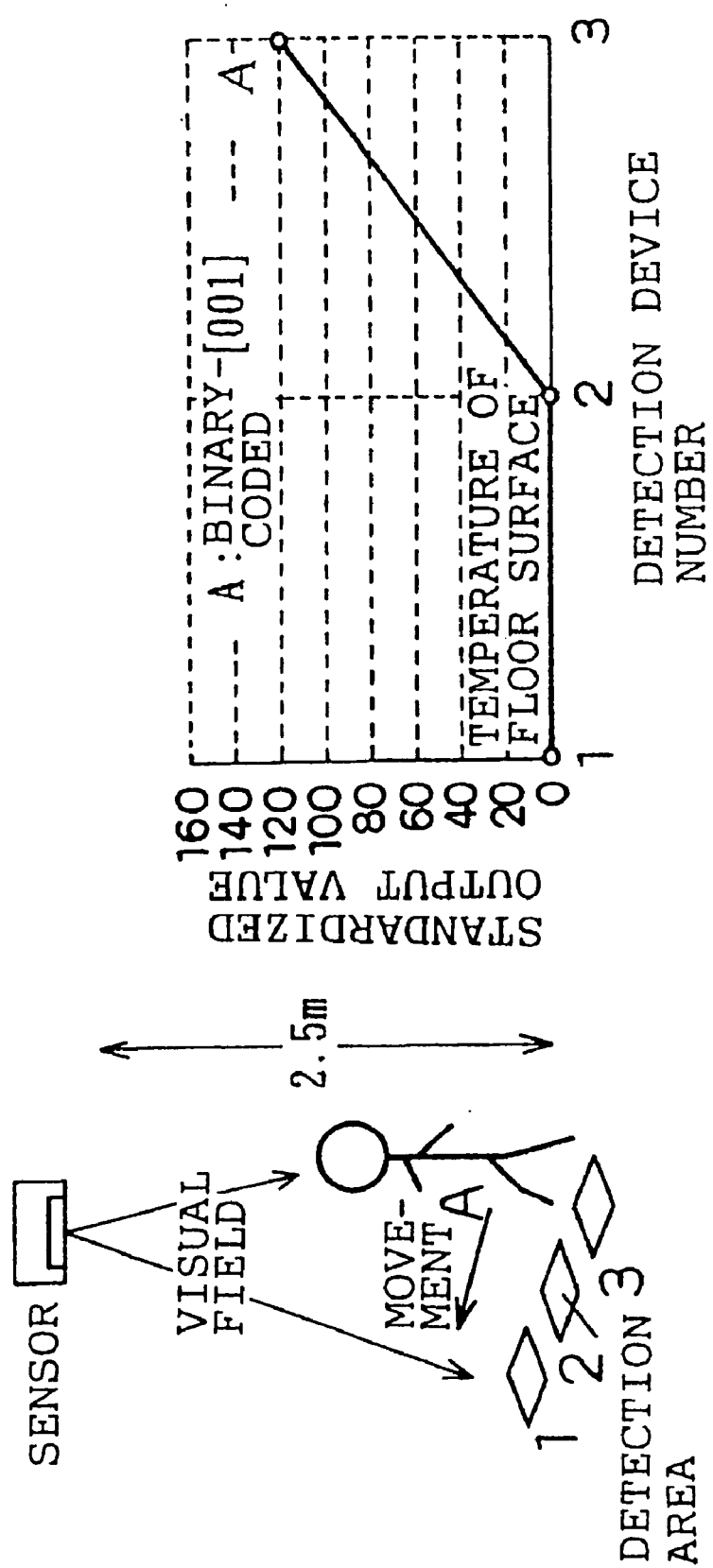
FIG. 6 is a diagram showing a state where normalized data of a movement signal detected by three pyroelectric devices 11 is generated.

FIG. 6 shows a specific example of a state where normalized data of the movement signal detected by the three pyroelectric devices 11 is generated. The detection region of the infrared array sensor disposed at a height of 2.5 m consists of detection areas 1, 2 and 3. State A shown in portion (a) is a state of movement in which a human body has entered the detection area 3. States B1 and B2 shown in portion (b) are states of movement in which the human body has moved to the detection area 2. States C1 and C2 shown in portion (c) are states of movement in which the human body has reached the detection area 1. At this time, each binary-coded data is generated to be as shown in the graph shown in the right-hand portion of the drawing. That is, when the rates of change which are three or more times the standard deviation s (S) and which are larger than the adjacent pyroelectric device are made to be 1, binary-coded data items are made to be A: (001), B1: (011), B2: (010), C1: (110) and C2: (100).

Figure 7A:
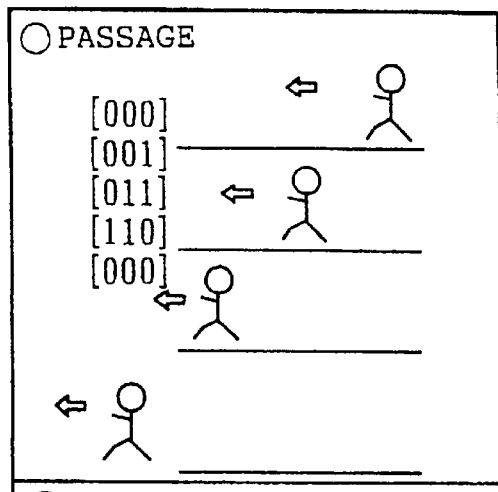
FIG. 7 is a diagram showing an example of another operation obtainable similarly from the state shown in FIG. 6.
Figure 7B:
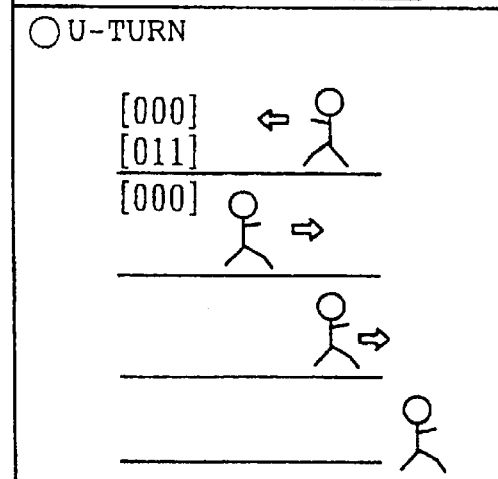
Figure 7C:
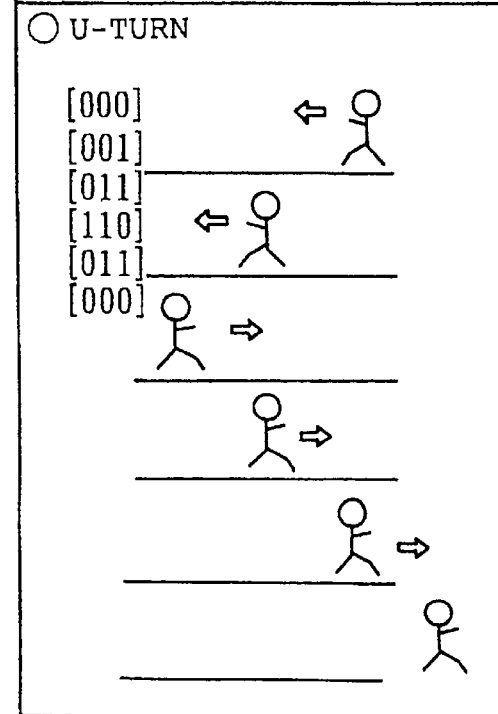

FIG. 7 is a diagram showing an example of another operation obtainable similarly to the process shown in FIG. 6. When a person has passed for example, data changes as (000), (001), (011), (110) and (000) as shown in portion (a). In a case where a person makes a U-turn during the movement, it can be considered that data is changed as shown in portion (b) or portion (c).

In accordance with the thus-obtained binary-coded data, data about various movement patterns when a human body passes through the detection region is previously generated and stored in the memory of the signal processing circuit 22.

An actual movement pattern detected by the infrared array sensor and processed as described above is subjected to a comparison with the various movement patterns stored in the memory so that data about the subject movement pattern is selected.

In accordance with data about the selected movement pattern, the movement pattern of the human body is recognized. That is, if information about the movement direction is included in data about the movement pattern, a direction in which the human body has moved is recognized. In this embodiment, the movement pattern recognizing apparatus recognizes whether a person has entered by the doorway 44 or whether the person has left the same.

The foregoing method enables a human body to be reliably and accurately detected and a movement direction to be determined. Thus, a conventional ratio of detecting a movement direction of about 90% could be improved to 99% or higher.

Figure 8:
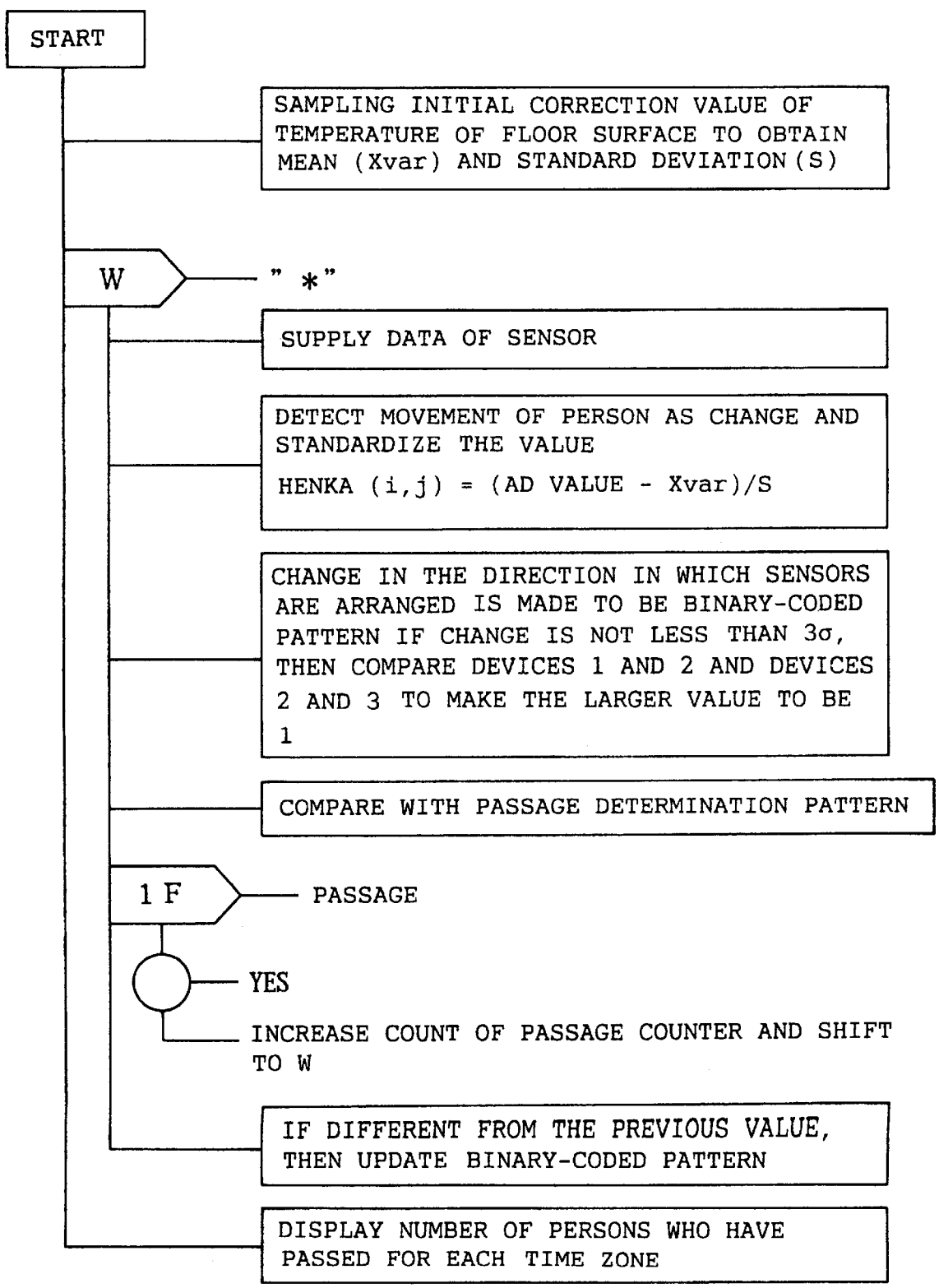
FIG. 8 is a flow chart of the operation of another embodiment of the movement pattern recognizing apparatus according to the present invention.
Figure 9A:
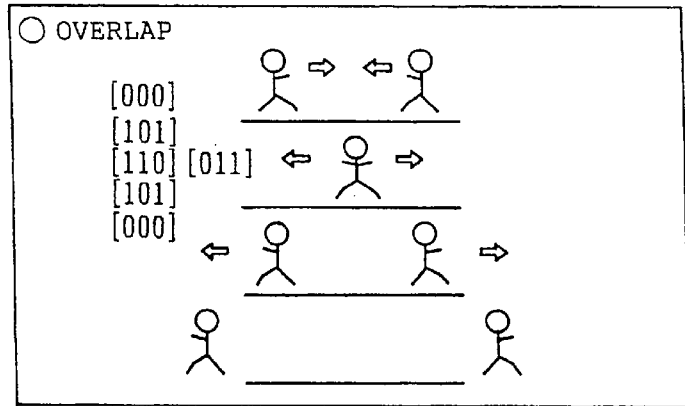
FIG. 9 is a diagram showing specific binary-coded data about the movement patterns when persons enter by or leave the doorway.
Figure 9B:
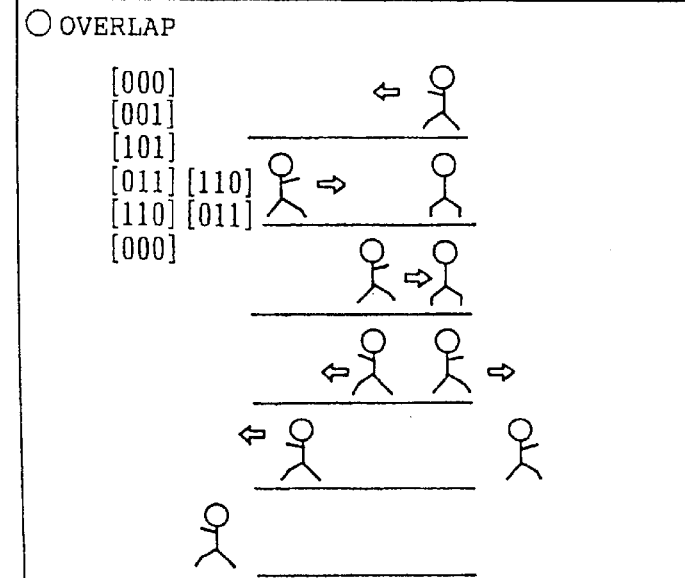
Figure 9C:
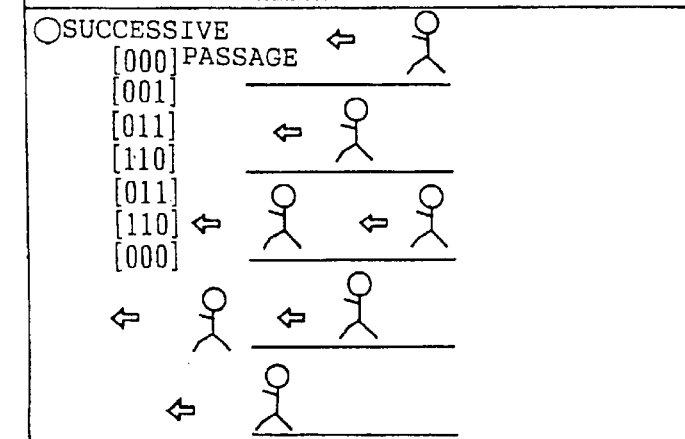

FIG. 8 is a flow chart of the operation of a third embodiment of the movement pattern recognizing apparatus according to the present invention. The structure and operation of the movement pattern recognizing apparatus according to this embodiment are similar to those according to the embodiment described with reference to FIGS. 1 to 7. The difference lies in the type of information of data about various movement patterns, the process of recognizing information to be performed after the movement pattern has been selected and obtained results. FIG. 9 shows specific binary-coded data about movement patterns realized when persons enter or leave the doorway. In the drawing, states are illustrated in which two persons overlap or successively pass the detection region. In this embodiment, the foregoing movement patterns are considered, and information indicating directions in which persons have passed through the detection region has been stored in the memory of the signal processing circuit 22 shown in FIG. 2 together with data about the movement patterns. As a result, the movement pattern recognizing apparatus according to this embodiment is able to count the number of persons who have entered by the doorway and persons who have left the same. Moreover, the number of attendance for each time zone can be calculated.

The foregoing method enables a human body to be reliably and accurately detected and a movement direction to be determined. Moreover, the number of persons who have passed the detection region can be counted. Thus, a conventional ratio of detecting the number of persons of passage of about 80% could be improved to 95% or higher.

Figure 10:
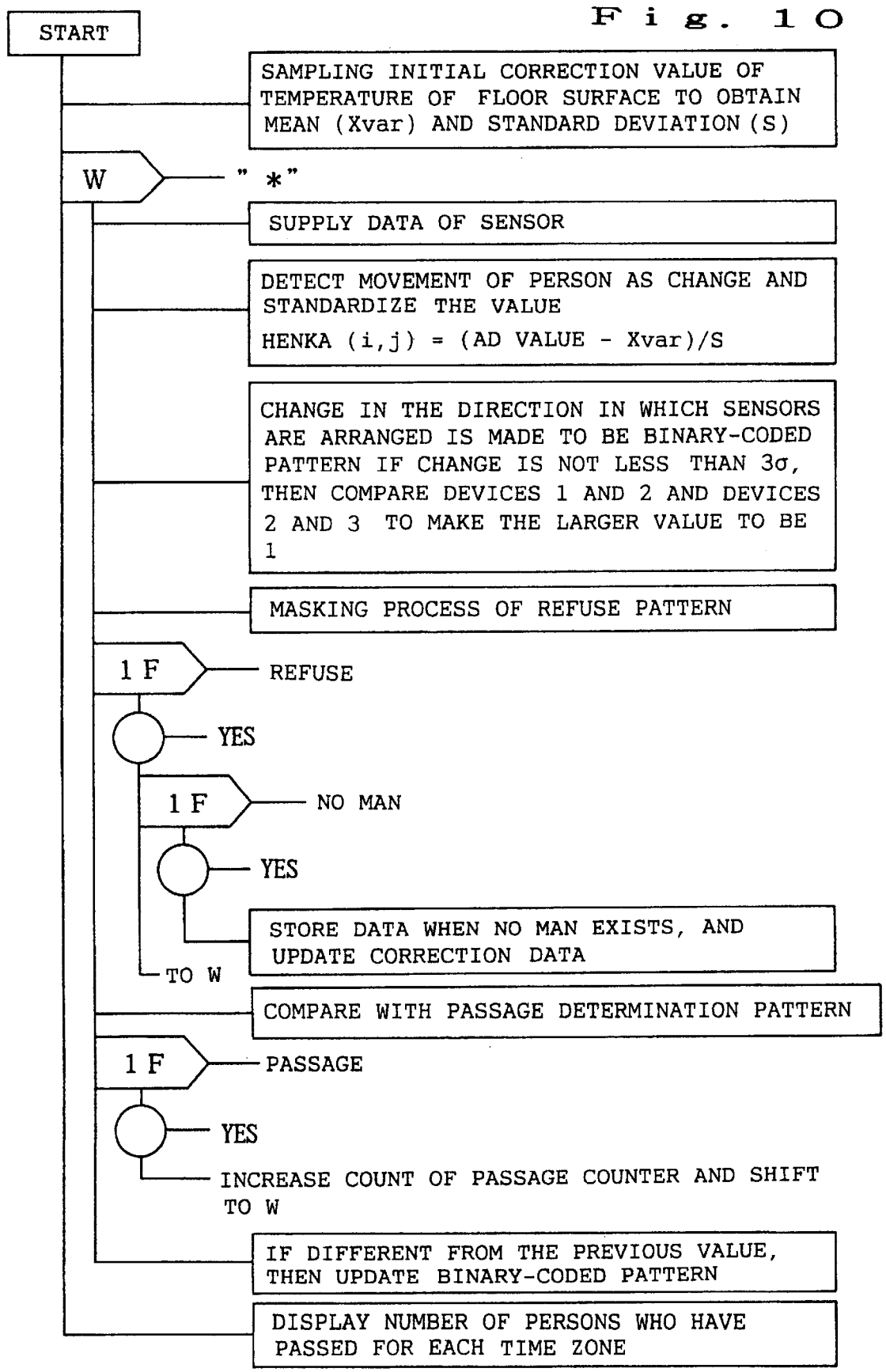
FIG. 10 is a flow chart showing the operation of another embodiment of the movement pattern recognizing apparatus according to the present invention.

FIG. 10 is a flow chart of the operation of a fourth embodiment of the movement pattern recognizing apparatus according to the present invention. The structure and operation of the movement pattern recognizing apparatus according to this embodiment are similar to those of the embodiment described with reference to FIGS. 1 to 9 and different from the same lies in a method of processing a refuse pattern which will be described below. The memory of the signal processing circuit 22 shown in FIG. 2 stores a plurality of refuse data items which are data items that cannot be obtained from generation of normalized data of the movement signal shown in FIG. 6.

A method of using the refuse pattern will now be described. The temperature of the floor surface, which is the background, is sampled for a predetermined time to calculate the mean value and standard deviation of the temperature of the floor surface. The mean value and standard deviation are stored in the memory of the signal processing circuit 22. The storage operation is performed such that updating to a newly calculated mean value and standard deviation is performed if no human body exists in the detection region during a predetermined sampling period.

The mean value and standard deviation are used with (Numerical Formula 1) so that the change rate (HENKA) of each of the signals obtained from the plural pyroelectric devices is calculated for each chopping from the AD value obtained due to supply from each of the plural pyroelectric devices of the infrared array sensor.

In the case where the rate of change is three times or larger than the standard deviation, the rates of change of adjacent pyroelectric devices in the infrared array sensor are compared. The larger rate of change is made to be 1 so that a binary process is performed.

If data corresponding to the refuse pattern is contained in the binary-coded data, the data is deleted as refuse. Data corresponding to the refuse pattern is in the form of, for example, (000) (010) (000), in which only "1" abruptly appears. In the foregoing case, refuse deletion is automatically performed and cancellation is performed.

Figure 11:
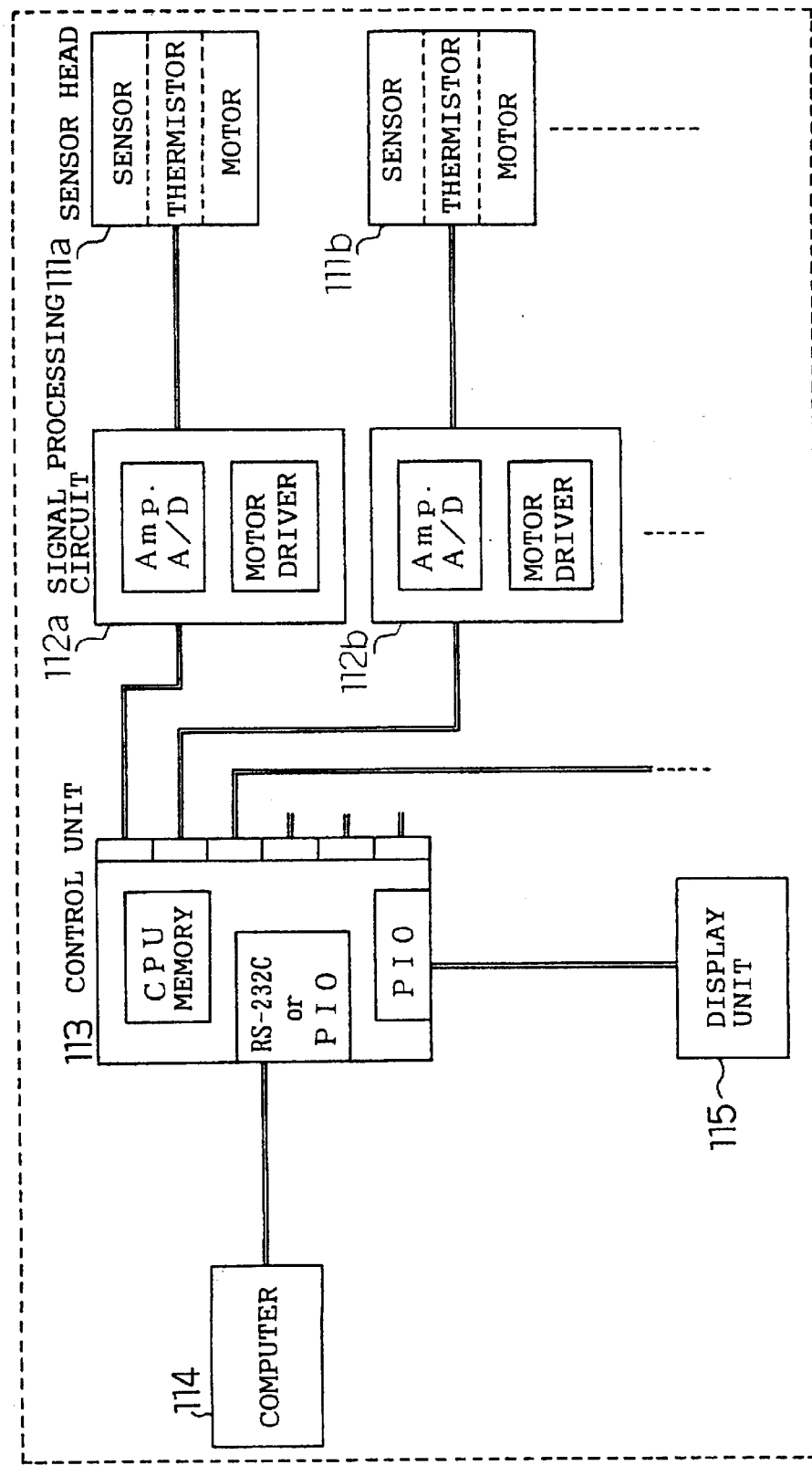
FIG. 11 is a structural view showing another embodiment of the movement pattern recognizing apparatus according to the present invention.

FIG. 11 is a structural view showing a fifth embodiment of the movement pattern recognizing apparatus according to the present invention. Each of sensor heads (111a, 111b, . . . ,), which are the plural movement signal detection means, comprises the sensor shown in FIG. 1. The outputs from respective sensor heads are supplied to the corresponding signal processing circuits (112a, 112b, . . . ,). Each of the signal processing.circuits includes the amplifying circuit (indicated as "Amp." shown in FIG. 11), the A/D converter (indicated as "A/D" shown in FIG. 11) and a motor driver. The outputs from the sensor heads supplied to the respective signal processing circuits are amplified by the corresponding amplifying circuits, and then supplied to the A/D converters so as to be converted into digital signals (AD values). The digital signals are supplied to a control unit 113 having a CPU, a memory and so forth so as to be subjected to a calculation process in the CPU and the memory and so forth. Thus, the movement pattern of the moving heat generating body using the infrared line sensor of the sensor head which has detected the signal as the reference is recognized. The result of recognition is transmitted from RS-232C or PIO to a computer 114 or transmitted from the PIO to a display unit 115.

A program for performing the calculation process (its flow chart will be described later), has been stored in a semiconductor memory, such as a ROM or a memory card, or a disk memory, such as a hard disk, a magneto-optic disk or a floppy disk. Also data and the like to which a reference is made in the calculation process and which has been previously generated, has been stored in a semiconductor memory, such as a ROM or a memory card, or a disk memory, such as a hard disk, a magneto-optic disk or a floppy disk. The memory of the signal processing circuit 113 is a main storage memory for loading the program, and is the foregoing memory.

The CPU of the signal processing circuit 113 which activates the program corresponds to the movement signal. normalizing means, the movement pattern selection means and the movement pattern recognizing means of the movement pattern recognizing apparatus according to the present invention. The memory of the signal processing circuit 113 corresponds to the movement pattern storage means, the refuse data storage means and the reference temperature storage means for use in the present invention.

Figure 12:
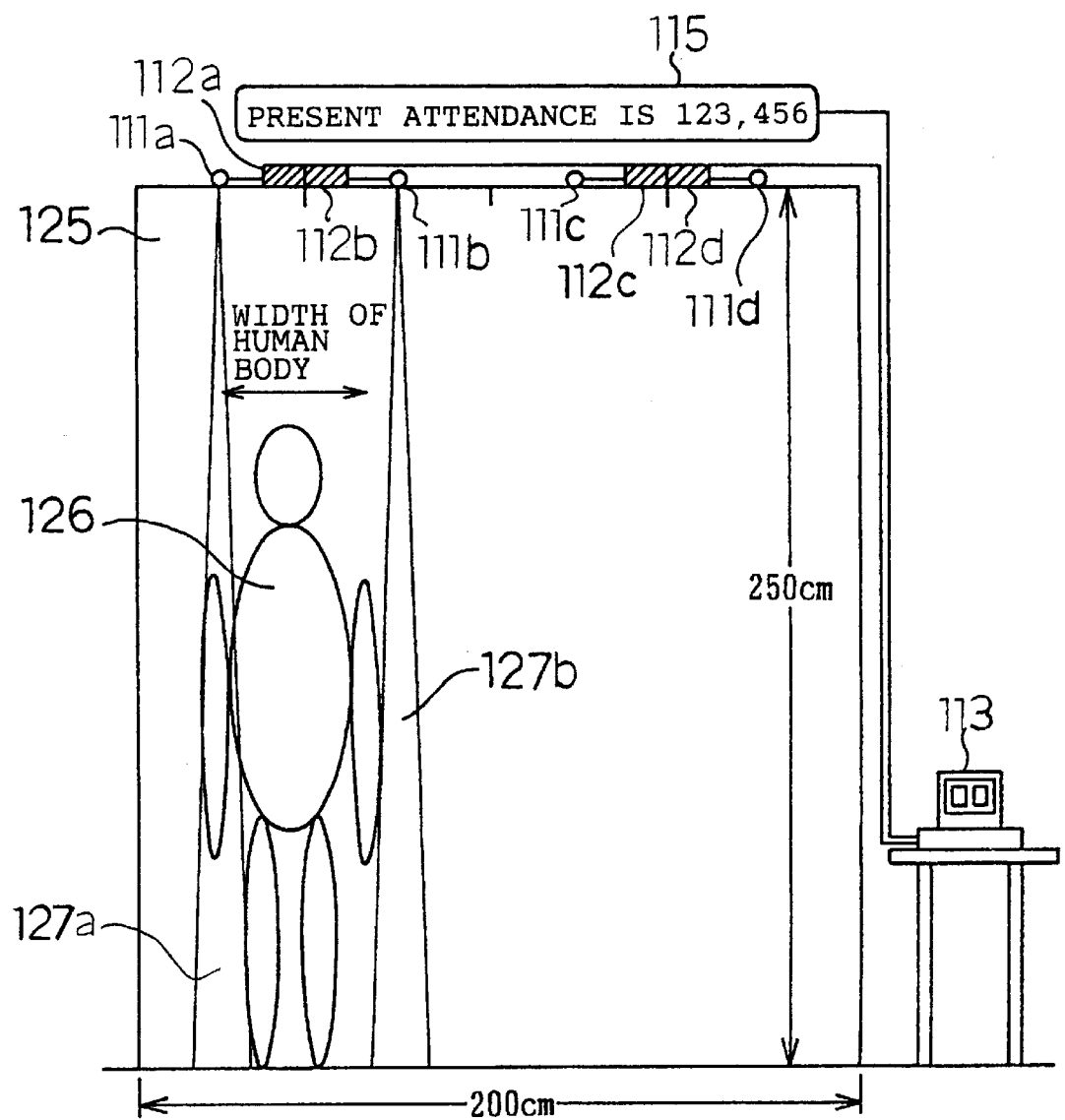
FIG. 12 is a diagram showing a state where sensor heads according to the embodiment are disposed in an upper portion of the doorway of a room.

FIG. 12 is a diagram showing a state where the sensor heads according to this embodiment are disposed in the upper portion of the doorway of a room. Four sensor heads (111a, 111b, 111c and 111d) are disposed in the upper portion of a relatively wide doorway having a width of about 200 cm and a height of about 250 cm so as to be disposed perpendicular to. the direction of passage of a human body 126, apart from one another for certain distances, to always face the floor surface in such a manner that the direction of configuration of a plurality of pyroelectric devices constituting each infrared array sensor of the sensor heads runs parallel to the direction of passage of the human body. If the angle of incident on the sensor head is 6°, a detection region 127a or 127b is made as illustrated. Thus, even if a human body 126 pass the outer end of the region, detection can satisfactorily be performed.

The process according to this embodiment will now be described. The temperature of the floor surface, which is the background which is being always detected, is sampled for a predetermined time to calculate the mean value and standard deviation of the temperature of the floor surface. The mean value and standard deviation are stored in the memory of the control unit 113 shown in FIG. 11. The storage operation is performed such that updating to a newly calculated mean value and standard deviation is performed if the human body 126 exists in the detection region during a predetermined sampling period.

The mean value and standard deviation are used with (Numerical Formula 1) so that the change rate (HENKA) of each of the signals obtained from the plural pyroelectric devices is calculated for each chopping from the AD value obtained due to supply from each of the plural pyroelectric devices constituting the infrared array sensor of each sensor head.

In the case where the rate of change is three times or larger than the standard deviation, the rates of change of adjacent pyroelectric devices in the infrared array sensor are compared. The larger rate of change is made to be 1 so that a binary process is performed.

In accordance with the binary-coded data obtainable as described with reference to FIGS. 6 and 7, data about various movement patterns when a human body passes through the detection region is previously generated and stored in the memory of the signal processing circuit 113 shown in FIG. 11.

An actual movement pattern detected by the infrared array sensor and processed as described above is subjected to a comparison with the various movement patterns stored in the memory so that data about the subject movement pattern is selected.

In accordance with data about the selected movement pattern, the movement pattern of the human body is recognized. That is, if information about the movement direction and the number of passages in the direction is included in data about the movement pattern, the number and direction, that is, the number of moved persons can be recognized. In this embodiment, the movement pattern recognizing apparatus recognizes the number of persons who have entered by a doorway 125 and the number of the same who have left the same.

As described above, the foregoing method enables human bodies, who enter a room or a building, and whose temperature distribution is irregular, to easily be detected with a low cost. Thus, the number of persons who have passed the doorway can accurately and reliably be counted and the number of persons who exist in the room can be displayed.

Figure 13:
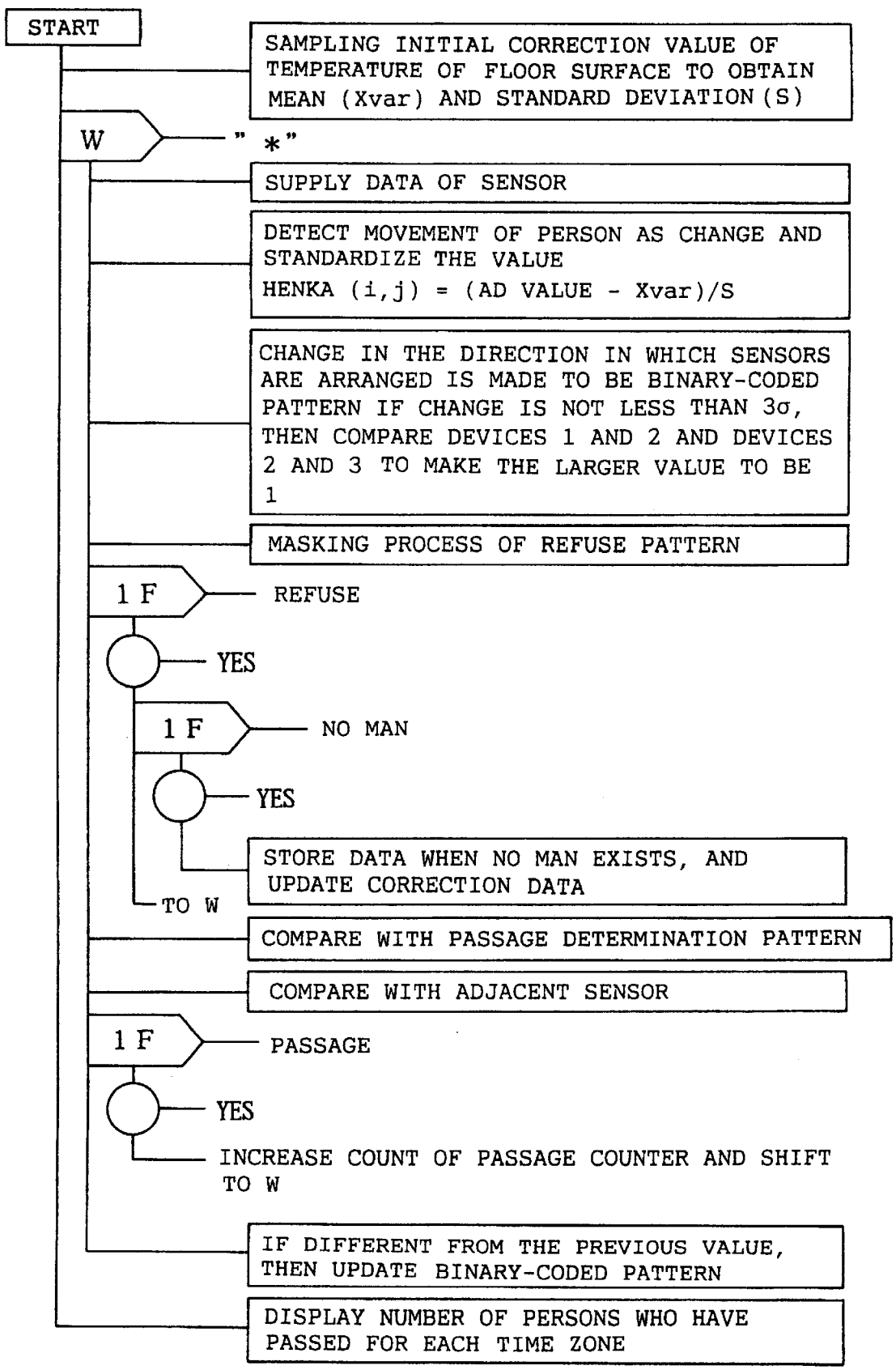
FIG. 13 is a flow chart of the operation of another embodiment of the movement pattern recognizing apparatus according to the present invention.

FIG. 13 is a flow chart of the operation of a sixth embodiment of the movement pattern recognizing apparatus according to the present invention. The structure of the movement pattern recognizing apparatus according to this embodiment is similar to that of the embodiment described with reference to FIG. 11 except a plurality of movement signals from a plurality of sensor heads being considered when the process is performed.

The process according to this embodiment will now be described.

The temperature of the floor surface which is the background which is being always detected is sampled for a predetermined time so that the mean value (Xvar) and the standard deviation (S) of the temperature of the floor surface are calculated. The mean value and the standard deviation are stored in the memory of the control unit 113 shown in FIG. 11. The storage operation is performed such that if a human body does not exist in each detection region during a predetermined time for sampling, updating to newly calculated mean value and standard deviation is performed.

The mean value and standard deviation are used with (Numerical Formula 1) so that the change rate (HENKA) of each of the signals obtained from the plural pyroelectric devices is calculated for each chopping from the AD value obtained due to supply from each of the plural pyroelectric devices constituting the infrared array sensor of each sensor head.

In the case where the rate of change is three times or larger than the standard deviation, the rates of change of adjacent pyroelectric devices in the infrared array sensor are compared. The larger rate of change is made to be 1 so that a binary process is performed.

If data corresponding to the refuse pattern is contained in the binary-coded data, the data is deleted as refuse. The memory of the control unit 113 stores a plurality of refuse data items which are data items that cannot be obtained from the binary-coded process.

In accordance with the thus-obtained binary-coded data, data about various movement patterns when a human body passes through the detection region is previously generated and stored in the memory of the control unit 113. An actual movement pattern detected by the infrared array sensor of each sensor head and processed as described above is subjected to a comparison with the various movement patterns stored in the memory so that data about the subject movement patterns is selected.

By totally determining data about the movement pattern selected by each sensor head, the number of persons who have passed the detection region is detected. In an example case shown in FIG. 12, if outputs simultaneously appear at the sensor heads 111a and 111b, or if an output appears at the sensor head 111a or 111b, a determination is performed that only one person has passed the detection region. If outputs simultaneously appear at the sensor heads 111a and 111d, a determination is performed that two persons have passed the detection region.

As described above, according to this embodiment, the persons who enter a room or a building can easily be detected even through a wide doorway. Thus, the number of persons who have passed the doorway can accurately and reliably be counted, and the number of persons existing in the room can be displayed.

Figure 14:
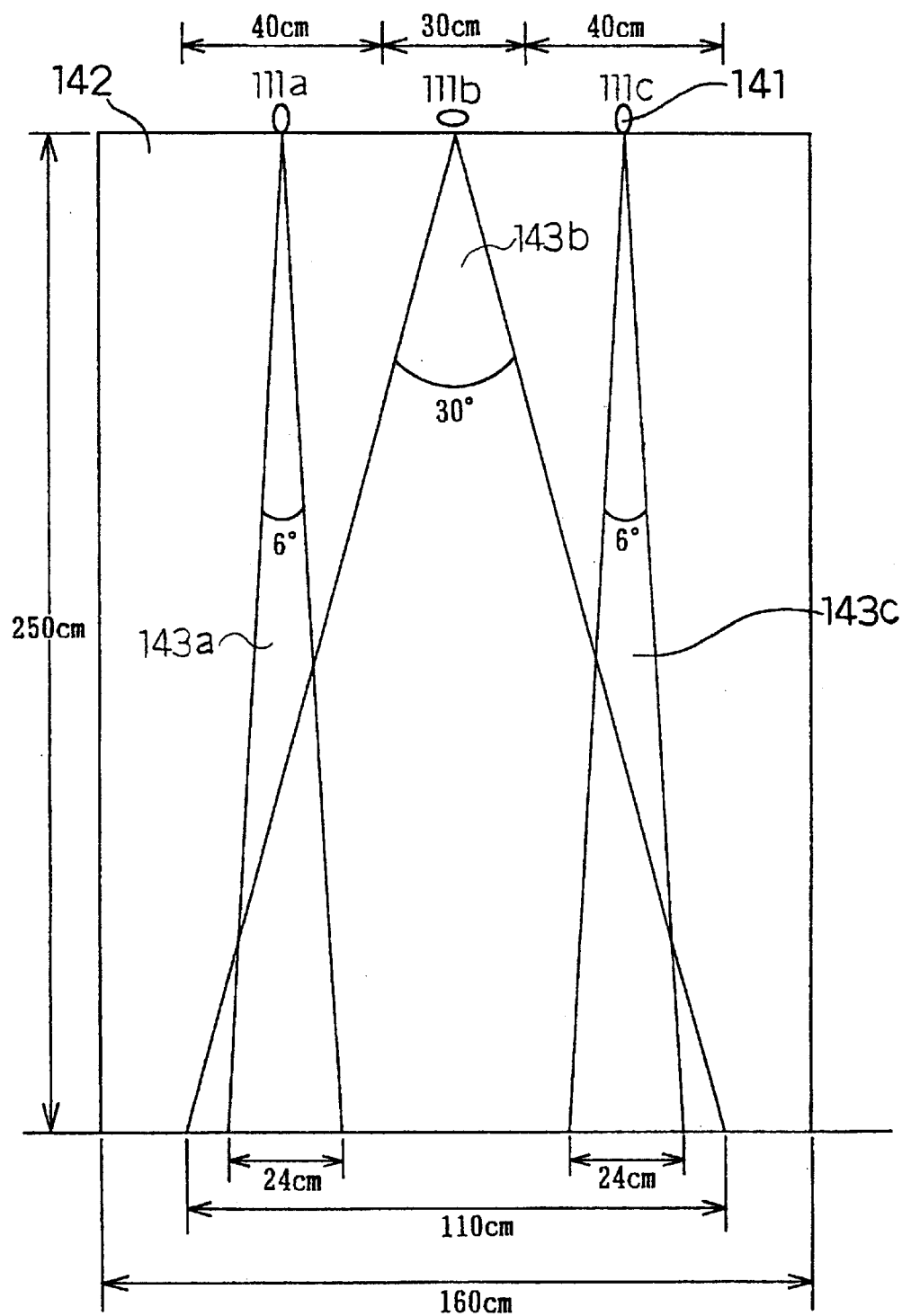
FIG. 14 is a structural view showing another embodiment of the movement pattern recognizing apparatus according to the present invention.

FIG. 14 is a structural view showing an seventh embodiment of the movement pattern recognizing apparatus according to the present invention. The structure of the movement pattern recognizing apparatus according to this embodiment is similar to that described with reference to FIG. 11. As shown in FIG. 14, three sensor heads (111a, 111b and 111c) are disposed in the upper portion of a relatively wide doorway having a width of 160 cm and a height of 250 cm so as to be disposed perpendicular to the movement direction of the human body while being apart from one another for predetermined intervals to be caused to always face the floor surface. Moreover, the sensor heads (111a and 111c) at the two ends are disposed in such a manner that their infrared array sensors are in parallel to the movement direction of the human body, and the central sensor head 111b is disposed perpendicularly. By disposing the sensor heads as described above, detection regions (143a, 143b and 143c) of the infrared array sensors are realized as illustrated. If the angle of incident for each of the sensor heads (111a and 111c) at the two ends is 6°, detection regions (143a and 143c) are realized as illustrated. Therefore, even if a human body has passed the outermost end, the human body can satisfactorily be detected.

The process according to this embodiment will now be described.

Initially, the temperature of the floor surface, which is the background which is being always detected, is sampled for a predetermined time to calculate the mean value and standard deviation of the temperature of the floor surface. The mean value and standard deviation are stored in the memory of a control Unit 113 shown in FIG. 11. The storage operation is performed such that updating to a newly calculated mean value and standard deviation is performed if no human body exists in the detection region during a predetermined sampling period.

The mean value and standard deviation are used with (Numerical Formula 1) so that the change rate (HENKA) of each of the signals obtained from the plural pyroelectric devices is calculated for each chopping from the AD value obtained due to supply from each of the plural pyroelectric devices of the infrared array sensor.

In the case where the rate of change is three times or larger than the standard deviation, the rates of change of adjacent pyroelectric devices in the infrared array sensor are compared. The larger rate of change is made to be 1 so that a binary process is performed.

In accordance with binary-coded data obtainable as described with reference to FIGS. 6 and 7, data about various movement patterns realized when a human body moves in the detection region has been generated and stored in the memory of the control unit 113.

An actual movement pattern detected by the infrared array sensor of each sensor heads (111a, 111b and 111c) and processed as described above is subjected to a comparison with the various movement patterns stored in the memory so that data about the subject movement pattern is selected.

By totally determining data about the movement pattern selected by each sensor head, the number of persons who have passed the detection region is detected. That is, in the detection region 143b of the sensor head 111b including the detection regions (143a and 143c) of the sensor heads (111a and 111c) at the two ends, the number of persons who have passed the detection region is determined. Moreover, the sensor heads (111a and 111c) at the two ends detect the movement direction and the number of persons who have passed the detection region. An assumption is performed that the number of pyroelectric device constituting each of the infrared array sensors of the three sensor heads (111a, 111b and 111c) is eight. In a case where the sensor head 111b has detected a human body with not more than three pyroelectric devices, one person is counted who has passed the detection region even if the sensor heads (111a and 111c) at the two ends simultaneously detect a human body. In a case where the sensor head 111b has detected human bodies with four to six pyroelectric devices, two persons are counted.

The foregoing method enables human bodies to be reliably and accurately detected and the number of persons who have passed the detection region to be determined. The conventional ratio of detecting the number of persons who have passed the detection region, which has been about 80%, could be improved to 95% or higher.

Although the foregoing embodiment has the structure. such that the sensor head has the infrared array sensor consisting of the plural pyroelectric devices, the structure is not limited to this. The sensor may be a supersonic sensor or a radar sensor. The necessity lies in that the movement signal detection means is able to detect the direction of a mobile body which moves in a predetermined region.

Although the sensor head according to the embodiment has the chopper 14, the chopper shaft 15 and the brushless motor 16, omission of the chopper 14, the chopper shaft 15 and the brushless motor 16 from the structure is permitted because the movement signal detection means according to the present invention is required to only detect the moving human body.

Figure 3:
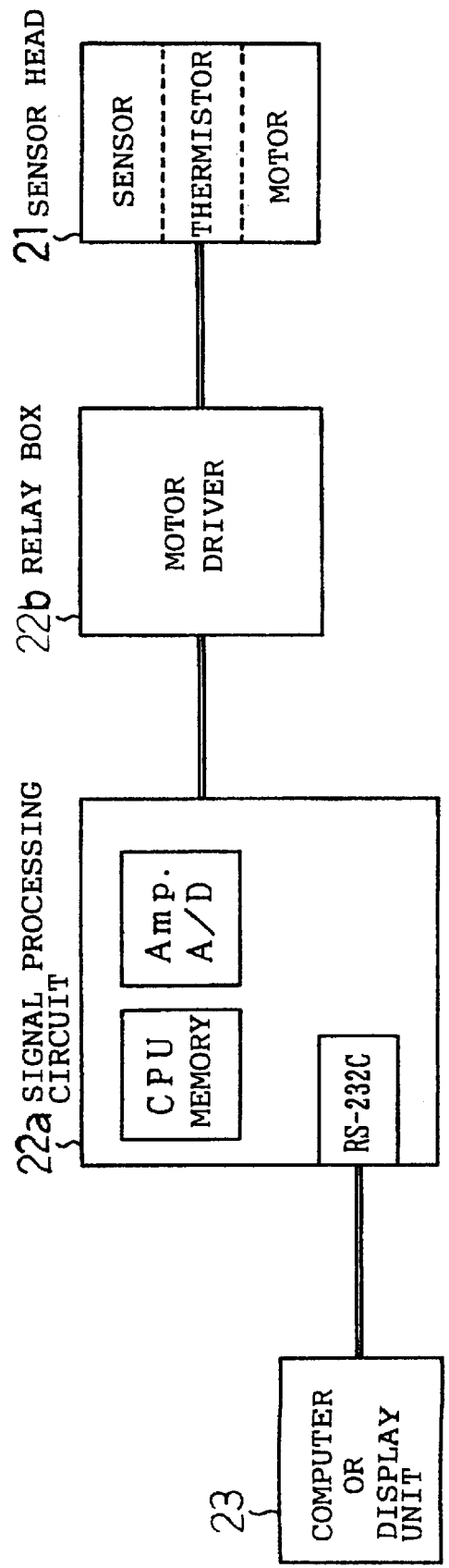
FIG. 3 is a structural view showing a state where a portion of the embodiment shown in FIG. 2 is changed.

Although the embodiment has the signal processing circuit 22 shown in FIG. 2 which comprises the motor driver, the structure is not limited to this. As shown in FIG. 3, a separated structure may be employed which consists of a signal processing circuit 22a and a relay box 22b having the motor driver. Another structure may be employed in which the relay box 22b is included in the sensor head 21.

Although the embodiment has the structure such that the temperature of the floor surface is employed to serve as the reference when the rate of change is calculated, the reference is not limited to this. The temperature of a wall surface may be employed.

Although the embodiment has the structure such that the normalized data of the movement patterns is generated by using the three pyroelectric devices as described with reference to FIGS. 6, 7 and 9, the structure is not limited to this. Assuming that the infrared array sensor is composed of n pyroelectric devices, 2 to n pyroelectric devices may be employed to generate the normalized data of the movement patterns.

[Effect of the Invention]

As can be understood from the description, the movement pattern recognizing apparatus according to the present invention attains an effect capable of recognizing the movement patterns of mobile bodies. As an alternative to this, an effect of recognizing the movement patterns of a moving heat generating bodies can be obtained.

According to the present invention, addition of various information items to data about the movement patterns stored in the movement pattern storage means enables an apparatus capable of adaptable to various requirements to be provided. If the movement directions and the number of passages are added for example, persons who enter or leave a room or a building can be detected. Moreover, an advantage can be realized in that an apparatus can be provided in which measurement of the number of persons who have passed the detection region enables an accurate number of attendance and the number of persons who exists in the room to be detected.

According to the present invention, a structure in which the infrared array sensor of the movement signal detection means is disposed to be capable of converging infrared rays from the floor surface enables change in the temperature of the floor surface to always be fed back. Therefore, even if the temperature of the floor surface is changed, the mean value can be allowed to follow the change. Since the movement signal detection means uses the mean value and the standard deviation to detect the heat generating body, an effect can be obtained in that detection can be performed even if the heat generating body is a low-temperature body, the temperature of which is low.

According to the present invention, an effect can be obtained in that if mobile bodies or heat generating bodies successively pass the detection region, they can accurately be detected.

In the present invention, a refuse pattern formed in a case where the movement signal detection means has not reliably detected a mobile body or a heat generating body is deleted so that an effect is obtained in that accurate detection can be performed even if low-temperature bodies and high-temperature exist mixedly.

According to the present invention, a movement pattern recognizing apparatus can be obtained with which a compact system can be realized, the cost of which can be reduced, and which exhibits significant accuracy and reliability. Thus, the number of persons who exist in the room can immediately be detected.

According to the present invention, an error in detection can be prevented as has been experienced with the case where a conventional sensor is employed. Thus, human bodies and the number of persons who have passed the detection region can be detected accurately and reliably.

In the embodiment, the algorithm requiring a very simple program is employed so that human bodies are accurately detected with a low cost while substantially preventing an error in detection even if human bodies successively pass the detection region or the same pass while overlapping.

According to the present invention, human bodies can be detected and the number of persons who exist in a room can be counted easily, accurately and reliably. As a result, a great contribution to constituting a comfortable intelligent building can be made.

Further embodiments of the other present invention will now be described with reference to the drawings.

A schematic perspective view of a sensor head having a pyroelectric-type infrared array sensor attached thereto and according to the eighth embodiment of the present invention is similar to the one of FIG. 1. Referring to FIG. 1, a pyroelectric device 11 is composed of eight elements. The sensor head consists of the pyroelectric device 11, an infrared-ray transmissive lens 13 and a chopper 14. The chopper 14 is disposed to face the front surface of a lens to intermittently interrupt infrared rays made incident upon the infrared lens 13. The chopper 14 is able to mechanically and continuously rotate by a brushless motor 16 and a chopper shaft 15, the chopper 14 having a considerably compact size.

The applicant of the present invention has established a sensor for detecting the number of passed persons and a system having the same which comprises of a sensor head of the foregoing type and which is able to detect the moving direction of the human beings and the number of passed persons. In order to further accurately measure and count the moving direction and the number of passed persons, an apparatus to which a new method adaptable to the foregoing sensor system is applied is provided according to the present invention.

An example of a hardware structure to be employed when the moving direction is detected by using the foregoing sensor head is shown in FIGS. 2 and 3. Referring to FIGS. 2 and 3, a sensor head 21, a relay box 22b and a signal processing circuit 22 are operated to determine the moving direction and to display the direction on a computer serving as a means for measuring the number of passed persons or a display unit 23. In this case, the relay box may be included in the signal processing circuit 22, as shown in FIG. 2. By employing the foregoing hardware structure, an actual arrangement in the upper portion of a doorway of room is shown in FIG. 4. A sensor head 21 is disposed in the upper portion of the central portion of a usual doorway 44 having a width of about 100 cm and a height of about 220 cm to be capable of always looking at the floor in such a manner that the direction of the arrangement of the sensor array is in parallel to the passing direction. Moreover, entrance and exeunt are displayed on the computer of the display unit 23 through the signal processing circuit 22. If the angle of incident on the sensor is 6°, a detection region 46 is formed as shown in FIG. 4. Thus, even if a human body 45 passes the outer end of the region, detection can satisfactorily be performed.

Figure 15:
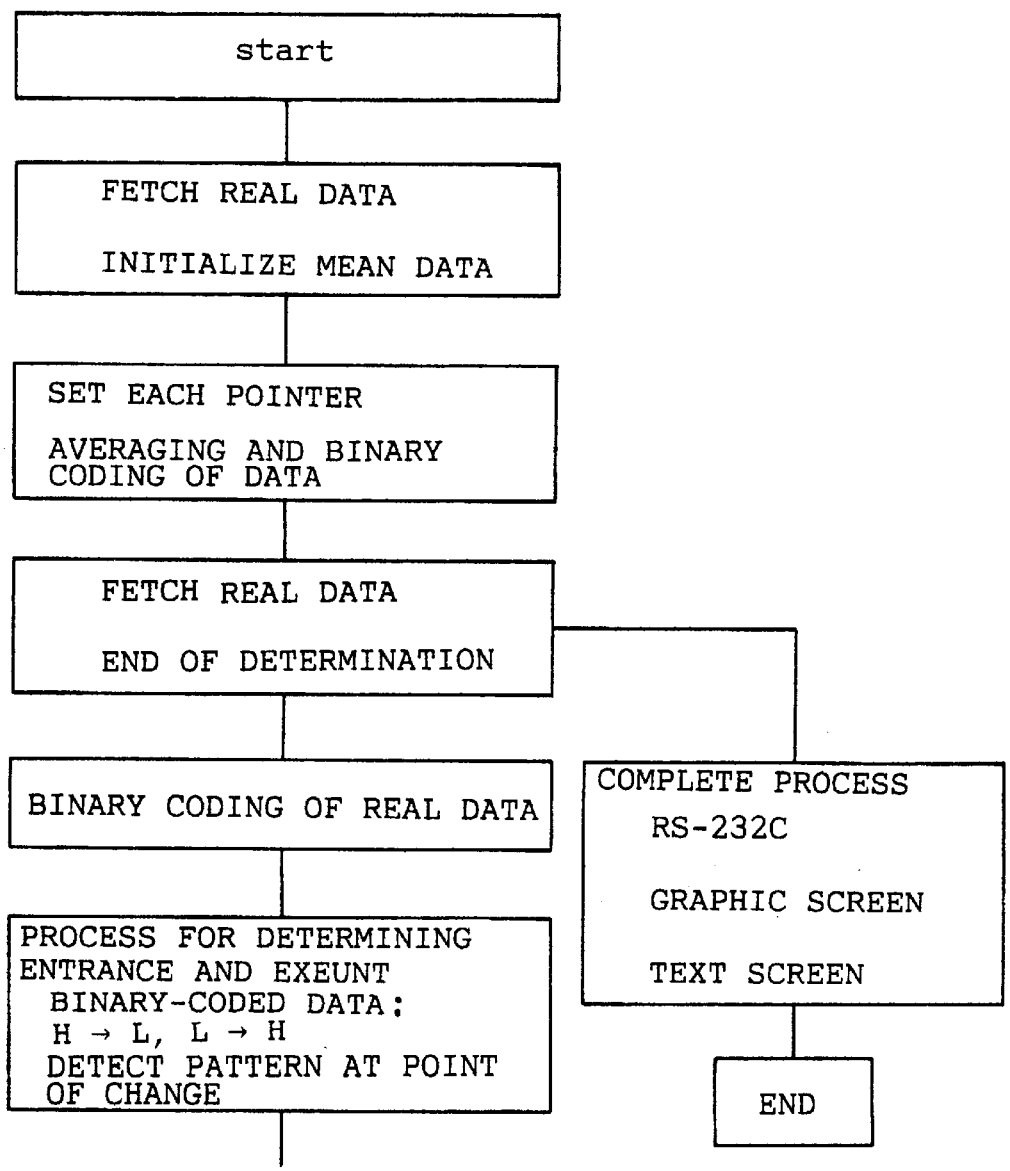
FIG. 15 is an overall flow chart according to the eighth embodiment.

An overall flow chart for detecting the moving direction is shown in FIG. 15. An analog signal transmitted from the infrared sensor for each step for each chopping motion is processed through the signal processing circuit so as to be converted into a digital output value. When the moving direction of the human body is obtained in accordance with the digital value, the temperature of the floor surface, which is the background, is sampled for a certain period of timer followed by averaging the sampled values, and followed by using the obtained value as a reference. Then, upper and lower limit thresholds are set to respectively have certain margins from the reference, followed by performing a binary coding process. If the digital output value is larger than the upper limit of the threshold or if the same is smaller than the lower limit, existence of a human body is determined. By determining movement of the digital output value larger than the upper limit of the threshold or smaller than the lower limit between the devices of the infrared array sensor, the moving direction, entrance and exeunt of human bodies are detected and determined. That is, in the signal processing circuit serving as a threshold setting means, a signal change detection means and a determining means, the upper and lower limit thresholds are set in accordance with the detected temperature of the floor surface, and the threshold is used as a reference to detect the leading edge in the upward direction and trailing edge in the downward direction with respect to the upper limit threshold are detected so as to determine movement of human bodies in accordance with a result of the detection and by using a predetermined rule. Although both leading edge and the trailing edge of the detected value are employed to perform the determination, either of the leading edge or the trailing edge of the detected value may be employed to perform the determination if an error in detection does not substantially occur in the detected value.

Figure 16:
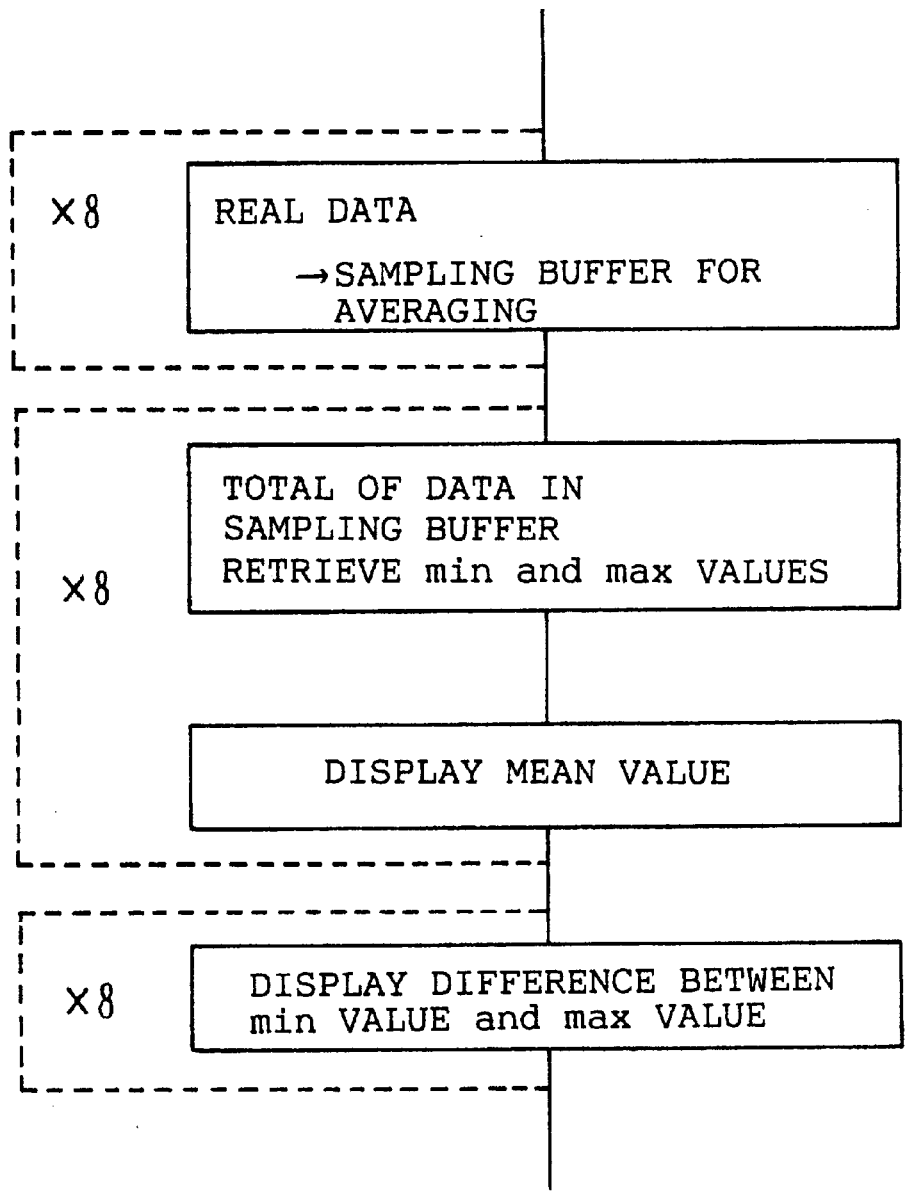
FIG. 16 is a flow chart of a process for averaging the background temperature according to the eighth embodiment.
Figure 17:
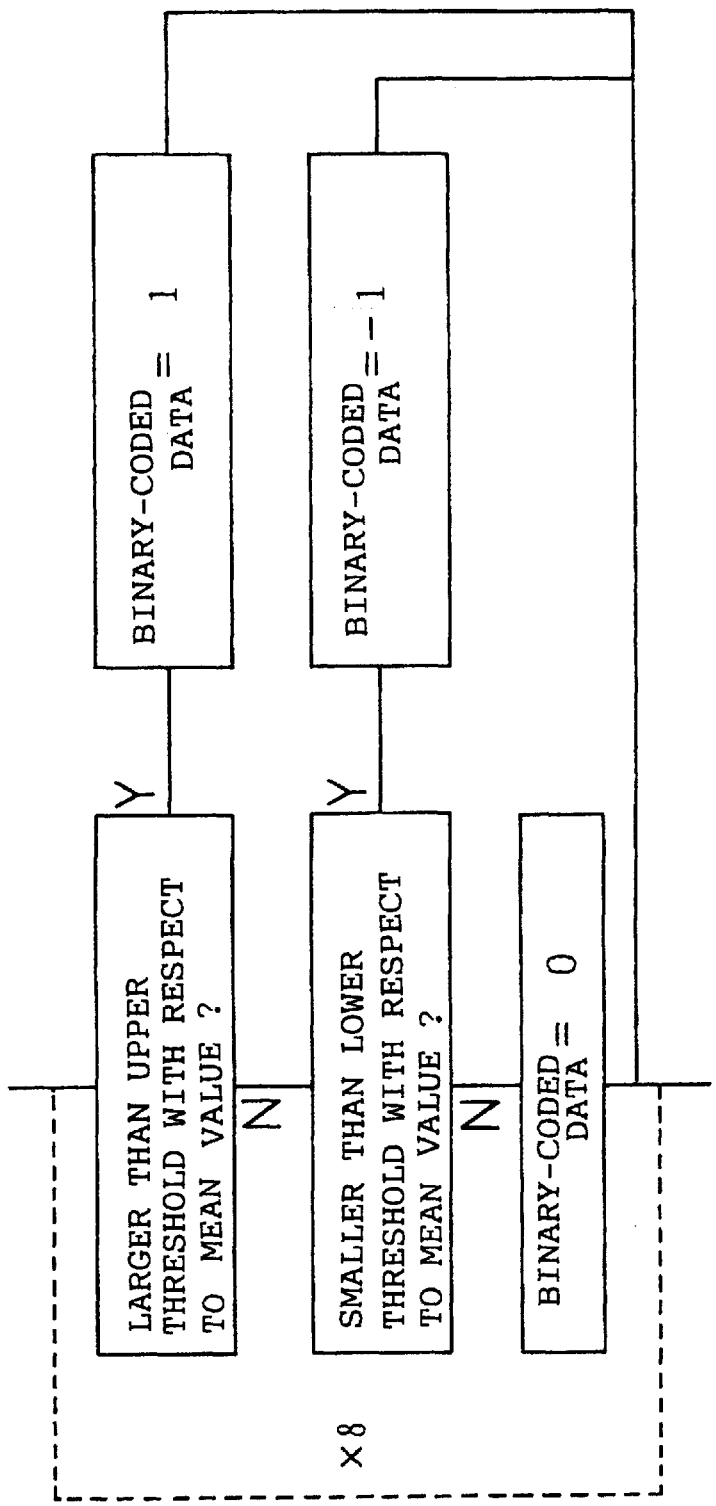
FIG. 17 is a flow chart of a binary coding process of digital data according to the eighth embodiment.
Figure 18:
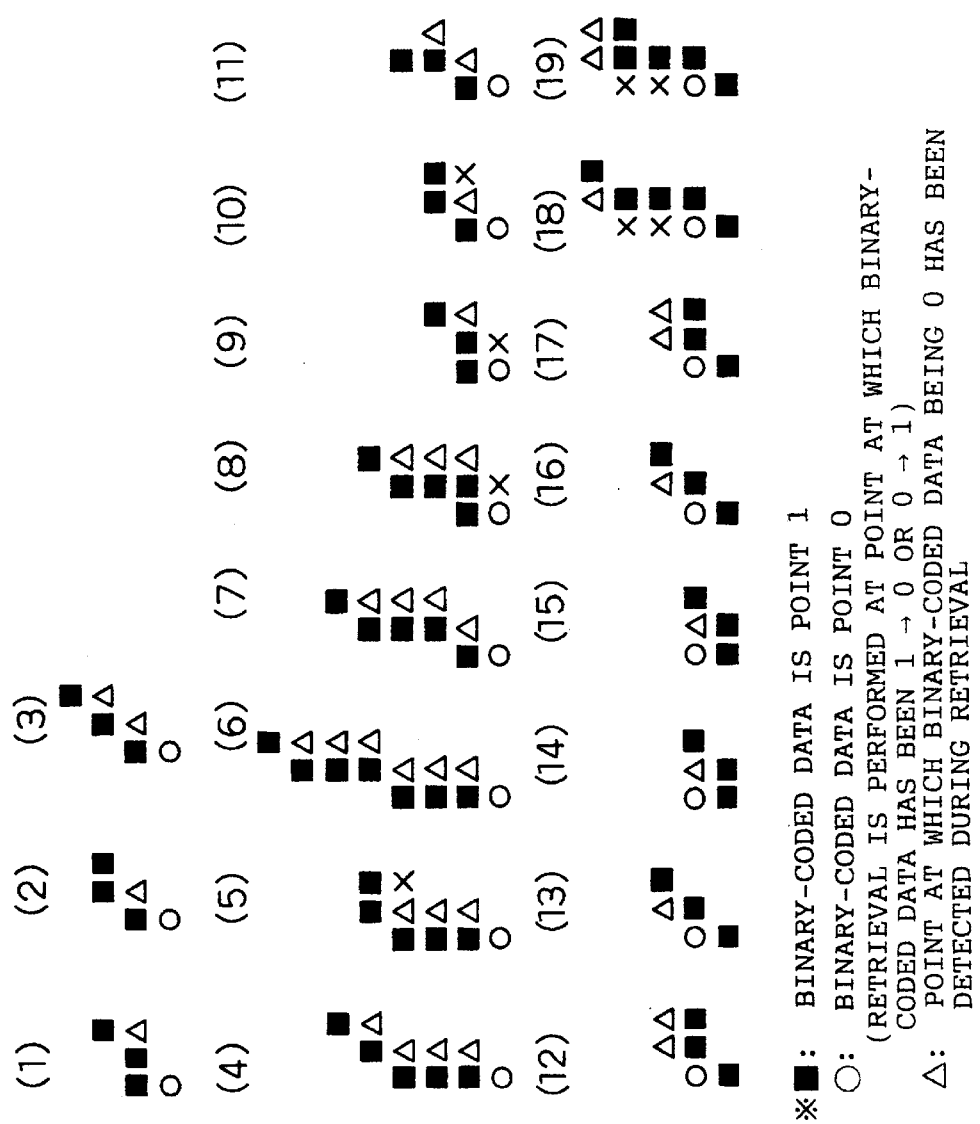
FIG. 18 is a diagram showing an example of binary-coded data according to the eighth embodiment with which the moving direction can be detected.

FIG. 16 is a flow chart of the background averaging process. FIG. 17 is a flow chart of a process for binary coding digital output data. Referring to FIG. 17, if the value is larger than the upper limit threshold, 1 is given as binary-coded data, if the value is smaller than the lower limit threshold, –1 is given as the binary-coded data, and 0 is given in the other cases. Obtained specific examples are shown in FIG. 18. FIG. 18 shows an example of binary-coded data for detecting the moving direction. The horizontal direction stands for the devices, while the vertical direction stands for the chopping steps. Square symbols in solid black represent points at which binary coded data is 1 or –1, while white circles represent points at which binary-coded data is 0. As illustrated, if 1 or –1 points are successively moved over three or more devices, the moving direction can be determined. When the background temperature is sampled for a certain period of time and then the values are sampled to obtain a reference, the obtained reference is required to be maintained without updating if an output value larger than the set upper limit or an output value smaller than the lower limit is detected, that is, during a period in which a human body is detected.

The foregoing method enabled human bodies to be detected reliably and accurately, and moving direction to be determined. Thus, the conventional detectable rate of the moving direction of about 90% could be raised to 99% or higher.

As described above, according to this embodiment, the pyroelectric infrared sensor of a fixed type and having the wide angle lens and the chopper is disposed in the central portion in the upper portion of a doorway of a room or a passage of a building. Thus, persons who have entered the room or the building can easily be detected. Thus, the moving direction can be detected accurately and reliably.

An apparatus for detecting the number of passed persons according to a ninth embodiment of the present invention will now be described with reference to the drawings.

Since a sensor head according to this embodiment is similar to that shown in FIG. 1, it is omitted from description. Although the hardware structure to detect the number of passed persons by using the sensor head is basically similar to that shown in FIG. 2 or FIG. 3, this embodiment has an additional function capable of detecting the number of persons existing in, for example, a room by measuring the number of persons who have passed through the detection area of the sensor head in each of the moving directions. The number of passed persons is counted by the sensor head 21, the relay box 22b and the signal processing circuit 22 to display the number on the computer or the display unit 23. A state where the sensor is displayed in the upper portion of the doorway of the room is similar to the shown in FIG. 4. The computer or the display unit 23 displays the number of entrance, exeunt and the number of persons existing in the room.

Figure 19:
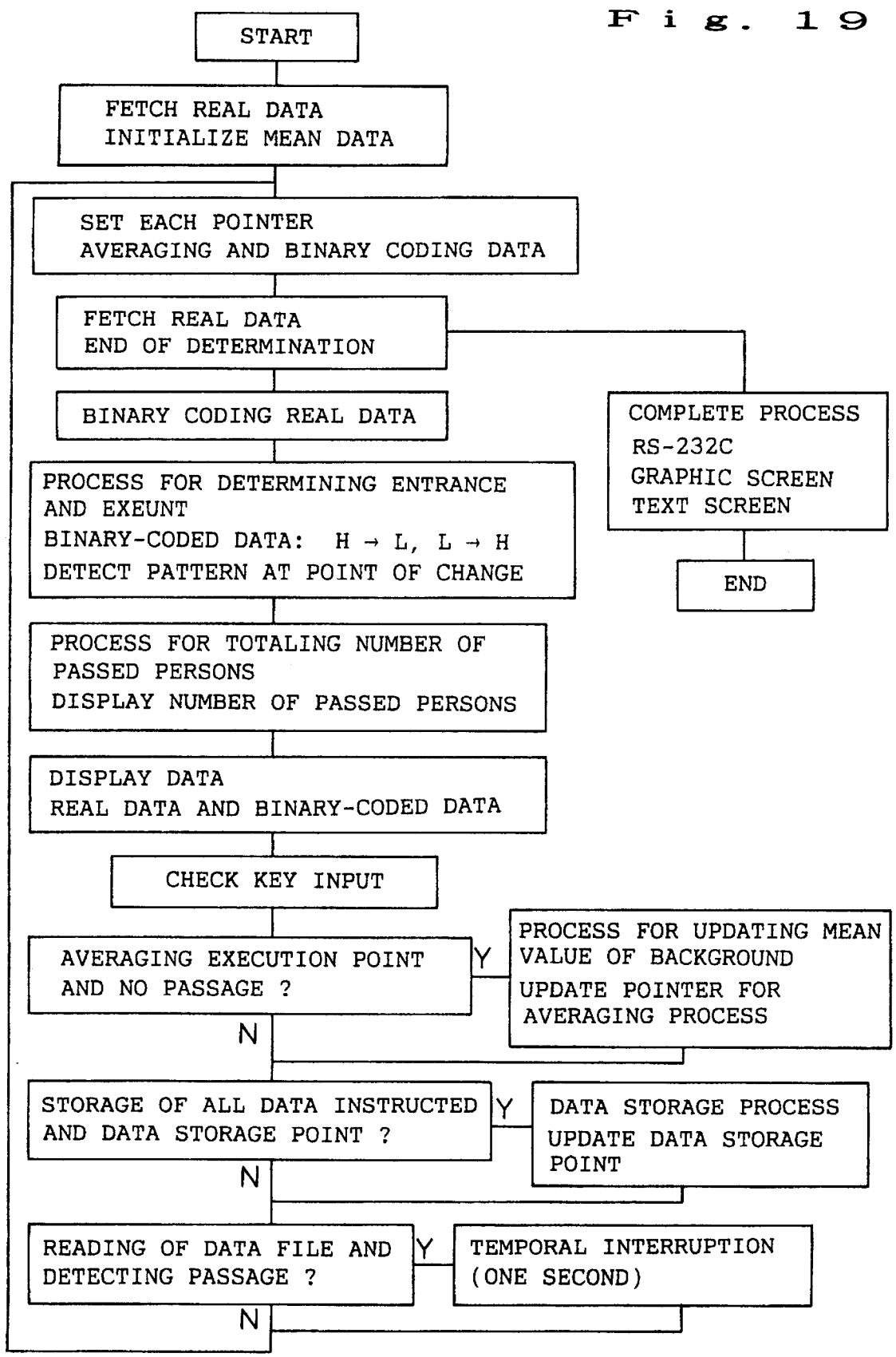
FIG. 19 is an overall flow chart for the apparatus for detecting the number of passed persons according to a nineth embodiment of the present invention.

An overall flow chart for detecting the number of paused human bodies is shown in FIG. 19. An analog signal transmitted from the infrared sensor for each step for each chopping motion is processed through the signal processing circuit so as to be converted into a digital output value. When the number of paused human bodies is obtained in accordance with the digital value, the temperature of the floor surface, which is the background, is sampled for a certain period of time, followed by averaging the sampled values as shown in FIG. 16, and followed by using the obtained value as a reference. Then, upper and lower limit thresholds are set to respectively have certain margins from the reference, followed by performing a binary coding process as shown in FIG. 17. If the digital output value is larger than the upper limit of the threshold or if the same is smaller than the lower limit, existence of a human body is determined. By determining movement of the digital output value larger than the upper limit of the threshold or smaller than the lower limit between the devices of the infrared array sensor, the moving directions of human bodies are detected and determined.

In this embodiment, smaller number of the determined numbers of entrance and exeunt persons at a position at which L is changed to H and at a position at which H is changed to L among steps (H) determined to be the human bodies and steps (L) determined not to be the human bodies is employed in accordance with the threshold. After passage of human bodies has been completed, the number of entrance and exeunt persons is sorted, and the maximum value counted from two or more devices is employed so that the number of passed human bodies is detected.

Figure 20:
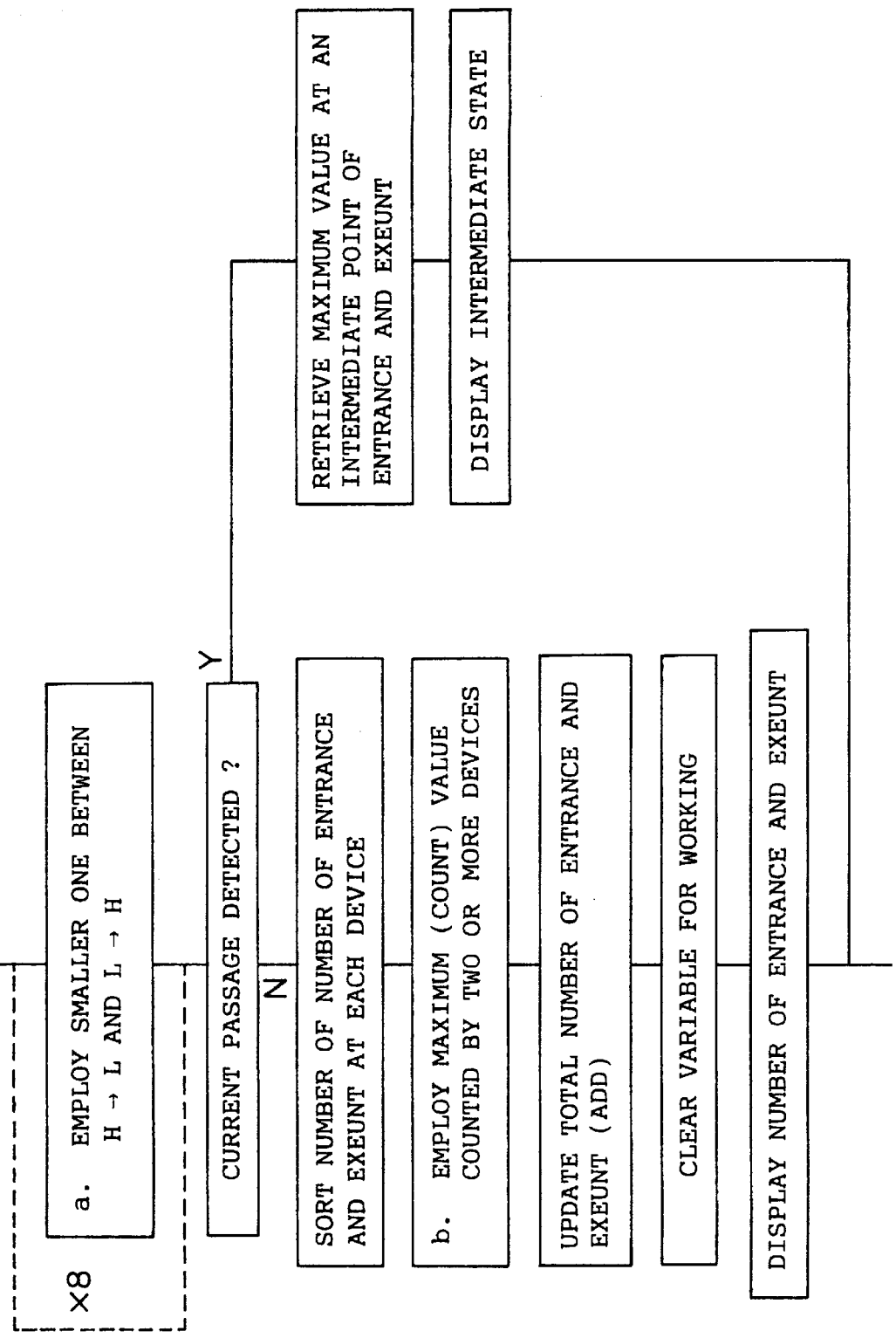
FIG. 20 is a flow chart of a process for detecting and totaling the number of passed persons according to the nineth embodiment.

FIG. 20 shows a flow chart for detecting and totaling the number of passed persons adapted to the apparatus for detecting the number of passed persons. FIG. 21 shows specific example of the number of entrance and exeunt persons who have passed the detection area and a result of totaling operation. The entrance and the exeunt is determined at the change points (L→H, H→L) of the binary-coded data for each device. If passage is determined, the count of the counter is increased. The determination of the entrance and the exeunt is, as shown in FIG. 18, performed such that, if 1 or –1 point square symbols in solid black are successively moved over three devices while having the illustrated relationship with the symbol O which is the 0 point, the moving direction can be determined and the number of passed persons at the device can be detected. Even if the result of retrieval is affirmative, cancellation is performed in a case where the binary-coded data at the position X is 1. Then, retrieval of another pattern configuration is performed.

Figure 22:
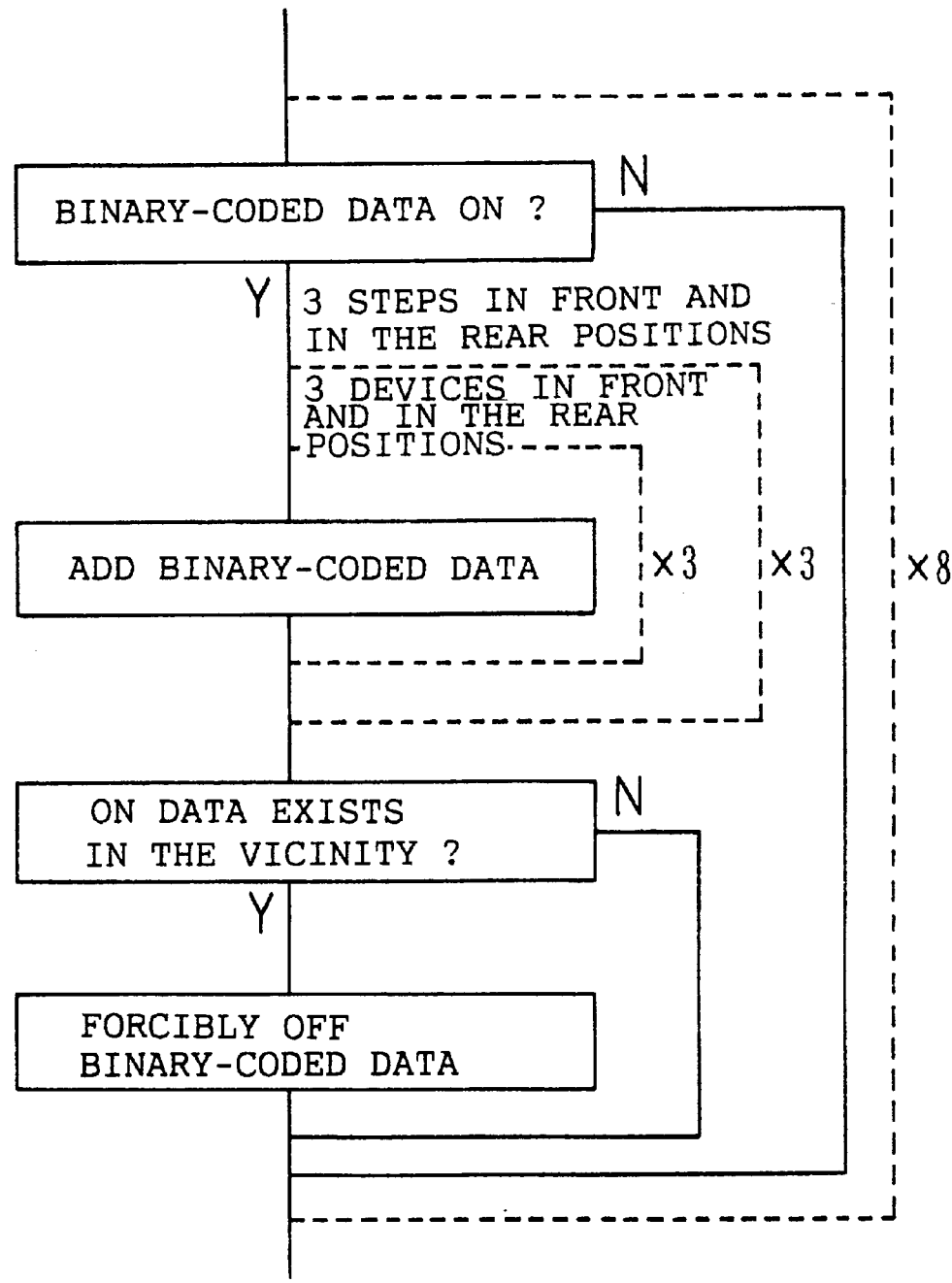
FIG. 22 is a flow chart of a process for deleting refuse of binary-coded data according to the nineth embodiment.
Figure 23:
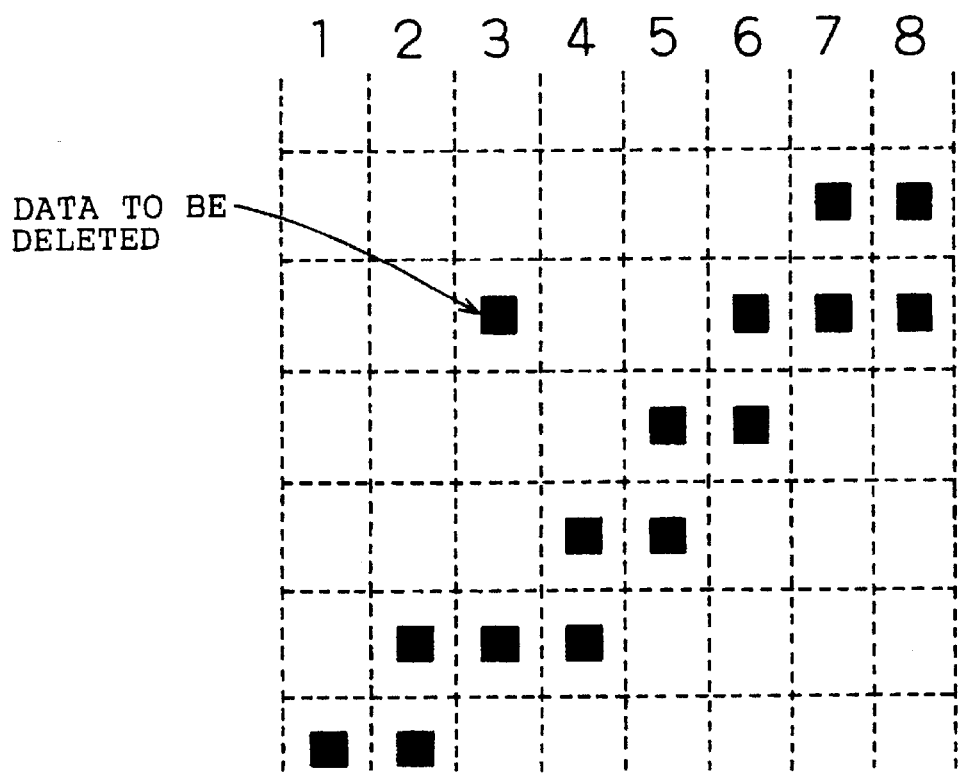
FIG. 23 is a diagram showing a specific example of the process for deleting refuse in the binary-coded data according to the nineth embodiment.

FIG. 22 shows a flow chart for deleting refuse in binary-coded data for the apparatus for detecting the number of passed persons. FIG. 23 shows a specific example of a process for deleting refuse from the binary-coded data. The horizontal direction of FIG. 23 stands for the positions of the devices 1 to 8, that is, positions of human bodies, while the vertical direction of the same stands for the chopping steps.

With the foregoing figures, if the digital output value is larger than the upper limit of the threshold or if the same is smaller than the lower limit, existence of the human body is determined. However, if the two adjacent devices and each of the forward and behind steps has not detected the existence of the human body, the position at which the human body exists is forcibly deleted. That is, even if the binary-coded data is ON, it is forcibly OFF (deleted) if the surround portions are OFF. Thus, noise and refuse generating in the case where the S/N ratio is unsatisfactory can be deleted.

As a result of the foregoing methods, the human beings can reliably and accurately be detected, the moving direction can be determined, and the number of passed persons can be counted. Thus, conventional detectable rate of the number of passed persons of about 80% could be raised to 95% or higher.

As described above, according to this embodiment, the pyroelectric infrared sensor of a fixed type and having the wide angle lens and the chopper is disposed in the central portion in the upper portion of a doorway of a room or a passage of a building. Thus, persons who have entered the room or the building can easily be detected. Thus, the number of passed persons can be detected accurately and reliably.

An apparatus for detecting the number of passed persons according to a tenth embodiment of the present invention will now be described with reference to the drawings.

The structure of a sensor head is similar to that shown in FIG. 1, and a state where the sensor head is disposed in the upper portion of the doorway of a room is similar to that shown in FIG. 4.

Similarly to the eighth embodiment, an analog signal for each step for each chopping motion is processed through the signal processing circuit so as to be converted into a digital output value. When the number of paused human bodies is obtained in accordance with the digital value, the temperature of the floor surface, which is the background, is sampled for a certain period of time, followed by averaging the sampled values as shown in FIG. 16, and followed by using the obtained value as a reference. Then, upper and lower limit thresholds are set to respectively have certain margins from the reference, followed by performing a binary coding process as shown in FIG. 7. If the digital output value is larger than the upper limit of the threshold or if the same is smaller than the lower limit, existence of a human body is determined. By determining movement of the digital output value larger than the upper limit of the threshold or smaller than the lower limit between the devices of the infrared array sensor, the moving directions of human bodies are detected and determined.

Figure 24:
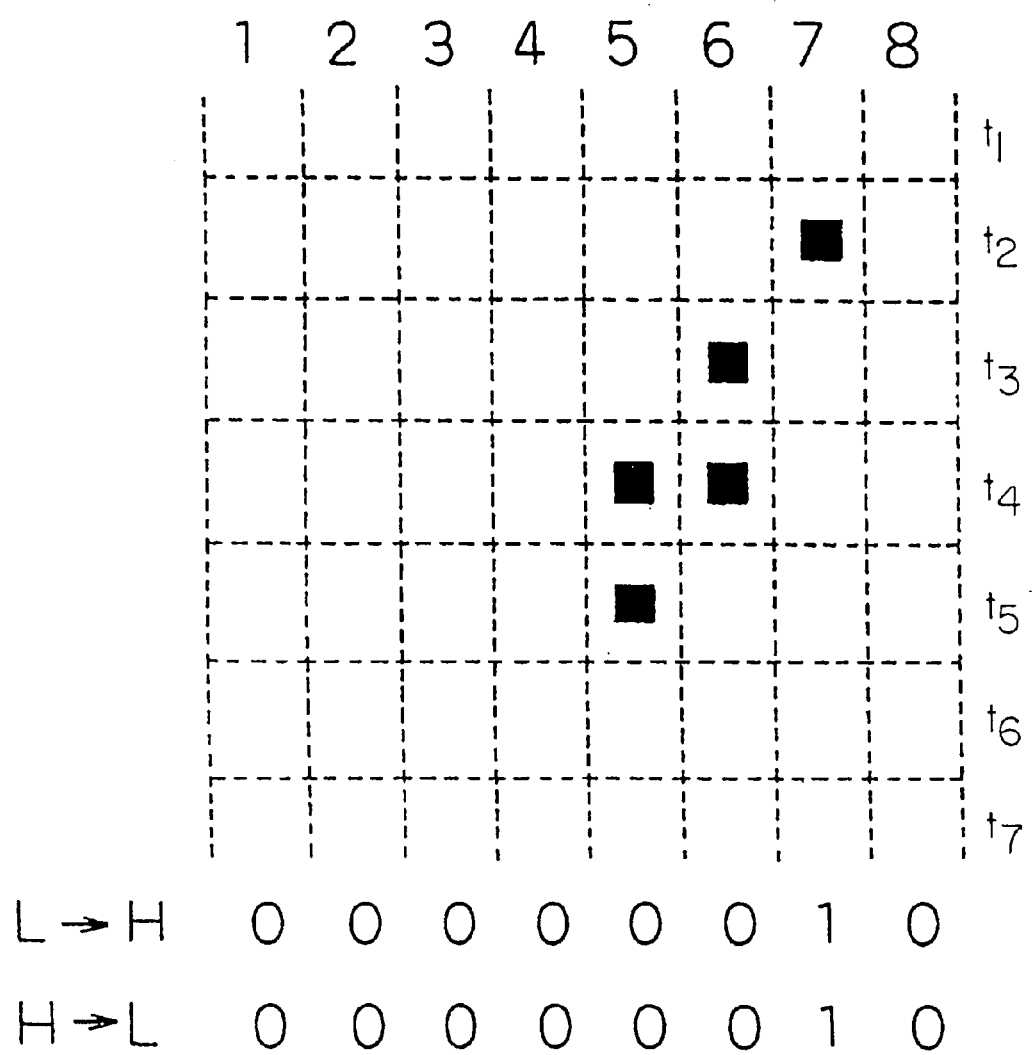
FIG. 24 is a diagram showing a specific example of an apparatus for detecting the number of passed persons according to a tenth embodiment of the present invention which is capable of detecting the number of passed persons.

In this embodiment, smaller number of the determined numbers of entrance and exeunt persons at a position at which L is changed to H and at a position at which H is changed to L among steps (H) determined to be the human bodies and steps (L) determined not to be the human bodies is employed. After passage of human bodies has been completed, the number of entrance and exeunt persons is sorted. If only one device has counted one person, passage of one person is determined and, thus, the number of passed persons is detected. FIG. 24 shows a specific example of detected number of passed persons. As a result, even a human body which has not completely passed through all detection regions can satisfactorily be detected.

As described above, according to this embodiment, the pyroelectric infrared sensor of a fixed type and having the wide angle lens and the chopper is disposed in the central portion in the upper portion of a doorway of a room or a passage of a building. Thus, persons who have entered the room or the building can easily be detected. Thus, the number of passed persons can be detected accurately and reliably. Moreover, the number of persons existing a room can be displayed.

An apparatus for detecting the number of passed persons according to an eleventh embodiment of the present invention will now be described with reference to the drawings.

The structure of a sensor head is similar to that shown in FIG. 1, and a state where the sensor head is disposed in the upper portion of the doorway of a room is similar to that shown in FIG. 4.

Similarly to the eighth embodiment, an analog signal for each step for each chopping motion output from the infrared sensor is processed through the signal processing circuit so as to be converted into a digital output value. When the number of paused human bodies is obtained in accordance with the digital value, the temperature of the floor surface, which is the background, is sampled for a certain period of time, followed by averaging the sampled values as shown in FIG. 16, and followed by using the obtained value as a reference. Then, upper and lower limit thresholds are set to respectively have certain margins from the reference, followed by performing a binary coding process as shown in FIG. 17. If the digital output value is larger than the upper limit of the threshold or if the same is smaller than the lower limit, existence of a human body is determined. By determining movement of the digital output value larger than the upper limit of the threshold or smaller than the lower limit between the devices of the infrared array sensor, the moving directions of human bodies are detected and determined.

In this embodiment, if two or more steps (L) determined not to be human bodies exist between steps (H) determined to be the human bodies in accordance with the threshold, an interpolation process for forcibly changing L to H is performed so as to detect the number of passed persons.

Figure 25:
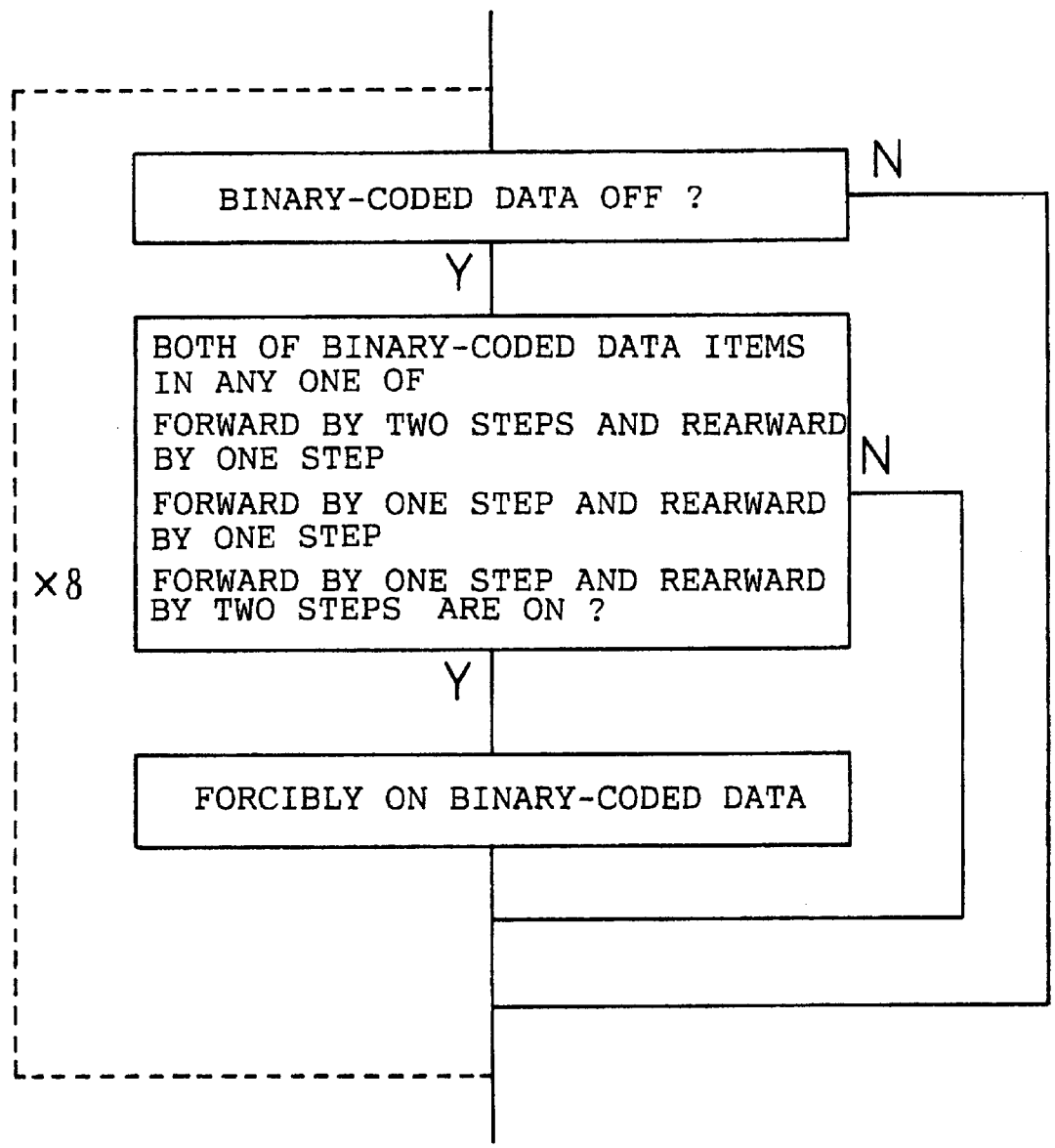
FIG. 25 is a flow chart of an interpolating process for binary-coded data to be performed in the apparatus for detecting the number of passed persons according to a eleventh embodiment of the present invention.
Figure 26:
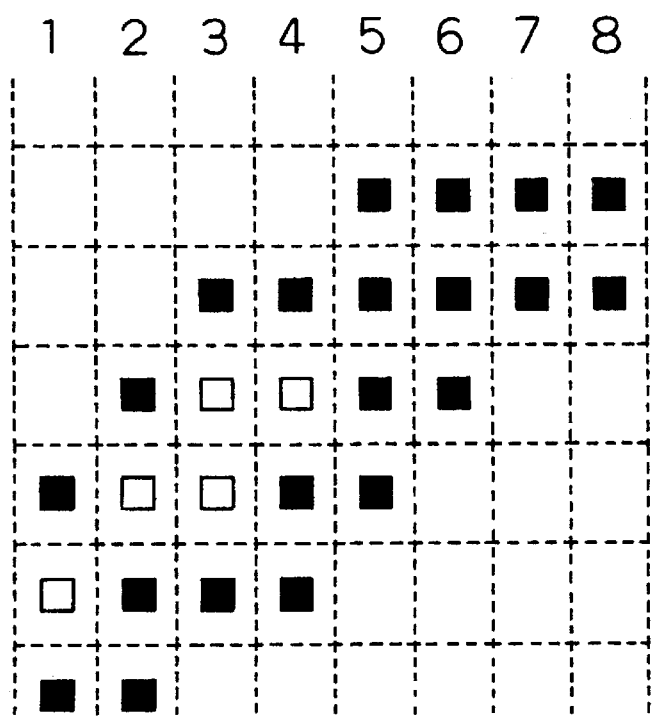
FIG. 26 is a diagram showing a specific example of the interpolating process for binary-coded data according to the eleventh embodiment.

FIG. 25 shows a flow chart of a process for interpolating binary-coded data adapted to the apparatus for detecting the number of passed persons according to this embodiment. FIG. 26 shows a specific example of the process for interpolating binary-coded data. As a result of a process of the foregoing type, a human body having an overcoat in winter, a human body having an irregular temperature distribution and a human body mixedly having a low temperature region and high temperature region is not detected as two persons. Thus, an accurate detection of one person can be performed.

As described above, according to this embodiment, the pyroelectric infrared sensor of a fixed type and having the wide angle lens and the chopper is disposed in the central portion in the upper portion of a doorway of a room or a passage of a building. Thus, a person of a type having irregular temperature distribution can easily be detected. As a result, persons who have entered the room or the building can easily be detected. Thus, the number of passed persons can be detected accurately and reliably. Moreover, the number of persons existing in a room can be displayed.

An apparatus for detecting the number of passed persons according to a twelfth embodiment of the present invention will now be described with reference to the drawings.

The structure of a sensor head is similar to that shown in FIG. 1, and a state where the sensor head is disposed in the upper portion of the doorway of a room is similar to that shown in FIG. 4.

Similarly to the eighth embodiment, an analog signal for each step for each chopping motion output from the infrared sensor is processed through the signal processing circuit so as to be converted into a digital output value. When the number of paused human bodies is obtained in accordance with the digital value, the temperature of the floor surface, which is the background, is sampled for a certain period of time, followed by averaging the sampled values as shown in FIG. 16, and followed by using the obtained value as a reference. Then, upper and lower limit thresholds are set to respectively have certain margins from the reference, followed by performing a binary coding process as shown in FIG. 17. If the digital output value is larger than the upper limit of the threshold or if the same is smaller than the lower limit, existence of a human body is determined. The movement of the digital output value larger than the upper limit of the threshold or smaller than the lower limit between the devices of the infrared array sensor is determined.

In this embodiment, smaller number of the determined numbers of entrance and exeunt persons at a position at which L is changed to H and at a position at which H is changed to L among steps (H) determined to be the human bodies and steps (L) determined not to be the human bodies is employed. After passage of human bodies has been completed, the number of entrance and exeunt persons is sorted, and the maximum value counted from two or more devices is employed so that the number of passed human bodies is detected.

Figure 27:
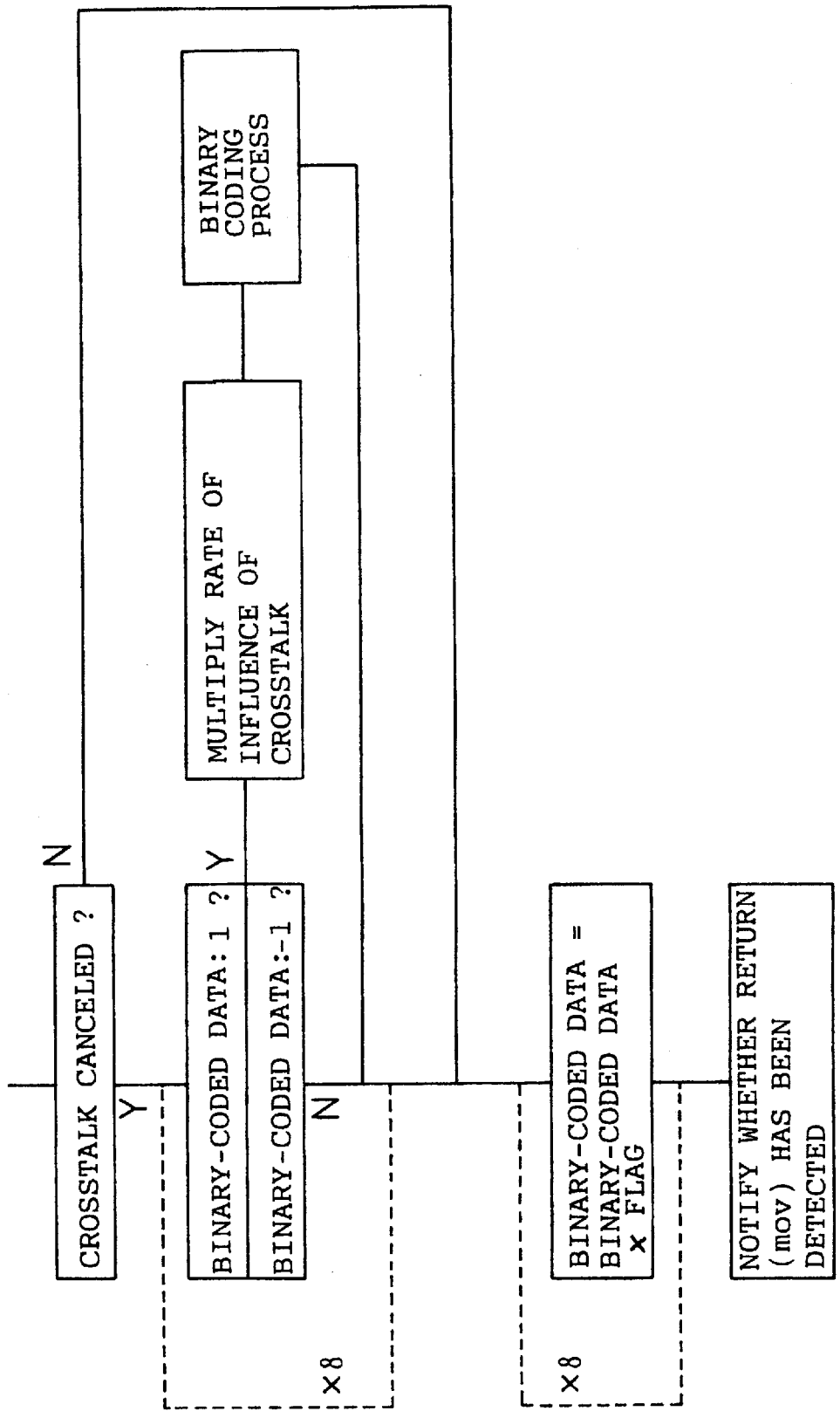
FIG. 27 is a flow chart of a crosstalk process to be performed in the apparatus for detecting the number of passed persons according to a twelfth embodiment of the present invention.

FIG. 27 shows a flow chart of a crosstalk process adapted to the apparatus for detecting the number of passed persons according to this embodiment. As a result of the crosstalk process, digital output value can be corrected even if a great crosstalk is generated between devices. Moreover, since the binary coding process is performed by using the corrected value, the passed human bodies can further accurately be detected.

As described above, according to this embodiment, the pyroelectric infrared sensor of a fixed type and having the wide angle lens and the chopper is disposed in the central portion in the upper portion of a doorway of a room or a passage of a building. Thus, the persons who have entered room or the building can further accurately be detected. Thus, the number of passed persons can be detected accurately and reliably.

An apparatus for detecting the number of passed persons according to a thirteenth embodiment of the present invention will now be described with reference to the drawings.

The structure of a sensor head is similar to that shown in FIG. 1, and a state where the sensor head is disposed in the upper portion of the doorway of a room is similar to that shown in FIG. 4.

Similarly to the eighth embodiment, an analog signal for each step for each chopping motion output from the infrared sensor is processed through the signal processing circuit so as to be converted into a digital output value. When the number of paused human bodies is obtained in accordance with the digital value, the temperature of the floor surface, which is the background, is sampled for a certain period of time, followed by averaging the sampled values as shown in FIG. 16, and followed by using the obtained value as a reference. Then, upper and lower limit thresholds are set to respectively have certain margins from the reference, followed by performing a binary coding process as shown in FIG. 17. If the digital output value is larger than the upper limit of the threshold or if the same is smaller than the lower limit, existence of a human body is determined. In this embodiment, even if the digital output value is larger than the upper limit of the threshold or smaller than the lower limit of the same, determination as a non-human body existence region is forcibly performed in a case where the digital output value has decreased or increased over a certain inclination. The movement of the digital output value larger than the upper limit of the threshold or small than the lower limit of the threshold between the devices of the infrared array sensor is determined so that the moving directions of the human bodies are detected and determined.

Moreover, smaller number of the determined numbers of entrance and exeunt persons at a position at which L is changed to H and at a position at which H is changed to L among steps (H) determined to be the human bodies and steps (L) determined not to be the human bodies is employed. After passage of human bodies has been completed, the number of entrance and exeunt persons is sorted, and the maximum value counted from two or more devices is employed so that the number of passed human bodies is detected.

Figure 28:
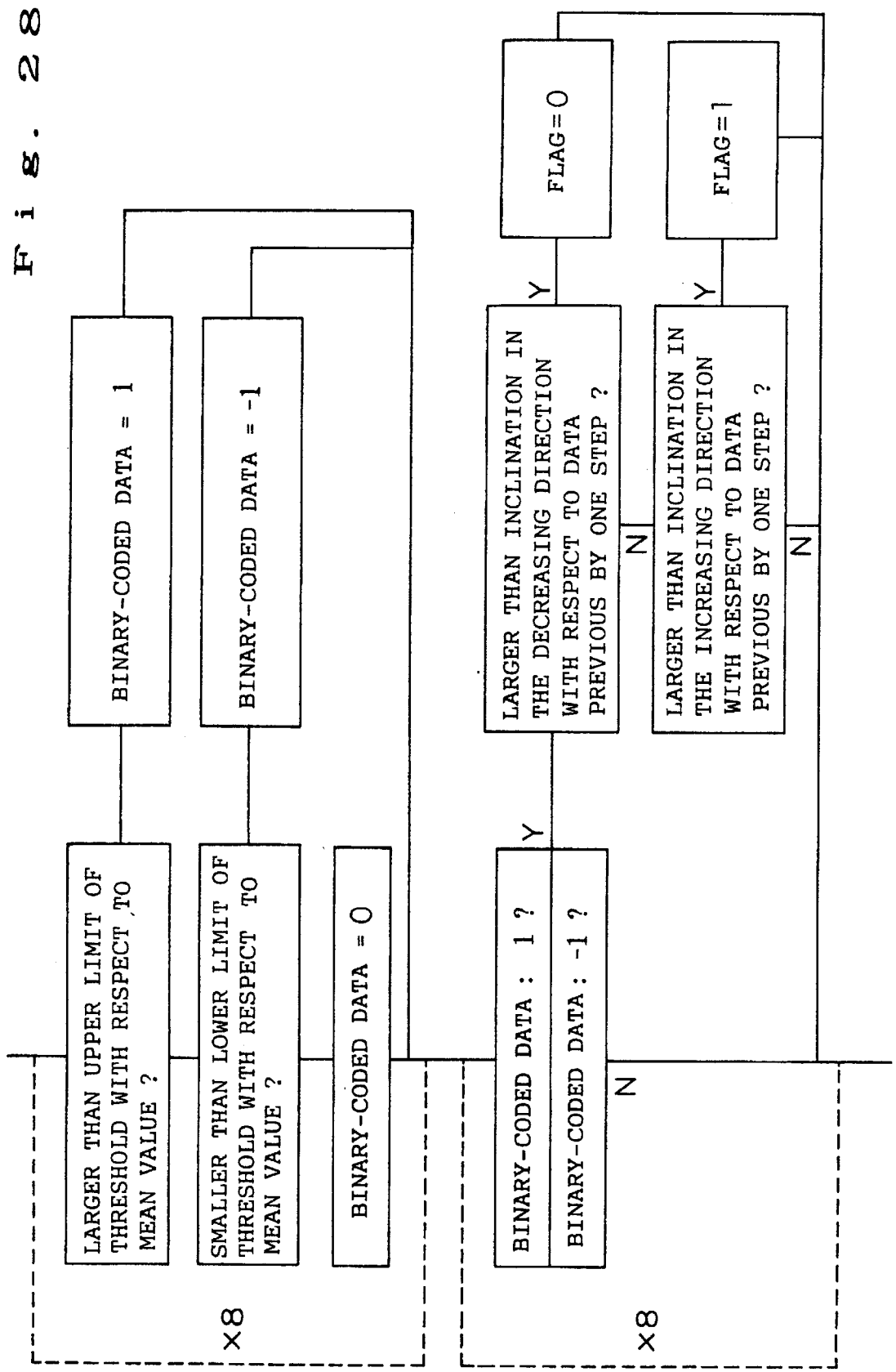
FIG. 28 is a flow chart of a binary coding process of real data in the apparatus for detecting the number of passed persons according to a thirteenth embodiment of the present invention.

FIG. 28 is a flow chart of a binary coding process of real data in the apparatus for detecting the number of passed persons according to this embodiment. As a result, lowering of output between human bodies in a case of successive passage can accurately be detected. Thus, separation of human bodies can accurately be performed. If the human bodies are apart from each other for about 10 cm, determination can be performed as reliably separated human bodies.

As described above, according to this embodiment, the pyroelectric infrared sensor of a fixed type and having the wide angle lens and the chopper is disposed in the central portion in the upper portion of a doorway of a room or a passage of a building. Thus, a person of a type having irregular temperature distribution can easily be detected. As a result, persons who have entered the room or the building can easily be detected. Thus, the number of passed persons can be detected accurately and reliably. Moreover, the number of persons existing in a room can be displayed.

By disposing the infrared sensor at the doorway of a room or at the central portion of a passage, when a human body has moved into the detectable region for the infrared rays, the human body can be detected. Since the moving directions of plural human bodies and number of passed persons can accurately be detected, the number of persons who have entered the room and those who have left from the same can be detected in a realtime manner. Thus, the number of persons existing in each room in a building can accurately, precisely, immediately and reliably be detected.

An apparatus for detecting the number of passed persons according to a fourteenth embodiment of the present invention will now be described with reference to the drawings.

The structure of a sensor head is similar to that shown in FIG. 1, and a state where the sensor head is disposed in the upper portion of the doorway of a room is similar to that shown in FIG. 4.

Similarly to the eighth embodiment, an analog signal for each step for each chopping motion output from the infrared sensor is processed through the signal processing circuit so as to be converted into a digital output value. When the number of paused human bodies is obtained in accordance with the digital value, the temperature of the floor surface, which is the background, is sampled for a certain period of time, followed by averaging the sampled values as shown in FIG. 16, and followed by using the obtained value as a reference. Then, upper and lower limit thresholds are set to respectively have certain margins from the reference, followed by performing a binary coding process as shown in FIG. 17. If the digital output value is larger than the upper limit of the threshold or if the same is smaller than the lower limit, existence of a human body is determined. By determining movement of the digital output value larger than the upper limit of the threshold or smaller than the lower limit between the devices of the infrared array sensor, the moving directions of human bodies are detected and determined.

In this embodiment, smaller number of the determined numbers of entrance and exeunt persons at a position at which L is changed to H and at a position at which H is changed to L among steps (H) determined to be the human bodies and steps (L) determined not to be the human bodies is employed. In a case where a maximum value is detected at a certain device, a value (maximum value−1) is forcibly input to each of other devices. After passage of human bodies has been completed, the number of entrance and exeunt persons is sorted, and the maximum value counted from two or more devices is employed so that the number of passed human bodies is detected. That is, in a case where a certain device has detected a ninth human body in the case of successive passage of human bodies, an assumption is automatically and forcibly employed that the eighth human body has been detected by all devices even if the eighth human body is not detected by all devices. Thus, human bodies passing successively can accurately be detected.

FIG. 29 shows a specific example of a result of detection of the number of passed persons detected by each device of the apparatus for detecting the number of passed persons according to this embodiment and a result of a totaling operation. As a result, even a human body which has not completely passed through all detection regions can satisfactorily be detected.

As described above, according to this embodiment, the pyroelectric infrared sensor of a fixed type and having the wide angle lens and the chopper is disposed in the central portion in the upper portion of a doorway of a room or a passage of a building. Thus, persons who have successively entered the room or the building can easily be detected. Thus, the number of persons who have successively passed the detection area can be detected accurately and reliably. Moreover, the number of persons existing in a room can be displayed.

An apparatus for detecting the number of passed persons according to a fifteenth embodiment of the present invention will now be described with reference to the drawings.

The structure of a sensor head is similar to that shown in FIG. 1, and a state where the sensor head is disposed in the upper portion of the doorway of a room is similar to that shown in FIG. 4.

Similarly to the eighth embodiment, an analog signal for each step for each chopping motion output from the infrared sensor is processed through the signal processing circuit so as to be converted into a digital output value. When the number of paused human bodies is obtained in accordance with the digital value, the temperature of the floor surface, which is the background, is sampled for a certain period of time, followed by averaging the sampled values as shown in FIG. 16, and followed by using the obtained value as a reference. Then, upper and lower limit thresholds are set to respectively have certain margins from the reference, followed by performing a binary coding process as shown in FIG. 17. If the digital output value is larger than the upper limit of the threshold or if the same is smaller than the lower limit, existence of a human body is determined. By determining movement of the digital output value larger than the upper limit of the threshold or smaller than the lower limit between the devices of the infrared array sensor, the moving directions of human bodies are detected and determined.

If the digital output value is larger than the upper limit of the threshold or smaller than the lower limit of the threshold, existence of a human body is determined. If the two adjacent devices or each of the forward and behind steps have not detected the existence of the human body, the portion at which the existence of the human body has been determined is forcibly deleted. If two or more steps (L) in which existence of the human body has not been determined exist between the steps (H) determined to be human body being existing, an interpolation process is performed in which L is changed to H. Moreover, the smaller number of the determined numbers of entrance and exeunt persons at a position at which L is changed to H and at a position at which H is changed to L is employed. After passage of human bodies has been completed, the number of entrance and exeunt persons is sorted, and the maximum value counted from two or more devices is employed so that the number of passed human bodies is detected. In a case where only one device has counted one person, a determination is performed that one person has passed the detection area in detecting the number of passed persons.

Thus, even if the temperature of the floor surface is changed, the human bodies can accurately be detected. Even if a low temperature object and high temperature object can similarly be detected. Moreover, even a human body which has not completely passed through all detection regions can satisfactorily be detected. Even if the S/N ratio is unsatisfactory or noise and/or refuse has been generated, they can be eliminated. Thus, the moving directions can accurately be detected and the number of passed persons can be counted.

As described above, according to this embodiment, the pyroelectric infrared sensor of a fixed type and having the wide angle lens and the chopper is disposed in the central portion in the upper portion of a doorway of a room or a passage of a building. Thus, persons who have entered the room or the building can easily be detected. Thus, the number of passed persons can be detected accurately and reliably. Moreover, the number of persons existing in a room can be displayed.

As described above, the sensor system for detecting the number of passed persons formed by linking the infrared sensor, the apparatus for detecting the number of passed persons and the display unit to one another has a very, simple structure as a system. By using the sensor system, human bodies and the number of persons existing in a room can easily, reliably and accurately detected with a low cost. Thus, a comfortable intelligent building can be provided.

An apparatus for detecting the number of passed persons according to a sixteenth embodiment of the present invention will now be described with reference to the drawings.

The structure of a sensor head is similar to that shown in FIG. 1, and a state where the sensor head is disposed in the upper portion of the doorway of a room is similar to that shown in FIG. 4.

In this embodiment, the binary coding process is performed similarly to the thirteenth embodiment. If the digital output value is larger than the upper limit of the threshold or if the same is smaller than the lower limit, existence of a human body is determined. Even if the digital output value is larger than the upper limit of the. threshold or smaller than the lower limit of the same, determination as a non-human body existence region is forcibly performed in a case where the digital output value has decreased or increased over a certain inclination. The movement of the digital output value larger than the upper limit of the threshold or small than the lower limit of the threshold between the devices of the infrared array sensor is determined so that the moving directions of the human bodies are detected and determined.

Moreover, smaller number of the determined numbers of entrance and exeunt persons at a position at which L is changed to H and at a position at which H is changed to L among steps (H) determined to be the human bodies and steps (L) determined not to be the human bodies is employed. In a case where a maximum value is detected at a certain device, a value (maximum value−1) is forcibly input to each of other devices. After passage of human bodies has been completed, the number of entrance and exeunt persons is sorted, and the maximum value counted from two or more devices is employed so that the number of passed human bodies is detected. That is, in a case where a certain device has detected a second human body in the case of successive passage of human bodies, an assumption is automatically and forcibly employed that the eighth human body has been detected by all devices even if the eighth human body is not detected by all devices. Thus, human bodies passing successively can accurately be detected.

As a result, lowering of output between human bodies in a case of successive passage can accurately be detected. Thus, separation of human bodies can accurately be performed. If the human bodies are apart from each other for about 10 cm, determination can be performed as reliably separated human bodies. Moreover, even a human body which has not completely passed through all detection regions can satisfactorily be detected.

According to this embodiment, the infrared sensor is disposed in the central portion in the upper portion of a doorway or the passage of a building or a room, the human bodies, who have entered the detectable region for the infrared rays, can be detected. Since the moving directions of plural human bodies and number of passed persons can accurately be detected, the number of persons who have entered the room and those who have left from the same can be detected in a realtime manner. Thus, the number of persons existing in each room in a building can accurately, precisely, immediately and reliably be detected.

An apparatus for detecting the number of passed persons according to a seventeen embodiment of the present invention will now be described with reference to the drawings.

Figure 30:
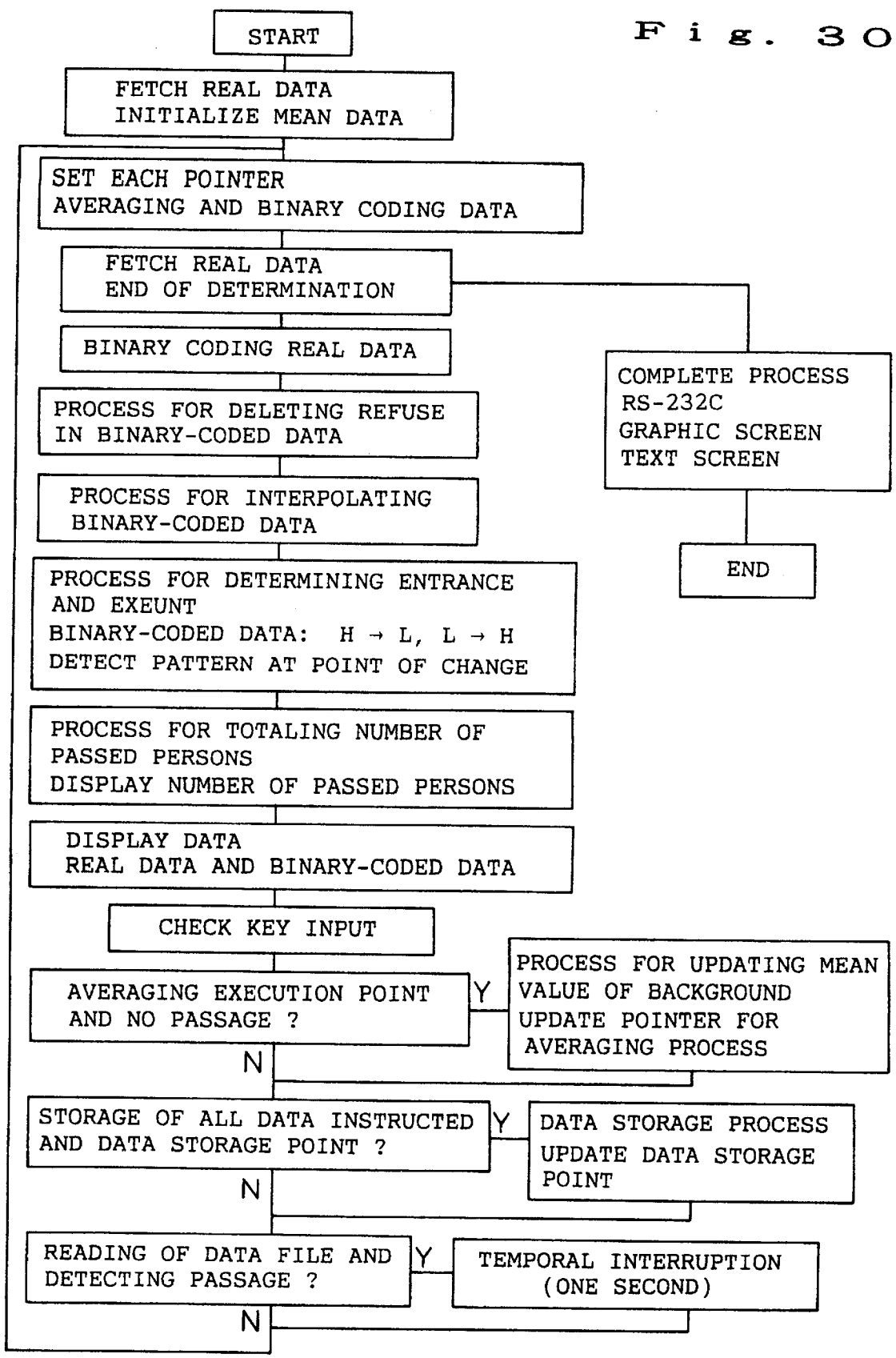
FIG. 30 is an overall flow chart adapted to the apparatus for detecting the number of passed persons according to a seventeenth embodiment of the present invention.

FIG. 30 is an overall flow chart of an apparatus for detecting the number of passed persons according to the seventeenth embodiment of the present invention. The structure of a sensor head is similar to that shown in FIG. 1, and a state where the sensor head is disposed in the upper portion of the doorway of a room is similar to that shown in FIG. 4.

Similarly to the eighth embodiment, an analog signal. for each step for each chopping motion output from the infrared sensor is processed through the signal processing circuit so as to be converted into a digital output value. When the number of paused human bodies is obtained in accordance with the digital value, the temperature of the floor surface, which is the background, is sampled for a certain period of time, followed by averaging the sampled values as shown in FIG. 16, and followed by using the obtained value as a reference. Then, upper and lower limit thresholds are set to respectively have certain margins from the reference, followed by performing a binary coding process as shown in FIG. 17. If the digital output value is larger than the upper limit of the threshold or if the same is smaller than the lower limit, existence of a human body is determined. By determining movement of the digital output value larger than the upper limit of the threshold or smaller than the lower limit between the devices of the infrared array sensor, the moving directions of human bodies are detected and determined.

Then, if the digital output value is larger than the upper limit of the threshold or smaller than the lower limit of the threshold, existence of a human body is determined. If the two adjacent devices or each of the forward and behind steps have not detected the existence of the human body, the portion at which the existence of the human body has been determined is forcibly deleted. If two or more steps (L) in which existence of the human body has not been determined exist between the steps (H) determined to be human body being existing, an interpolation process is performed in which L is changed to H. Moreover, the smaller number of the determined numbers of entrance and exeunt persons at a position at which L is changed to H and at a position at which H is changed to L is employed. After passage of human bodies has been completed, the number of entrance and exeunt persons is sorted, and the maximum value counted from two or more devices is employed so that the number of passed human bodies is detected. In a case where only one device has counted one person, a determination is performed that one person has passed the detection area in detecting the number of passed persons. In a case where a maximum value is detected at a certain device, a value (maximum value−1) is forcibly input to each of other devices. After passage of human bodies has been completed, the number of entrance and exeunt persons is sorted, and the maximum value counted from two or more devices is employed so that the number of passed human bodies is detected. In a case where only one device has counted one person, a determination is performed that one person has passed the detection area in detecting the number of passed persons.

Figure 31A:
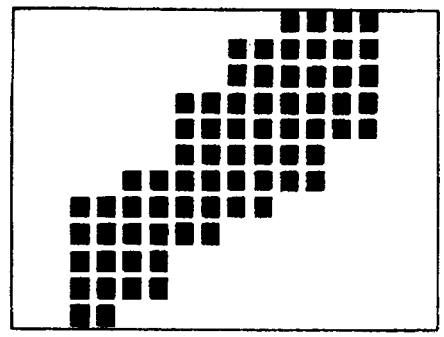
FIG. 31 is a diagram showing a specific example capable of detecting the number of passed persons according to the seventeenth embodiment.
Figure 31B:
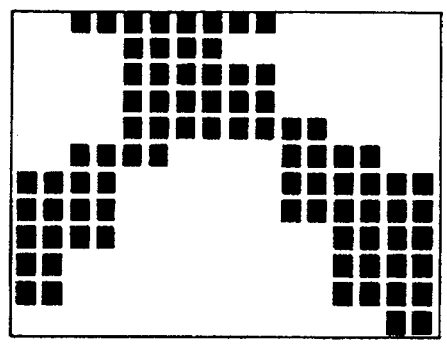
Figure 31C:
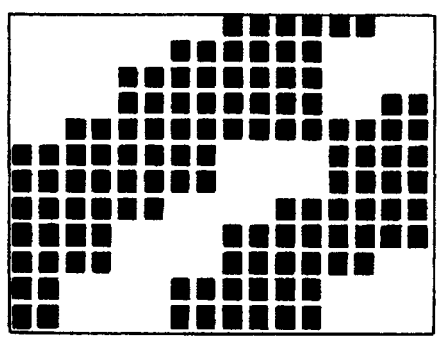

FIG. 31 shows a specific example of detection of the number of passed persons performed by the apparatus for detecting the number of passed persons according to this embodiment. FIG. 31(a) shows a result of a case where human bodies each partially having a surface temperature due to wearing of an overcoat have passed, (b) shows a result of a case where two persons have intersected and (c) shows a result of a case where human bodies have successively passed the detection area. As can be understood from the results, the interpolation process is very effective in the case of (a), detection of the inclination of the outputs from the sensors is very effective in the case of (b) and inputting of (maximum value−1) is very effective in the case of (c).

As a result of the foregoing methods, the human bodies can be detected, the moving direction can be determined and the number of passed persons can be counted with satisfactory reliability and accuracy. Thus, the conventional detectable rate of the number of passed persons of about 80% could be raised to 95% or higher.

As described above, according to this embodiment, the pyroelectric infrared sensor of a fixed type and having the wide angle lens and the chopper is disposed in the central portion in the upper portion of a doorway of a room or a passage of a building. Thus, persons who have entered the room or the building can easily be detected. Thus, the number of passed persons can be detected accurately and reliably.

Although the background has been the floor surface in the embodiments, the background is not limited to this. For example, a wall surface except the floor surface may be employed.

Although the chopping cycle of the pyroelectric infrared sensor has not been described in the embodiments, a chopping cycle of 10 Hz or higher enables the human bodies to be detected more quickly, accurately and precisely.

As described above, by disposing the infrared sensors capable of detecting human bodies in the lower portion or the side position of a doorway or a corridor of a building or a room, the persons who enter the room or the building or those who left the same can be detected and determined. By counting the number of the persons who have passed the detection area, the number of the attendance or the number of persons who exist in the room can accurately be detected. In particular, since a threshold is set by using the temperature of the floor surface always observed by the infrared array sensor, change in the temperature of the floor surface can always be fed back. Thus, the threshold can be caused to follow the change in the temperature of the floor surface. Since upper and lower limit thresholds are set with respect to a reference value, a low-temperature object, the temperature of which is low, can be detected.

By monitoring the inclination of the output from the sensor, that is, the amount of change and by supplying a value (a maximum value−1) to each of devices except a device at which the largest number of persons has been detected, the number of persons who have successively passed the detection area and the number of persons who intersect at the passage can further accurately be detected. By multiplying the output values from the adjacent devices by the ratio of crosstalk to correct the output from the sensors or by forcibly determining the human bodies in two or less steps between steps in which human bodies have been determined the human bodies can accurately be detected even if low temperature or high temperature objects exist mixedly. Thus, the moving directions and the number of the passed persons can accurately be detected.

By combining a software which is the processing method and a pyroelectric device with each other, an accurate and reliable sensor system for detecting the number of passed persons and exhibiting a reduced size and cost of the system can be obtained. Thus, the number of persons existing in the room can easily and immediately be detected. In particular, by using the foregoing detection apparatus and the sensor system, an error in detection, as has been experienced with a structure having a plurality of sensors, can be prevented. As a result, great contribution can be made when the human bodies and the number of passed persons are intended to be accurately and reliably detected. The apparatus for detecting the moving direction and the number of passed persons requires a very simple program. By using the algorithm of the program, accurate detection of human bodies substantially free from error in detection can easily be performed with a low cost even in a successive passing or intersection of human beings. Thus, employment of the present invention enables the human bodies and the number of persons existing in a room to be detected easily, accurately and reliably. Thus, great contribution can be made to providing a comfortable intelligent building system.

An apparatus for detecting the number of passed persons according to a eighth embodiment of the present invention will now be described with reference to the drawings.

FIG. 11 is a structural view of the hardware to be employed when the moving direction is detected by using the sensor head shown in FIG. 1. Referring to FIG. 11, a sensor output transmitted from a sensor head 111a,111b is processed by a signal processing circuit 112a,112b respectively, and then the number of passed persons is determined by a control unit 113. Then, the number is display on a computer 114 of a display unit 115. A state where the sensor heads in the foregoing hardware structure are disposed in the upper portion of a doorway of a department store or the like is shown in FIG. 12. Four sensor heads 111a–111d are, at the same intervals, disposed in the upper portion of a relatively wide doorway 125 having a width of 200 cm and a height of 250 cm to always look the floor and the direction of the arrangement of the sensor array runs parallel to a direction in which human bodies move. Thus, the number of entrance, that of exeunt and the number of persons existing in a room are displayed on the computer 113 or the display unit 115 through the signal processing circuit 112a–112d. If the incidental angle at this time is 3°, a detection region 127a,127b as illustrated is realized. Thus, even if the width across the shoulders of the hyuman body 126 is about 40 cm, the human bodies can satisfactorily be detected by disposing the sensors at intervals of about 50 cm.

Figure 32:
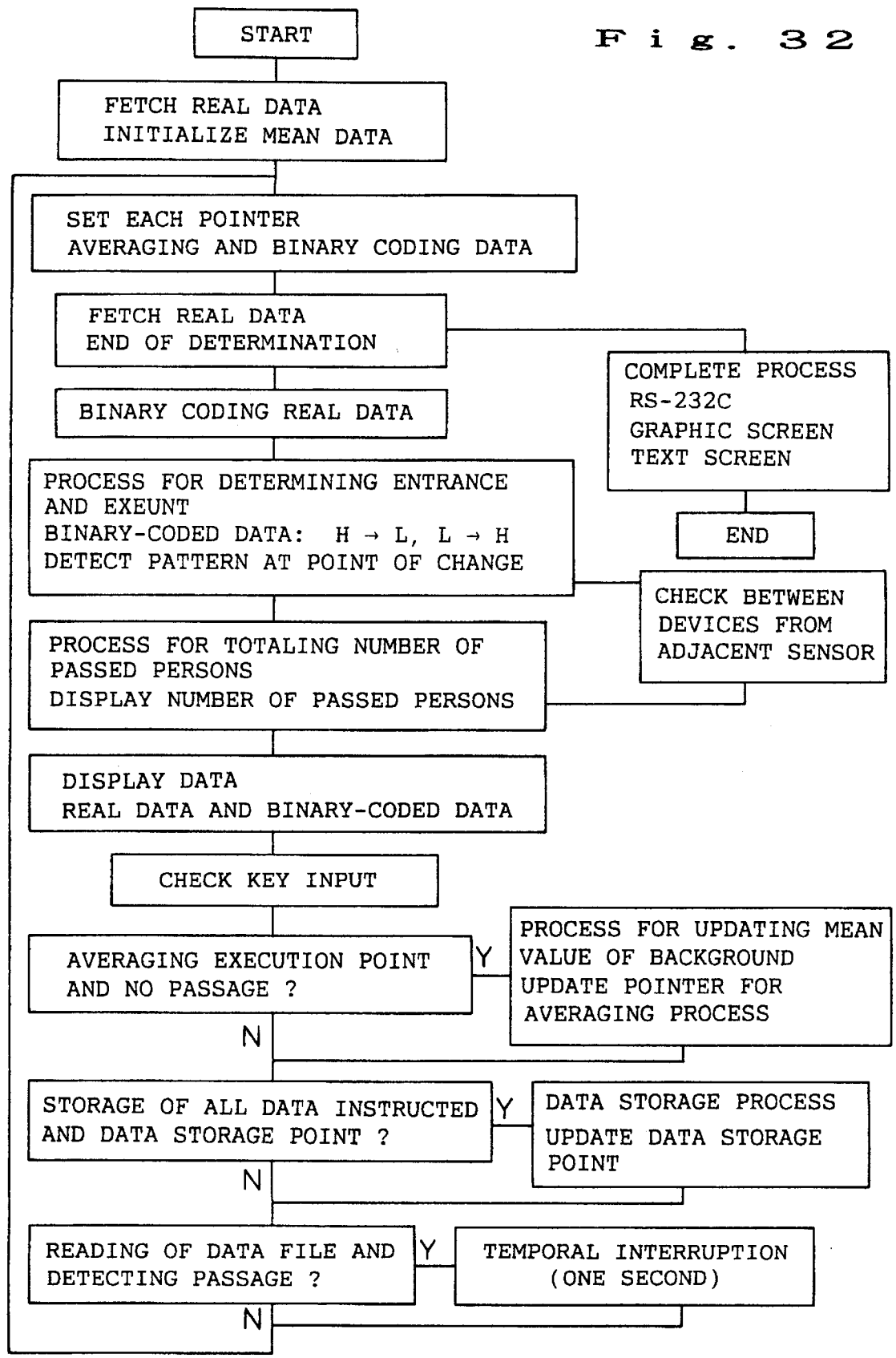
FIG. 32 is an overall flow chart for the method of detecting the number of passed persons according to the eighteenth embodiment.

An overall flow chart for detecting the moving direction is shown in FIG. 32. An analog signal transmitted from the infrared sensor for each step for each chopping motion is processed through the signal processing circuit so as to be converted into a digital output value. When the number of passed persons is obtained in accordance with the digital value, the temperature of the floor surface, which is the background, is sampled for a certain period of time, followed by averaging the sampled values, and followed by using the obtained value as a reference. Then, upper and lower limit thresholds are set to respectively have certain margins from the reference, followed by performing a binary coding process. If the digital output value is larger than the upper limit of the threshold or if the same is smaller than the lower limit, existence of a human body is determined. Since four infrared array sensors are disposed in this embodiment, a predetermined rule is employed to determine movement of the digital output value larger than the upper limit of the threshold or smaller than the lower limit between adjacent devices of the infrared array sensor and movement between adjacent infrared array sensor heads, that is, a state of transition and appearance of the detected value between the infrared array sensors so that moving direction of human bodies and whether the movements are entrance or exeunt are detected and determined.

The background averaging process, the binary coding process of the digital output data and the binary coding process are basically are similar to those according to the eighth embodiment (see FIGS. 16, 17 and 18). Also the process for deleting the refuse in the binary-coded data and the process for deleting the refuse in the binary-coded data of the result are performed similar to those performed in the ninth embodiment (see FIGS. 22 and 23).

As a result, the human bodies and the moving direction can reliably and accurately be detected and determined. Thus, the conventional detectable rate of the moving direction of about 90% could be raised to 99% or higher.

As described above, according to this embodiment, the pyroelectric infrared sensor of a fixed type and having the wide angle lens and the chopper is disposed in the central portion in the upper portion of a doorway of a room or a passage of a building. Thus, persons who have entered the room or the building can easily and accurately be detected. Thus, the moving direction can be detected accurately and reliably.

A method of detecting the number of passed persons according to a nineteenth embodiment of the present invention will now be described with reference to the drawings.

The hardware structure and the flow chart for detecting the number of passed persons according to this embodiment are basically similar to those according to the eleventh embodiment (refer to FIGS. 12 and 32). That is, the temperature of the floor surface, which is the background, is sampled for a certain period of time, followed by averaging the sampled values, and followed by using the obtained value as a reference. Then, upper and lower limit thresholds are set, and the binary coding process is performed. If the digital output value is larger than the upper limit of the threshold or if the same is smaller than the lower limit, existence of a human body is determined. The movement of the digital output value larger than the upper limit of the threshold or smaller than the lower limit between adjacent devices of the infrared array sensor and movement between adjacent infrared sensor heads, that is, a state of transition and appearance of the detected value between the infrared array sensors is determined so that moving direction of human bodies and whether the movements are entrance or exeunt are detected and determined. In this embodiment, smaller number of the determined numbers of entrance and exeunt persons at a position at which L is changed to H and at a position at which H is changed to L among steps (H) determined to be the human bodies and steps (L) determined not to be the human bodies is employed. After passage of human bodies has been completed, the number of entrance and exeunt persons is sorted, and the maximum value counted from two or more devices is employed so that the number of passed human bodies is detected.

FIG. 20 shows a flow chart for detecting and totaling the number of passed persons adapted to the method of detecting the number of passed persons. FIG. 33 shows specific example of the number of entrance and exeunt persons who have passed the detection area and a result of totaling operation. The entrance and the exeunt is determined at the change points (L→H, H→L) of the binary-coded data for each sensor and device. If passage is detected, the count of the counter is increased. The determination of the entrance and the exeunt is, similarly to the eleventh embodiment and as shown in FIG. 17, performed such that, if 1 or −1 point square symbols in solid black are successively moved over three devices while having the illustrated relationship with the symbol O which is the 0 point, the moving direction can be determined and the number of passed persons at the device can be detected. Even if the result of retrieval is affirmative, cancellation is performed in a case where the binary-coded data at the position X is 1. Then, retrieval of another pattern configuration is performed.

As a result, the human bodies and the moving direction can reliably and accurately be detected and determined. Thus, the conventional detectable rate of the number of passed persons of about 80% could be raised to 95% or higher.

As described above, according to this embodiment, the pyroelectric infrared sensor of a fixed type and having the wide angle lens and the chopper is disposed in the central portion in the upper portion of a doorway of a room or a passage of a building. Thus, persons who have entered the room or the building can easily be detected. Thus, the number of passed persons can be detected accurately and reliably. Moreover, the number of persons existing in a room can be displayed.

An apparatus for detecting the number of passed persons according to a twentieth embodiment of the present invention will now be described with reference to the drawings.

The hardware structure and the flow chart for detecting the number of passed persons according to this embodiment are basically similar to those according to the eighth embodiment (refer to FIGS. 12 and 32). That is, the temperature of the floor surface, which is the background, is sampled for a certain period of time, followed by averaging the sampled values, and followed by using the obtained value as a reference. Then, upper and lower limit thresholds are set, and the binary coding process is performed. If the digital output value is larger than the upper limit of the threshold or if the same is smaller than the lower limit, existence of a human body is determined. The movement of the digital output value larger than the upper limit of the threshold or smaller than the lower limit between adjacent devices of the infrared array sensor and movement between adjacent infrared sensor heads, that is, a state of transition and appearance of the detected value between the infrared array sensors is determined so that moving direction of human bodies and whether the movements are entrance or exeunt are detected and determined. In this embodiment, if two or more steps (L) in which existence of the human body has not been determined exist between the steps (H) determined to be human body being existing, an interpolation process is performed in which L is changed to H. Thus, the number of passed persons is detected.

FIG. 25 shows a flow chart of a process for interpolating binary-coded data adapted to the apparatus for detecting the number of passed persons according to this embodiment. FIG. 26 shows a specific example of the process for interpolating binary-coded data. As a result of a process of the foregoing type, a human body having an overcoat in winter, a human body having an irregular temperature distribution and a human body mixedly having a low temperature region and high temperature region is not detected as two persons. Thus, an accurate detection of one person can be performed.

As described above, according to this embodiment, the pyroelectric infrared sensor of a fixed type and having the wide angle lens and the chopper is disposed in the central portion in the upper portion of a doorway of a room or a passage of a building. Thus, a person of a type having irregular temperature distribution can easily be detected. As a result, persons who have entered the room or the building can easily be detected. Thus, the number of passed persons can be detected accurately and reliably. Moreover, the number of persons existing in a room can be displayed.

A method of detecting the number of passed persons according to a twenty-first embodiment of the present invention will now be described with reference to the drawings.

The hardware structure and the flow chart for detecting the number of passed persons according to this embodiment are basically similar to those according to the eighth embodiment (refer to FIGS. 12 and 32). That is, the temperature of the floor surface, which is the background, is sampled for a certain period of time, followed by averaging the sampled values, and followed by using the obtained value as a reference. Then, upper and lower limit thresholds are set, and the binary coding process is performed. In this embodiment, if the digital output value is larger than the upper limit of the threshold or if the same is smaller than the lower limit, existence of a human body is determined. Even if the digital output value is larger than the upper limit of the threshold or smaller than the lower limit of the same, determination as a non-human body existence region is forcibly performed in a case where the digital output value has decreased or increased over a certain inclination. The movement of the digital output value larger than the upper limit of the threshold or smaller than the lower limit between adjacent devices of the infrared array sensor and movement between adjacent infrared sensor heads, that is, a state of transition and appearance of the detected value between the infrared array sensors is determined so that moving direction of human bodies and whether the movements are entrance or exeunt are detected and determined. Moreover, smaller number of the determined numbers of entrance and exeunt persons at a position at which L is changed to H and at a position at which H is changed to L among steps (H) determined to be the human bodies and steps (L) determined not to be the human bodies is employed. After passage of human bodies has been completed, the number of entrance and exeunt persons is sorted, and the maximum value counted from two or more devices is employed so that the number of persons who have successively passed the detection area is detected.

FIG. 28 is a flow chart of a binary coding process of real data in the apparatus for detecting the number of passed persons according to this embodiment. As a result, lowering of output between human bodies in a case of successive passage can accurately be detected. Thus, separation of human bodies can accurately be performed. If the human bodies are apart from each other for about 10 cm, determination can be performed as reliably separated human bodies.

As described above, according to this embodiment, the pyroelectric infrared sensor of a fixed type and having the wide angle lens and the chopper is disposed in the central portion in the upper portion of a doorway of a room or a passage of a building. Thus, a person of a type having irregular temperature distribution can easily be detected. As a result, persons who have entered the room or the building can easily be detected. Thus, the number of passed persons can be detected accurately and reliably. Moreover, the number of persons existing in a room can be displayed.

By disposing the plural infrared sensor at the doorway of a room or at the central portion of a passage to cover the detection region, when a human body has moved into the detectable region for the infrared rays, the human body can be detected. Since the moving directions of plural human bodies and number of passed persons can accurately be detected, the number of persons who have entered the room and those who have left from the same can be detected in a realtime manner. Thus, the number of persons existing in each room in a building can accurately, precisely, immediately and reliably be detected.

An apparatus for detecting the number of passed persons according to a twenty-second embodiment of the present invention will now be described with reference to the drawings.

The hardware structure and the flow chart for detecting the number of passed persons according to this embodiment are basically similar to those according to the eightth embodiment (refer to FIGS. 12 and 32). That is, the temperature of the floor surface, which is the background, is sampled for a certain period of time, followed by averaging the sampled values, and followed by using the obtained value as a reference. Then, upper and lower limit thresholds are set, and the binary coding process is performed. If the digital output value is larger than the upper limit of the threshold or if the same is smaller than the lower limit, existence of a human body is determined. The movement of the digital output value larger than the upper limit of the threshold or smaller than the lower limit between adjacent devices of the infrared array sensor and movement between adjacent infrared sensor heads, that is, a state of transition and appearance of the detected value between the infrared array sensors is determined so that moving directions of human bodies are detected and determined. In this embodiment, smaller number of the determined numbers of entrance and exeunt persons at a position at which L is changed to H and at a position at which H is changed to L among steps (H) determined to be the human bodies and steps (L) determined not to be the human bodies is employed. In a case where a maximum value is detected at a certain device, a value (maximum value−1) is forcibly input to each of other devices. After passage of human bodies has been completed, the number of entrance and exeunt persons is sorted, and the maximum value counted from two or more devices is employed so that the number of passed human bodies is detected. That is, in a case where a certain device has detected a second human body in the case of successive passage of human bodies, an assumption is automatically and forcibly employed that the eighth human body has been detected by all devices even if the first human body is not detected by all devices. Thus, human bodies passing successively can accurately be detected.

FIG. 34 shows a specific example of detection of the number of passed persons obtained by each device of this embodiment and a result of a totaling process. As a result, even human bodies which have not completely passed through all detection regions can satisfactorily be detected.

As described above, according to this embodiment, the pyroelectric infrared sensor of a fixed type and having the wide angle lens and the chopper is disposed in the central portion in the upper portion of a doorway of a room or a passage of a building to cover the detection area. Thus, persons who have successively entered the room or the building can easily be detected. Thus, the number persons who have successively passed the detection area can be counted and the number of persons existing in a room can be displayed.

An apparatus for detecting the number of passed persons according to a twenty-third embodiment of the present invention will now be described with reference to the drawings.

The hardware structure according to this embodiment is similar to that according to the eighth embodiment (refer to FIG. 12). The difference in the processing method from the foregoing embodiments lies will now be described. The temperature of the floor surface is sampled for a certain period of time and the sampled values are averaged so that a reference is obtained. Two thresholds are set to the upper limit and the lower limit with respect to the reference while giving certain margins respectively. Thus, the digital output value is ternary-coded. If the digital output value is larger than the uppermost limit or lower than the lowermost limit, existence of the human body is determined. In this embodiment, movement of the digital output value larger than the uppermost limit or that smaller than the lowermost limit between adjacent devices of the infrared array sensor and movement between adjacent infrared array sensor heads is determined. If sensor outputs are obtained in a synchronized manner among the devices of the adjacent infrared sensor heads in a case where the digital output value is between the two upper limits or the two lower limits, a determination that one person has passed the detection area is performed. Thus, the number of passed persons can be detected.

Figure 35:
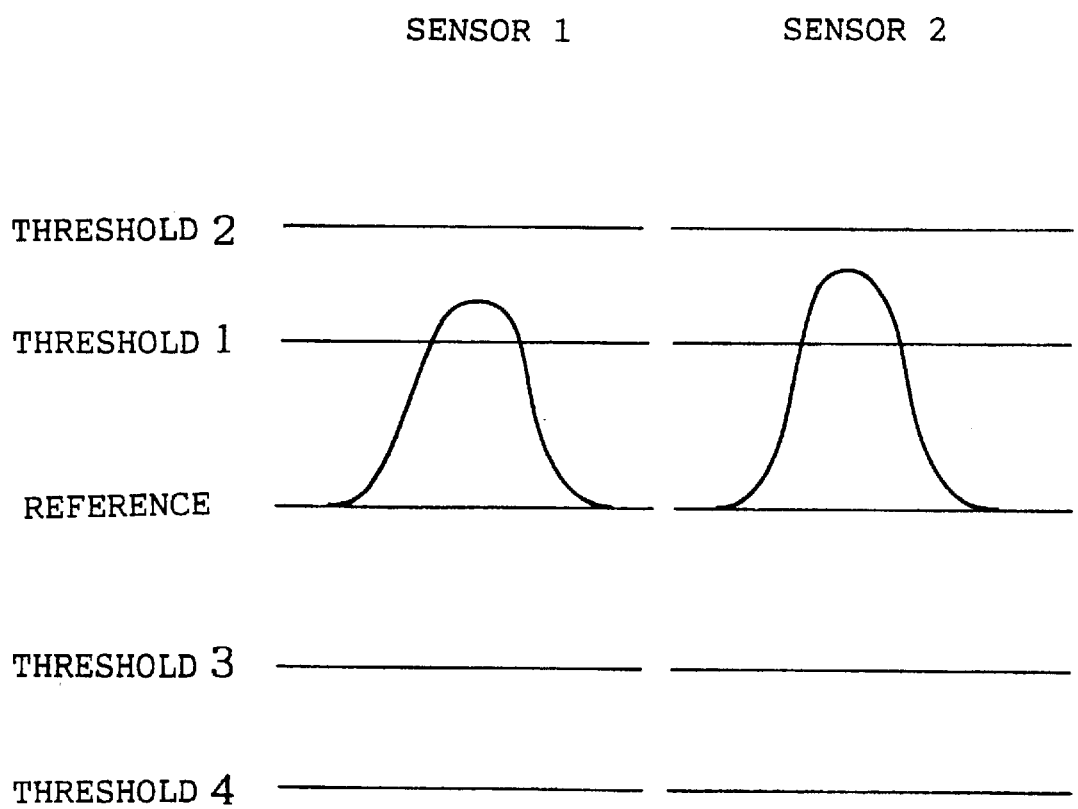
FIG. 35 is a graph showing the relationship between sensor outputs and thresholds in the method of detecting the number of passed persons according to a twenty-third embodiment of the present invention.
Figure 36:
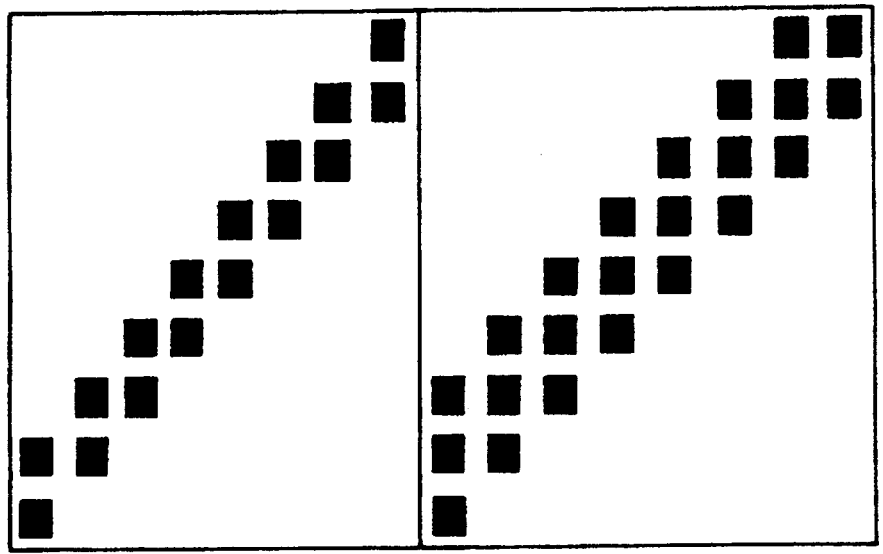
FIG. 36 is a diagram showing a specific result of display in the method of detecting the number of passed persons according to the twenty-third embodiment.

FIG. 35 is a graph showing the relationship between sensor output and the threshold according to this embodiment. If a human body has passed between a sensor 1 and a sensor 2, outputs from the sensor 1 and the sensor 2 exist between thresholds 1 and 2. Since outputs are obtained from the two sensors in the case where only the threshold 1 is provided, passage of two persons is unintentionally detected. If only the threshold 2 is provided, the number of passed persons is erroneously determined to be 0. In this embodiment, two thresholds are set to determined in a case where a peak output is generated between the thresholds and a determination is performed that the human body has entered to the synchronized sensors 1 and 2 at the same timing, passage of one person is determined. Thus, the foregoing error in detection can be prevented. FIG. 36 shows a result of specific display of the sensors 1 and 2 according to this embodiment. The horizontal direction stands for the position of the device of the sensor, that is, the human body, while the vertical direction stands for the step of the chopper, that is, time. If the human body has introduced to the positions of the sensors 1 and 2 at the same timing and outputs from both of the two sensors are between the two thresholds, passage of one person is determined.

Since the thresholds are set, even a low temperature object can be detected similarly.

As described above, according to this embodiment, the pyroelectric infrared sensor of a fixed type and having the wide angle lens and the chopper is disposed in the central portion in the upper portion of a doorway of a room or a passage of a building to cover the detection area. Moreover, each two thresholds are set so that a human body who has passed between the detection areas of the sensors can easily and accurately be detected. Thus, the number persons who have successively passed through the detection area can accurately and reliably be counted. Moreover, the number of persons existing in a room can be controlled.

A method of detecting the number of passed persons according to a twenty-fourth embodiment of the present invention will now be described with reference to the drawings.

The hardware structure and the flow chart for detecting the number of passed persons according to this embodiment are basically similar to those according to the eighth embodiment (refer to FIGS. 12 and 32). That is, the temperature of the floor surface, which is the background, is sampled for a certain period of time, followed by averaging the sampled values, and followed by using the obtained value as a reference. Then, upper and lower limit thresholds are set, and the binary coding process is performed. If the digital output value is larger than the upper limit of the threshold or if the same is smaller than the lower limit, existence of a human body is determined. The movement of the digital output value larger than the upper limit of the threshold or smaller than the lower limit between adjacent devices of the infrared array sensor and movement between adjacent infrared sensor heads are determined so that moving directions of human bodies are detected and determined. In this embodiment, a hierarchy structure for detecting change in the sensor output from each device of the adjacent infrared sensors is formed to enable the movement of the human body between the infrared sensors to be detected. In a case where, simultaneously with the moment at which a certain device of the infrared sensor does not detect the human body, an adjacent device in the same infrared sensor or a device adjacent in terms of time or spatially detects the human body, passage of the same person is determined. Thus, the number of passed persons can be detected.

Figure 37:
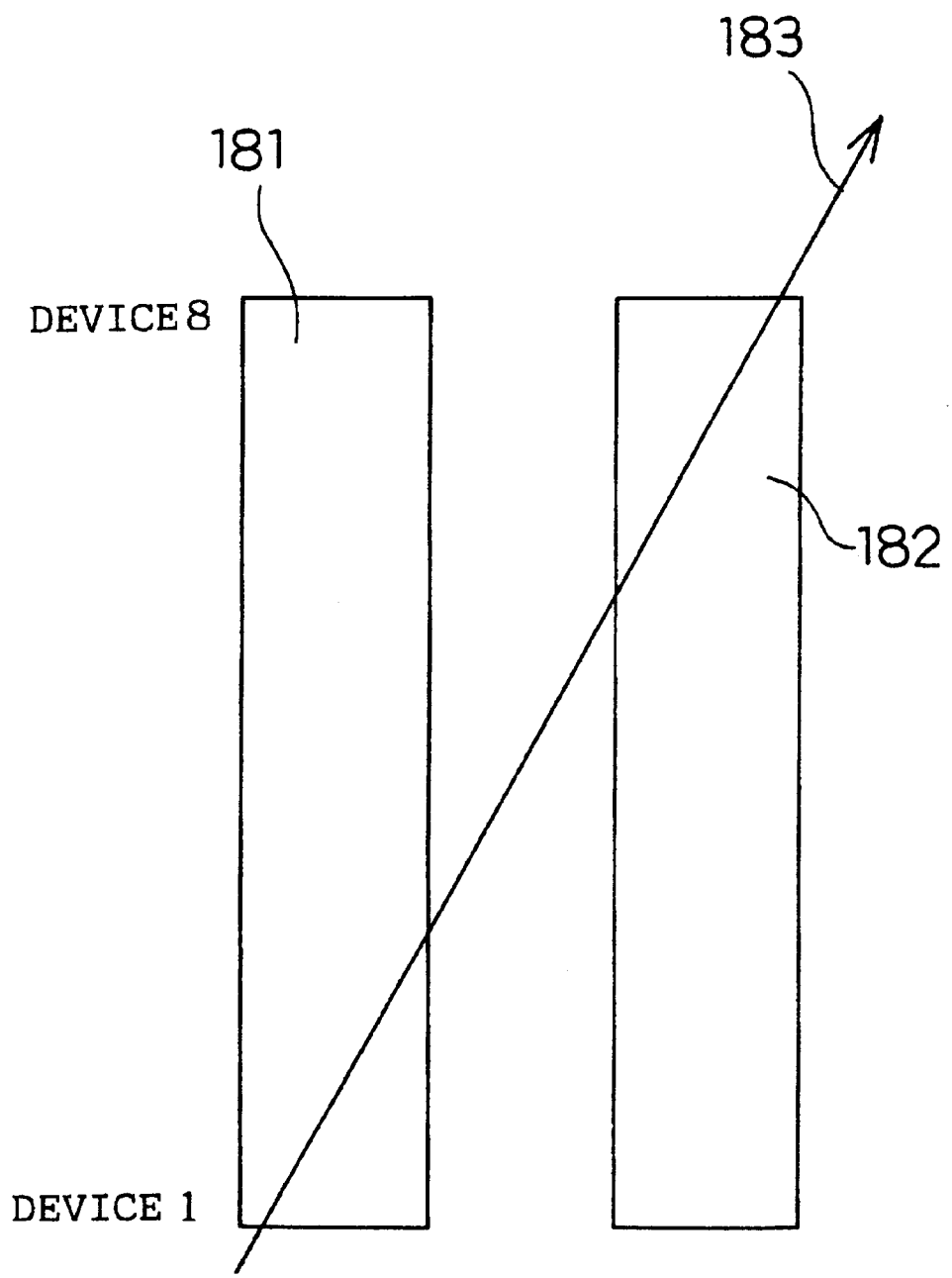
FIG. 37 is a diagram showing the detection region for the sensor and the direction in which the human body moves according to a twenty-fourth embodiment of the present invention when viewed from an upper position.
Figure 38A:
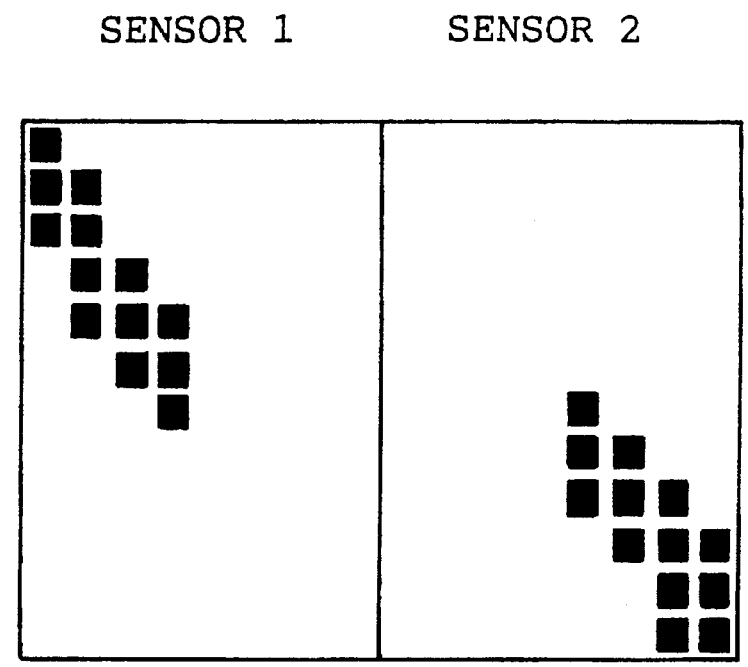
FIG. 38(*a*) is a diagram showing a specific result of display according to the twenty-fourth embodiment, and FIG. 38(*b*) is a diagram showing a result due to a hierarchy structure.
Figure 38B:
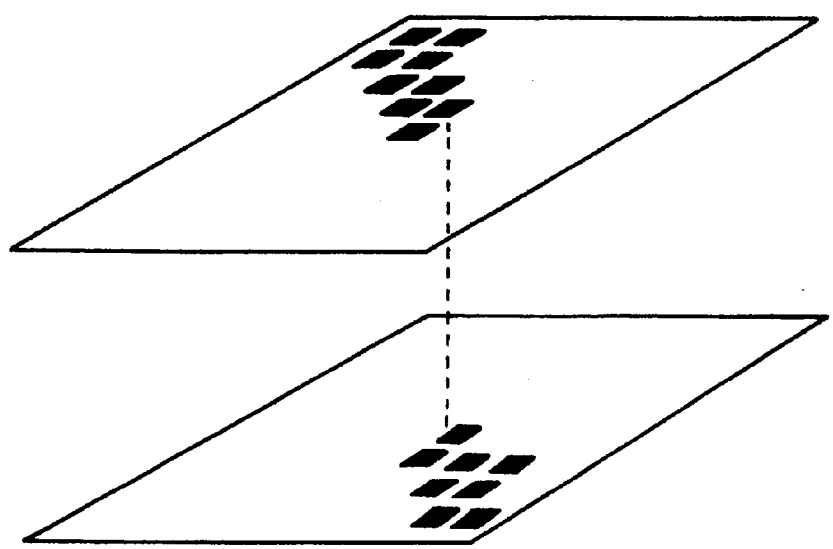

FIG. 37 is a diagram showing the detection regions of the two sensors and a moving direction 183 of a human body according to this embodiment when viewed from an upper position. When a passing human body has been moved from a detection region 181 of the sensor 1 to a detection region 182 of the sensor 2, a specific result of display is as shown in FIG. 38(*a*). By stacking the results in terms of time and spatially as shown in FIG. 38(*b*) into a hierarchy structure and by retrieving the movement pass with the hierarchy structure, passage of one person can be detected and determined.

As described above, according to this embodiment, the. pyroel ectric infrared sensor of a fixed type and having the wide angle lens and the chopper is disposed in the central portion in the upper portion of a doorway of a room or a passage of a building to cover detection areas. Moreover, the hierarchy structure of the sensors is formed to retrieve the passing human body. As a result, the human body who moves between the sensors can easily and accurately be detected. Thus, the number of persons who have successively passed through the detection region can accurately and reliably be counted. Moreover, the number of persons existing in a room can be displayed.

An apparatus for detecting the number of passed persons according to a twenty-fifth embodiment of the present invention will now be described with reference to the drawings.

Figure 39:
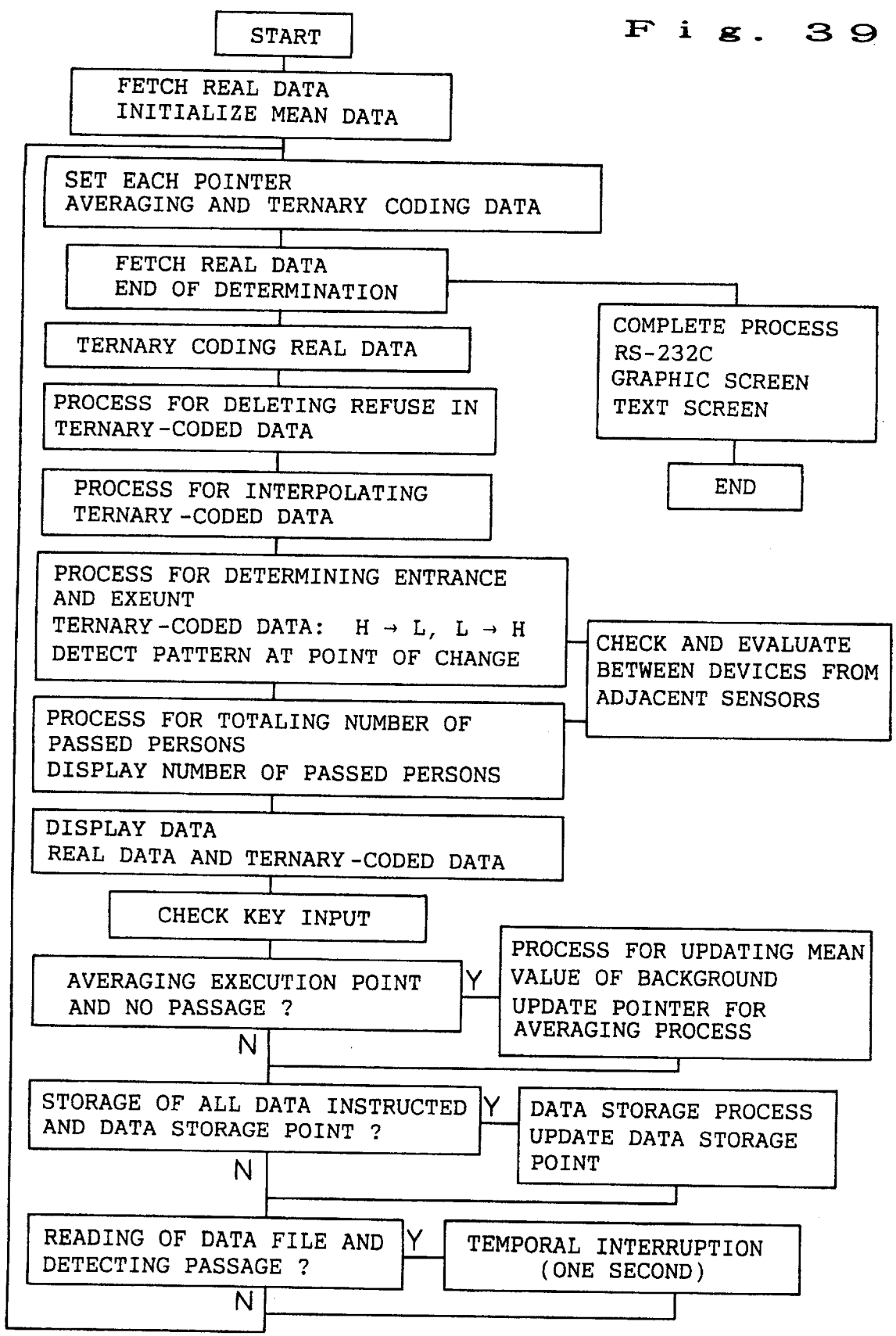
FIG. 39 is an overall flow chart for the method of detecting the number of passed persons according to a twenty-fifth embodiment of the present invention.

The hardware structure according to this embodiment is similar to that according to the eighth embodiment (refer to FIG. 12). An overall flow chart for detecting the number of passed persons according to this embodiment is shown in FIG. 39. An analog signal transmitted from the infrared sensor for each step for each chopping motion is processed through the signal processing circuit so as to be converted into a digital output value. When the number of passed persons is obtained in accordance with the digital value, two upper limits and two lower limits are provided for the thresholds while giving certain margins respectively with respect to a reference obtained in accordance with the temperature of the floor surface similarly to the sixteenth embodiment. The digital output value is ternary-coded. If the digital output value is larger than the uppermost limit of the threshold or if the same is smaller than the lowermost limit, existence of a human body is determined. The movement of the digital output value larger than the uppermost limit or that smaller than the lowermost limit between adjacent devices of the infrared array sensor and movement between adjacent infrared array sensor heads is determined. If sensor outputs are obtained in a synchronized manner among the devices of the adjacent infrared sensor heads in a case where the digital output value is between the two upper limits or the two lower limits, a determination that one person has passed the detection area is performed.

A hierarchy structure for detecting change in the sensor output from each device of the adjacent infrared sensors is formed to enable the movement of the human body between the infrared sensors to be detected. In a case where, simultaneously with the moment at which a certain device of the infrared sensor does not detect the human body, an adjacent device in the same infrared sensor or a device adjacent in terms of time or spatially detects the human body, passage of the same person is determined. Thus, the number of passed persons can be detected.

If the digital output value is larger than the upper limit of the threshold or smaller than the lower limit of the threshold, existence of a human body is forcibly determined. Moreover, smaller number of the determined numbers of entrance and exeunt persons at a position at which L is changed to H and at a position at which H is changed to L among steps (H) determined to be the human bodies and steps (L) determined not to be the human bodies is employed. In a case where a maximum value is detected at a certain device, a value (maximum value−1) is forcibly input to each of other devices. After passage of human bodies has been completed, the number of entrance and exeunt persons is sorted, and the maximum value counted from two or more devices is employed so that the number of passed human bodies is detected.

If two or more steps (L) in which existence of the human body has not been determined exist between the steps (H) determined to be human body being existing, an interpolation process is performed in which L is changed to H. If the digital output value is larger than the upper limit of the threshold or smaller than the lower limit of the threshold, existence of a human body is forcibly determined. However, no existence of the human body has been detected by two adjacent devices or in forward and behind steps, the position at which the existence of the human body has been detected is forcibly deleted.

Figure 40A:
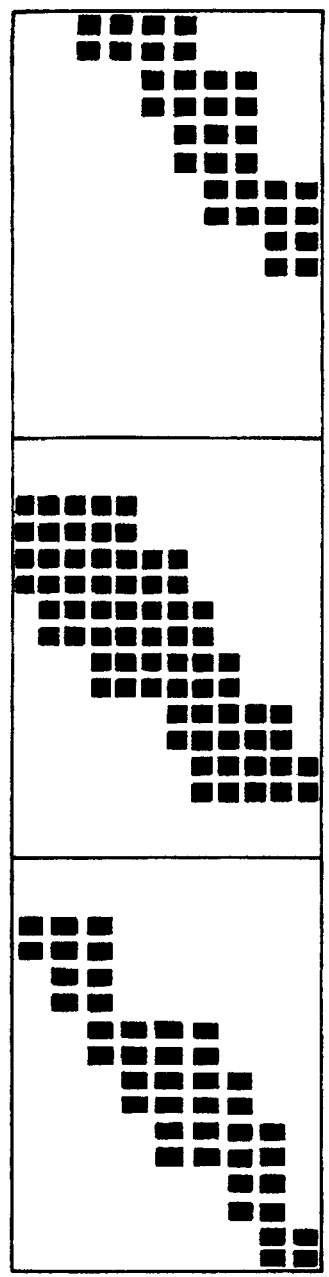
FIG. 40 shows a specific example of the method of the number of passed persons according to the twenty-fifth embodiment which is capable of detecting the number of passed persons.
Figure 40B:
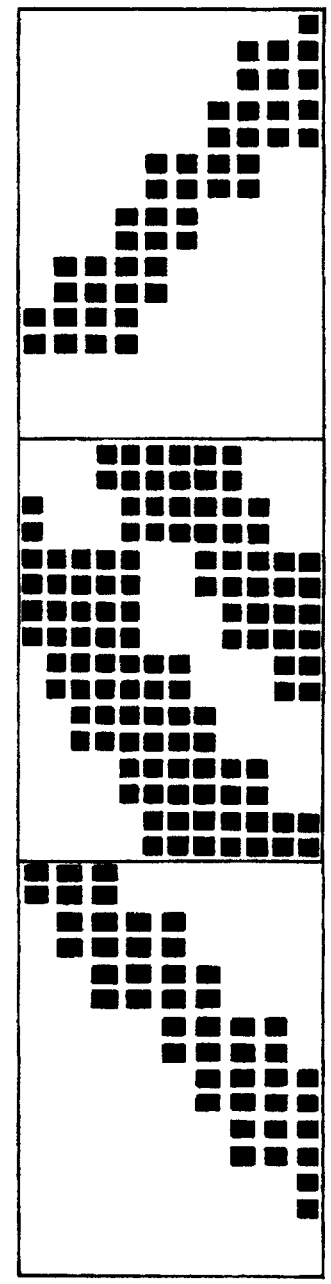

A specific example of detection of passage using three sensors with the method of detecting the human body according to this embodiment is show in FIG. 40. FIG. 40(*a*) shows a result of display performed when three human bodies have passed side by side in the same direction and FIG. 40(*b*) shows a result of display performed when one person has passed at the sensor 1, two person have passed at the sensor 2 and one person has passed at the sensor 3 in an opposite direction. In any case, the human body and the number of passed persons can accurately be detected.

Thus, even if the temperature of the floor surface is changed, the human bodies can accurately be detected. Even if a low temperature object and high temperature object can similarly be detected. Moreover, even a human body which has not completely passed through all detection regions can satisfactorily be detected. Even if the S/N ratio is unsatisfactory or noise and/or refuse has been generated, they can be eliminated. Thus, the moving directions can accurately be detected and the number of passed persons can be counted.

As described above, according to this embodiment, the plural pyroelectric infrared sensor of a fixed type and having the wide angle lens and the chopper are disposed in the central portion in the upper portion of a doorway of a room or a passage of a building to cover detection areas to cover the detection areas. The sensors are synchronized in chopping, two thresholds are set, and the hierarchy structure of the sensors is formed to retrieve the passing human body. As a result, the human body who moves between the sensors can easily and accurately be detected. Thus, the number of persons who have successively passed through the detection region can accurately and reliably be counted. Moreover, the number of persons existing in a room can be displayed.

As described above, the sensor system for detecting the number of passed persons formed by linking the infrared sensor, the apparatus for detecting the number of passed persons and the display unit to one another has a very simple structure as a system. By using the sensor system, human bodies and the number of persons existing in a room can easily, reliably and accurately detected with a low cost. Thus, a comfortable intelligent building can be provided.

An apparatus for detecting the number of passed persons according to a twenty-sisth embodiment of the present invention will now be described with reference to the drawings.

As shown in FIG. 14, three sensor heads 111a–111c are, at the same intervals, disposed in the upper portion of a very wide doorway 142 having a width of 160 cm and a height of 250 cm to always look the floor. The arrangement of the sensor array is determined in such a manner that the right and left sensor heads 111a,111c run parallel to a direction in which the human body passes and the middle sensor head 111b is disposed perpendicular to the direction in which the human body passes.

When the number of passed persons is obtained in accordance with an analog signal for each step of each chopper transmitted from the infrared sensor, the temperature of the floor surface, which is the background, is sampled for a certain period of time, followed by averaging the sampled values, and followed by using the obtained value as a reference. Then, upper and lower limit thresholds are set to respectively have certain margins from the reference, followed by performing a binary coding process. If the digital output value is larger than the upper limit of the threshold or if the same is smaller than the lower limit, existence of a human body is determined and the number of passed persons is detected.

By disposing the three infrared sensor heads as indicated by the detection regions shown in FIG. 14, and by using digital output value threshold from each infrared sensor and processed by the signal processing means, the number of passed persons is obtained in such a manner that the detection regions of adjacent infrared sensors are included so as to detect the number of passed persons. That is, the number of entrance, that of exeunt and the number of persons existing in the room are displayed on the computer of the display unit. If the incidental angle of the sensor is 6° and 3°, a detection region 143a–143c as illustrated is formed. Thus, even if the width across the shoulders is about 40 cm, the human bodies can satisfactorily be detected by disposing the sensors at intervals of about 50 cm. In a case where two human bodies simultaneously pass below the sensors 111a and 111c, the sensor 111b is able to detect the horizontal position of the human body and the size of the same, error can be prevented in detecting. Even if two human bodies have passed side by side under the sensor 111a, an erroneous detection as passage of one person can be prevented because the sensor 111b is able to detect the size of the human body.

As a result, human bodies moving side by side can accurately be detected without a necessity of separating the human bodies. Since the central sensor detects the size of the human body, accurate determination as two human bodies can be performed. Even if two human bodies have moved into the detection region of one sensor, the number of passed persons can satisfactorily accurately be detected.

Figure 41A:
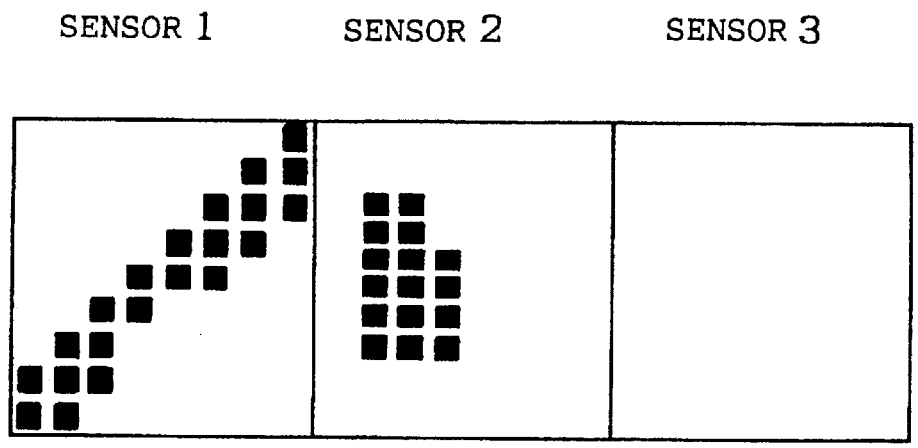
FIG. 41 is a diagram showing a method of detecting the number of passed persons according to the twenty-sixth embodiment which is capable of detecting the number of passed persons.
Figure 41B:
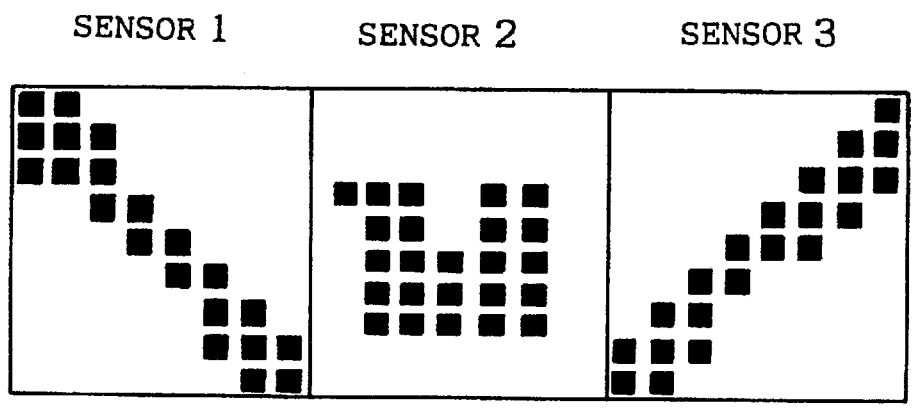

A specific example capable of detecting the number of passed persons according to this embodiment is shown in FIG. 34. FIG. 41(a) shows a case where one human body has passed under the sensor 111a, while FIG. 41(b) shows a case where one person has passed under each of the sensors 111a and 111c in opposite directions. The sensor 111b is arranged to be capable of detecting the size of the human body. Since the size corresponds to three devices in the case of (a) and the size corresponds to six devices in the case of (b), passage of two persons can be detected and determined.

As a result of the foregoing method, the human bodies, the moving direction and the number of passed persons can reliably and accurately be detected. Thus, the conventional detectable rate of the number of passed persons of about 80% could be raised to 95% or higher.

As described above, according to this embodiment, the infrared sensors are disposed in the upper portion of the doorway or the passage of a building or a room and the arrangement of the sensor array is changed so that the size of the human body who has entered the detection region for the infrared rays can be detected. Moreover, the moving directions of a plurality of human bodies and the number of passed persons can accurately be detected. Therefore, the number of persons who have entered the room and those who have left from the same can be detected in a realtime manner. Thus, the number of persons existing in each room in a building can accurately, precisely, immediately and reliably be detected.

As described above, the sensor system for detecting the number of passed persons formed by linking the infrared sensor, the apparatus for detecting the number of passed persons and the display unit to one another has a very simple structure as a system. By using the sensor system, human bodies and the number of persons existing in a room can easily, reliably and accurately detected with a low cost. Thus, a comfortable intelligent building can be provided.

An apparatus for detecting the number of passed persons according to a twenty-seventh embodiment of the present invention will now be described with reference to the drawings.

The structure and operation of this embodiment are basically the same as those according to the twenty-sixth embodiment. In this embodiment, the direction of the arrangement of the sensor array is arranged such that a infrared sensor (the central sensor) disposed perpendicular to the direction in which the human body moves detects the number of passed persons. If detection of one person has been performed, output from either of infrared sensors (two side sensors) disposed in parallel is omitted from calculation when the number of passed persons is detected.

Figure 42A:
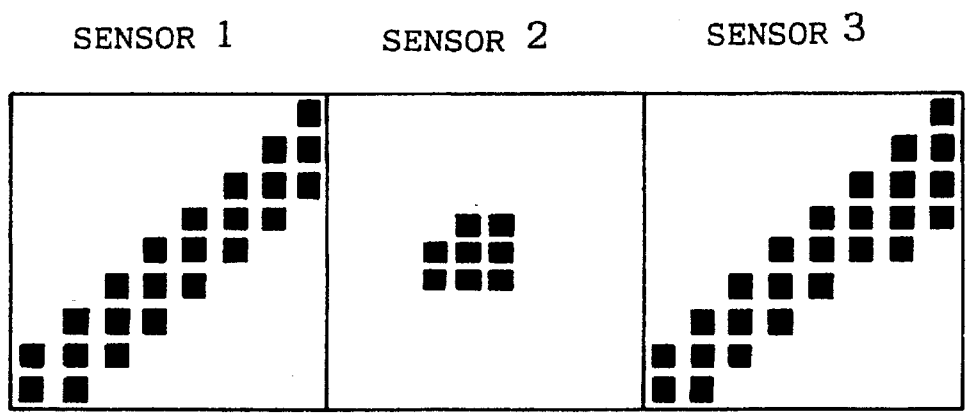
FIG. 42 is a diagram showing a specific example of the method of detecting the number of passed persons which is cable of detecting the number of passed persons according to a twenty-seventh embodiment of the present invention.
Figure 42B:
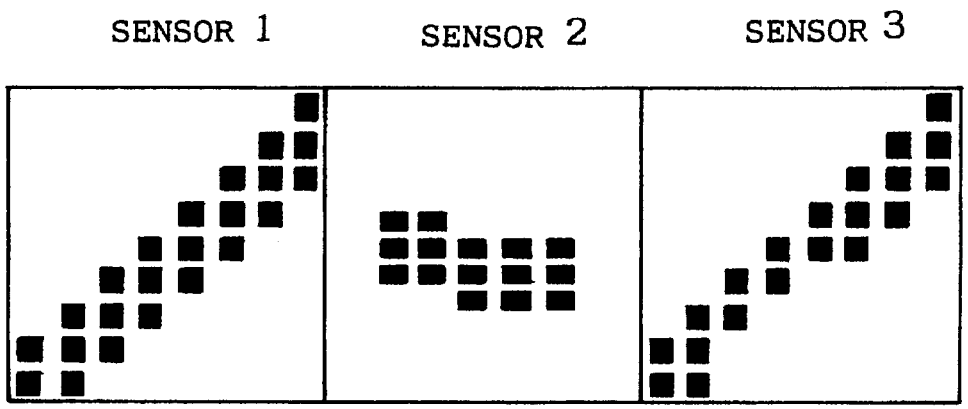

A specific example capable of detecting the number of passed persons according to this embodiment is shown in FIG. 42. FIG. 42(a) shows a case where one human body has passed below the sensor 111b, that is, between the sensor 111a and the sensor 111c, while FIG. 42(b) shows a case where one person has passed under each of the sensor 111a and the sensor 111b in the same direction. The sensor 111b is arranged to be capable of detecting the size of the human body. Since the detected size in the case shown in (a) corresponds to three devices, passage of one person is determined. Thus, only the output from the sensor is used but the output from the sensor 111b is omitted. Also the case (b) can be determined as passage of two persons because the size corresponds to six devices. Thus, outputs from both of the sensors 111a and 111b are employed when the human bodies are detected and determined.

As a result of the foregoing methods, the human bodies can reliably and accurately be detected. The moving direction can be determined, and the number of passed persons can be counted. Thus, the conventional detectable rate of the number of passed persons of about 80% could be raised to 95% or higher.

As described above, according to this embodiment, the infrared sensors are disposed in the upper portion of the doorway or the passage of a building or a room and the arrangement of the sensor array is changed so that the size of the human body who has entered the detection region for the infrared rays can be detected. Moreover, the moving directions of a plurality of human bodies and the number of passed persons can accurately be detected. Therefore, the number of persons who have entered the room and those who have left from the same can be detected in a realtime manner. Thus, the number of persons existing in each room in a building can accurately, precisely, immediately and reliably be detected.

Although the background has been the floor surface in the embodiments, the background is not limited to this. For example, a wall surface except the floor surface may be employed.

Although the chopping cycle of the pyroelectric infrared sensor has not been described in the embodiments, a chopping cycle of 10 Hz or higher enables the human bodies to be detected more quickly, accurately and precisely.

Although the embodiments has the infrared array sensor in which device are disposed in a line as shown in FIG. 1, a sensor having a matrix structure having 4×2 devices may be employed in place of the sensors according to the embodiments.

Although each means, such as the signal change detection means, is composed of exclusive hardware in the embodiments, a computer having similar functions may be employed in place of this to realize the object by a software method.

In the eighteenth to twenty-seventh embodiment, the infrared array sensors are disposed perpendicular to the direction in which the human bodies move. The arrangement is not limited to this. If the arrangement is made to be perpendicular to the direction in which the human bodies move, a similar effect can be obtained.

In the eighteenth to twenty-seventh embodiment, infrared array sensors in one line are disposed perpendicular to the direction in which the human bodies move. The structure is not limited to this. If the infrared array sensors are disposed into two lines or a plurality of lines, a similar effect can be obtained.

Figure 43:
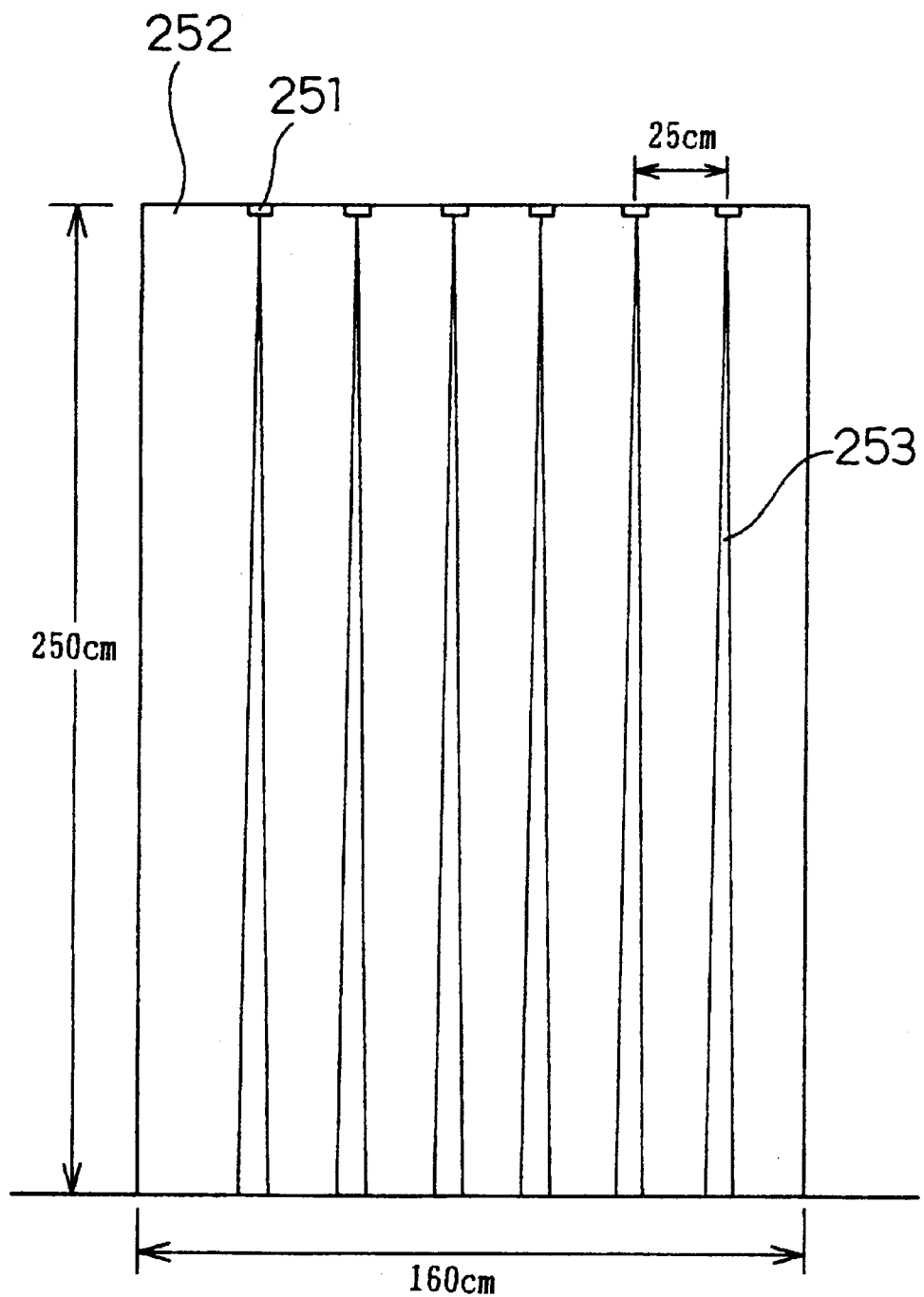
FIG. 43 is a diagram showing a state where the number of passed persons is detected by displaying a multiplicity of infrared sensors of the apparatus for detecting movements of human bodies according to the embodiment of the present invention.

In the eighteenth to twenty-seventh embodiment, the number of the infrared array sensors is two to four. The number is not limited to this. For example, as shown in FIG. 43, six sensor heads 251 each having an infrared sensor having a plurality of detection portions and a converging lens are disposed at intervals of 25 cm in the upper portion of a doorway 252 having a width of about 160 cm and a height of about 250 cm to always look the floor surface. Thus, detection regions 253 are formed, as illustrated. The sensor heads may be arranged to form two lines to form a matrix structure. As a result, when the human body has passed through the doorway 252 and moved through the detection region, analog outputs can be detected from the infrared sensors. By processing the analog signals by a signal processing means, the moving directions, the number of passed persons and the number of persons existing in the room can easily be detected.

As described above, a plurality of infrared array sensors are disposed to detect and determine the persons who have entered and left the building through a wide doorway so as to count the number of passed persons so that accurate number of entrance and the number of persons existing in a room are detected. In particular, since the threshold is set by using the temperature of the floor surface which is looked by the sensor, change in the temperature of the floor surface can always be fed back. Thus, the threshold can be allowed to follow the change in the temperature of the floor surface. Since thresholds are set for the upper limit and the lower limit with respect to the reference, even a low temperature object can be detected. By detecting the inclination of the sensor output, that is, the amount of change and/or by always inputting (maximum value−1) to the number of persons detected by each device except the device which has detected the maximum device, the number of persons who have successively passed or in the intersection manner can further accurately be detected. If two or less steps, in which determination of no human body, exist between the steps in which determination of human body has been detected, the determination of this step is forcibly considered as determination of human body. Thus, even if low temperature objects and high temperature objects exist mixedly, the human bodies can accurately be detected, the moving directions and the number of passed persons can further accurately be detected. By synchronizing the chopping between adjacent infrared sensors and by setting two thresholds, the human body who has passed between the sensors can accurately be detected. Since determination of the sensor outputs between adjacent infrared sensors is performed by using the hierarchy structure, the human body who has passed through two or more sensors can accurately be detected.

By disposing a plurality of infrared sensors into two lines, by disposing a sensor having a perpendicular sensor arrangement between adjacent infrared sensors, by diagonally disposing the infrared sensors and/or by employing matrix-structure devices, a sensor system capable of accurately and reliably detecting the number of passed persons can be obtained. Thus, the number of persons existing in a room can easily and immediately be detected. In particular, by using the foregoing detection method and the multi-sensor system, a great contribution can be made to accurately and reliably detecting the human bodies and the number of passed persons even at a wide doorway. The method of detecting the number of passed persons and the apparatus for detecting the number of passed persons require a very simple program. By using the algorithm of the program, accurate detection of human bodies substantially free from error in detection can easily be performed with a low cost even if persons pass successively or an intersection manner. Therefore, employment of the present invention enables human bodies to easily, accurately and reliably be detected at a wide doorway. Thus, the number of persons existing in a room can accurately be counted. Consequently, great contribution can be made to providing a comfortable intelligent building.

As described above, the present invention has an advantage that human bodies and the number of passed persons can easily, accurately and reliably be detected with a low cost.

In the case where a plurality of infrared array sensors are disposed, an advantage can be realized in accurately detecting the number of passed persons at a wide doorway.

What is claimed is:

1. A movement pattern recognizing apparatus comprising:

movement signal detection means including a converging lens for converging infrared rays into a predetermined angle and an infrared ray sensor for detecting a mobile body to detect, in a detection region in which said mobile body which can be detected by said sensor moves, a movement signal indicating the position of said mobile body, said movement signal changing as time elapses, said infrared ray sensor having a plurality of detection portions that detect infrared rays converged by said conveying lens to provide said movement signal;

movement signal normalizing means for generating normalized data corresponding to a movement signal provided by said movement signal detection means; and reference temperature storage means for storing reference data about a predetermined reference temperature, wherein said movement signal normalizing means uses the reference data stored in said reference temperature storage means to obtain a ratio of or a difference between signals obtainable from said plural detection portions of said infrared array sensor, and compares said ratio or the magnitude of said difference between said detection portions and detection portions adjacent to said detection portions to perform a binary-coding process so as to generate normalized data corresponding to said movement signal;

movement pattern storage means for storing data about previous movement patterns which were realized when said mobile body moved in said detection region; and movement pattern selection means for selecting data about a movement pattern, corresponding to said movement signal detected by said movement signal detection means, from said movement pattern storage means, wherein said predetermined reference temperature is a temperature which is detected by said movement signal detection means in a case where the heat generating body does not exist in said detection region, and said reference data is a mean value and a standard deviation of said reference temperature calculated by using said reference temperature obtained by sampling performed for a predetermined time.

2. A movement pattern recognizing apparatus comprising:

movement signal detection means including a converging lens for converging infrared rays into a predetermined angle and an infrared array sensor having a plurality of detection portions for detecting infrared rays converged by said converging lens to provide a movement signal indicating a position of a heat generating body, said movement signal changing as time elapses as said heat generating body moves in a detection region into which the infrared rays are converged;

movement signal normalizing means for generating normalized data corresponding to a movement signal provided by said movement signal detection means;

movement pattern storage means for storing data about previous movement patterns based upon normalized data generated by said movement signal normalizing means, the previous movement patterns having been realized when a heat generating body moved in said detection region;

movement pattern selection means for selecting, from said movement pattern storage means, selected data about a movement pattern that corresponds to the normalized data generated by said movement signal normalizing means;

movement pattern recognizing means for recognizing a movement pattern of the heat generating body in accordance with the selected data selected by said movement pattern selection means; and reference temperature storage means for storing reference data about a predetermined reference temperature, wherein said movement signal normalizing means uses the reference data stored in said reference temperature storage means to obtain a ratio of or a difference between signals obtainable from said plural detection portions of said infrared array sensor, and compares said ratio or the magnitude of said difference between said detection portions and detection portions adjacent to said detection portions to perform a binary-coding process so as to generate normalized data corresponding to said movement signal.

3. A movement pattern recognizing apparatus according to claim 2, wherein said predetermined reference temperature is a temperature which is detected by said movement signal detection means in a case where the heat generating body does not exist in said detection region, and said reference data is a mean value and a standard deviation of said reference temperature calculated by using said reference temperature obtained by sampling performed for a predetermined time.

4. A movement pattern recognizing apparatus according to claim 2, wherein said data about said movement patterns stored in said movement pattern storage means has sub-information about movement directions of said movement patterns and/or the number of passage times in said movement directions, and said movement pattern recognizing means recognizes the movement direction and/or the number of passage times in said movement direction about said movement pattern of the heat generating body in accordance with the data about said movement pattern selected by said movement pattern selection means.

5. A movement pattern recognizing apparatus according to claim 2, wherein said movement signal detection means has a plurality of sets each consisting of said converging lens and said infrared array sensor, and a predetermined region, in which said heat generating body moves, is covered by each of said plural sets.

6. A movement pattern recognizing apparatus comprising:

movement signal detection means including a sensor for detecting a mobile body in a detection region in which the mobile body moves, and for providing a movement signal indicating the position of the mobile body, said movement signal changing as time elapses;

movement pattern storage means for storing data about previous movement patterns realized when a mobile body moved in said detection region;

movement pattern selection means for selecting data about a movement pattern, corresponding to said movement signal detected by said movement signal detection means, from said movement pattern storage means; and reference temperature storage means for storing reference data about a predetermined reference temperature, wherein said movement signal normalizing means uses the reference data stored in said reference temperature storage means to obtain a ratio of or a difference between signals obtainable from said plural detection portions of said infrared array sensor, and compares said ratio or the magnitude of said difference between said detection portions and detection portions adjacent to said detection portions to perform a binary-coding process so as to generate normalized data corresponding to said movement signal.

7. A movement pattern recognizing apparatus according to claim 6, wherein:

said mobile body is a mobile heat generating body, said sensor is a converging lens for converging infrared rays into a predetermined angle and an infrared array sensor having a plurality of detection portions for detecting the infrared rays converged by said converging lens, and said detection region is a region into which the infrared rays are converged.

8. A movement pattern recognizing apparatus according to claim 6, wherein said movement signal detection means has a plurality of sets each consisting of said converging lens and said infrared array sensor, and a predetermined region, in which the heat generating body moves, is covered by each of said plural sets.

9. A movement pattern recognizing apparatus according to claim 8, further comprising refuse data storage means for storing a plurality of refuse data items which are data items that cannot be generated by said movement signal normalizing means, wherein said movement signal normalizing means generates normalized data of said movement signal detected by said movement signal detection means, and deletes refuse data from the normalized data if refuse data stored in said refuse data storage means is contained in the normalized data.

10. An apparatus for detecting movements of human bodies comprising:

an infrared array sensor having a plurality of devices arranged in a direction in which human beings move;

signal change detection means for detecting change in a leading edge and/or trailing edge of output signals from each of said devices of said infrared array sensor which occur in a predetermined period of time;

determining means using a predetermined rule to, in accordance with a detected value obtained from each of said devices of said infrared array sensor, determine movements of human bodies in an area sensed by said infrared array sensor; and a threshold setting means which causes said infrared array sensor to detect an average of a background temperature over a certain period so as to set a predetermined upper threshold and a predetermined lower threshold with respect to the detected average background temperature, wherein said signal change detection means detects the change in the leading edge and/or trailing edge of each of said output signals by using said thresholds as references to provide a change value representative of the detected change, said predetermined rule is a rule in which the number of pairs of the leading edge and the trailing edge detected from each of said devices is the number of persons for each device, said predetermined rule is a rule in which the number of persons obtained from each device is totally determined to finally determine the number of persons, said determining means makes a determination of no person even when a change value provided by said signal change detection means is outside of one of the thresholds, if a rate of change of the change value exceeds a predetermined rate, and said determining means determines that a direction in which detection states adjoin is a direction in which human bodies have been moved, and in a case where the number of adjoining devices, which are in a non-detecting state, is smaller than a predetermined number and the time from the trailing edge to the leading edge of the device is shorter than a predetermined time, said determining means determines that said non-detecting state is a detecting state.

11. An apparatus for detecting movements of human bodies according to claim 10, wherein said predetermined period of time is a period of time from a moment when detected values obtained from all of said plural devices have been made to be zero to a moment when the detected values are made to be zero.

12. An apparatus for detecting movements of human bodies according to claim 10, wherein said determining means determines that said device in a detecting state is in a non-detecting state in a case where two devices adjacent to said device are in the non-detecting state before or after at least one unit detection period.

13. An apparatus for detecting the number of passed persons comprising:

said apparatus for detecting movements of human bodies according to claim 10; and means for counting the number of passed persons for measuring the number of persons who have passed through an area, which is a subject of said infrared array sensor in accordance with a result of detection performed by said apparatus for detecting movements of human bodies.

14. An apparatus for detecting movements of human bodies comprising:

a plurality of infrared array sensors having a plurality of devices arranged in a direction in which human beings move;

signal change detection means for detecting change in the leading edge and/or trailing edge of output signals from each of said devices of each of said infrared arrays occurring in a predetermined period of time;

determining means using a predetermined rule to, in accordance with a state of appearance of said detected value of each of said devices of each of said infrared arrays between said infrared arrays, determine movements of human bodies in an area which is sensed by said plural infrared arrays; and a threshold setting means which causes said infrared array sensor to detect an average of a background temperature over a certain period so as to set a predetermined upper threshold and a predetermined lower threshold with respect to the detected average background temperature, wherein said signal change detection means detects the change in the leading edge and/or trailing edge of each of said output signals by using said thresholds as references to provide a change value representative of the detected change, said predetermined rule is a rule in which the number of pairs of the leading edge and the trailing edge detected from each of said devices is the number of persons for each device, said predetermined rule is a rule in which the number of persons obtained from each device is totally determined to finally determine the number of persons, said determining means makes a determination of one person when a change value provided by said signal change detection means falls below the lower threshold for a predetermined period after the change value exceeded the upper threshold.

said determining means determines that a direction in which detection states adjoin is a direction in which human bodies have been moved, and in a case where the number of adjoining devices, which are in a non-detecting state, is smaller than a predetermined number and the time from the trailing edge to the leading edge of the device is shorter than a predetermined time, said determining means determines that said non-detecting state is a detecting state.

15. An apparatus for detecting movements of human bodies according to claim 14, further comprising.

another infrared array sensor having a plurality of devices arranged in a direction in which human beings move to include the detection area of said plural infrared array sensors, wherein said determining means determines the number of moved persons in accordance with the number of devices in a detecting state in said other infrared array sensor.

16. An apparatus for detecting movements of human bodies according to claim 14, wherein:

the distance among detection areas of said plurality infrared array sensors is a distance in which one person can simultaneously be detected, said infrared array sensor detects the background temperature, a threshold setting means is further provided which sets a predetermined plural thresholds to each sensor in accordance with the detected background temperature, said signal change detection means detects change in the leading edge and/or the trailing edge of said output signal for each determining means determines that number of moved persons is one in a case where the number of said infrared array sensors, in which change of the output signal therefrom at a predeterined threshold has been detected by said signal change detection means, is a predetermined number.

17. An apparatus for detecting movements of human bodies comprising:

a plurality of infrared array sensors having a plurality of devices arranged in a direction in which human beings move;

signal change detection means for detecting change in the leading edge and/or trailing edge of output signals from each of said devices of each of said infrared arrays occurring in a predetermined period of time;

determining means which determines an output denoting a result of detection performed by each of said infrared array sensors in terms of time and spatially so as to obtain a state of transition and appearance of said detected values between each of said infrared array sensors and which uses a predetermined rule to, in accordance with the obtained state of transition and appearance, determine movements of human bodies in an area which is sensed by said plural infrared arrays; and a threshold setting means which causes said infrared array sensor to detect an average of a background temperature over a certain period so as to set a predetermined upper threshold and a predetermined lower threshold with respect to the detected average background temperature, wherein said signal change detection means detects the change in the leading edge and/or trailing edge of each of said output signals by using said thresholds as references to provide a change value representative of the detected change, said predetermined rule is a rule in which the number of pairs of the leading edge and the trailing edge detected from each of said devices is the number of persons for each device, said predetermined rule is a rule in which the number of persons obtained from each device is totally determined to finally determine the number of persons, said determining means makes a determination of one person when a change value provided by said signal change detection means falls below the lower threshold for a predetermined period after the change value exceeded the upper threshold, said determining means makes a determination of no person even when a change value provided by said signal change detection means is outside of one of the thresholds, if a rate of change of the change value exceeds a predetermined rate, and said determining means determines that a direction in which detection states adjoin is a direction in which human bodies have been moved, and in a case where the number of adjoining devices, which are in a non-detecting state, is smaller than a predetermined number and the time from the trailing edge to the leading edge of the device is shorter than a predetermined time, said determining means determines that said non-detecting state is a detecting state.

18. An apparatus for detecting movements of human bodies according to any one of claims 14 to 15, wherein the distance among detection areas of said plurality infrared array sensors is a distance in which one person can simultaneously be detected, said infrared array sensor detects the background temperature, a threshold setting means is further provided which sets a predetermined plural thresholds to each sensor in accordance with the detected background temperature, said signal change detection means detects change in the leading edge and/or the trailing edge of said output signal for each threshold by using each threshold as a reference, and said determining means determines that number of moved persons is one in a case where the number of said infrared array sensors, in which change of the output signal therefrom at a predetrmined threshold has been detected by said signal change detection means, is a predetermined number.

* * * * *